(12) United States Patent
Takagaki et al.

(10) Patent No.: US 7,313,234 B2
(45) Date of Patent: Dec. 25, 2007

(54) COMMUNICATION DEVICE, COMMUNICATION SYSTEM, AND ALGORITHM SELECTION METHOD

(75) Inventors: Keiichi Takagaki, Osaka (JP); Hiroshi Yokota, Suita (JP); Yukie Gotoh, Hirakata (JP); Atsuhiro Tsuji, Mino (JP); Masaaki Tamai, Sakurai (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 788 days.

(21) Appl. No.: 10/695,936

(22) Filed: Oct. 30, 2003

(65) Prior Publication Data

US 2004/0136533 A1 Jul. 15, 2004

(30) Foreign Application Priority Data

Oct. 31, 2002 (JP) ............................. 2002-318189
Jan. 31, 2003 (JP) ............................. 2003-023797

(51) Int. Cl.
H04L 9/28 (2006.01)
(52) U.S. Cl. ........................................ 380/28; 713/153
(58) Field of Classification Search ................. 380/263
See application file for complete search history.

(56) References Cited

U.S. PATENT DOCUMENTS 6,253,326 B1 * 6/2001 Lincke et al. .................. 726/12
6,671,810 B1 * 12/2003 Jardin ............................ 726/3
6,976,176 B1 * 12/2005 Schier .......................... 726/11
2003/0167314 A1 * 9/2003 Gilbert et al. .............. 709/217

FOREIGN PATENT DOCUMENTS

JP          2-188782        7/1990
JP          2002-190798     7/2002

OTHER PUBLICATIONS

S. Kent and R. Atkinson: "Security Architecture for the Internet Protocol", Issued from Internet Engineering Task Force, RFC: 2401; Nov. 1998.
S. Kent and R. Atkinson: "IP Authentication Header", issued from Internet Engineering Tesk Force, RFC: 2402; Nov. 1998.
S. Kent and R. Atkinson: "IP Encapsulating Security Payload (ESP)", issued from Internet Engineering Task Force, RFC: 2406; Nov. 1998.
D. Piper: "The Internet IP Security Domain of Interpretation for ISAKMP", issued from Internet Engineering Task Force, RFC: 2407; Nov. 1998.

(Continued)

Primary Examiner—Matthew B Smithers
(74) Attorney, Agent, or Firm—Wenderoth, Lind & Ponack, L.L.P.

(57) ABSTRACT

An encryption information determination section in a communication device negotiates an encryption algorithm to be used for encrypted communications with an encryption information determination section in a network camera, which is a communication counterpart. At this time, the encryption algorithm to be selected is varied depending on the CPU load of the communication device. That is, if the CPU utilization rate is high, a low-load encryption algorithm is selected, and if the CPU utilization rate is low, a high-load encryption algorithm is selected. A encryption/decryption processing section performs code processing using the encryption algorithm selected by the encryption information determination section.

28 Claims, 44 Drawing Sheets

OTHER PUBLICATIONS

D. Maughan, M. Schertler, S. Schneider and J. Turner: "Internet Security Association and Key Management Protocol (ISAKMP)", issued from Internet Engineering Task Force, RFC: 2408; Nov. 1998.

D. Harkins and D. Carrel: "The Internet Key Exchange", issued from Internet Engineering Task Force, RFC: 2409; Nov. 1998.

Uylss D. Black, translated by H. Hata and N. Matsumoto: "Internet Security Guide", first edition, issued from Pearson Education, pp. 1-14 (ISBN4-89471-455-8), Nov. 20, 2001.

* cited by examiner

F I G. 7

| ENCRYPTION ALGORITHM | EncRate( ) | ENCRYPTION STRENGTH |
|---|---|---|
| a | 20 | 1 |
| b | 40 | 2 |
| c | 70 | 3 |
| ⋮ | ⋮ | ⋮ |

FIG. 8
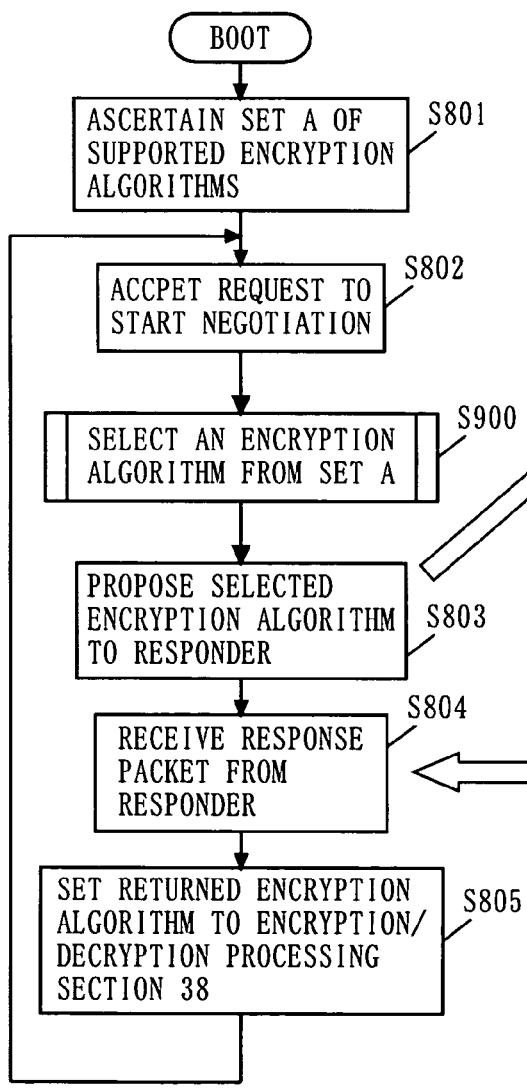
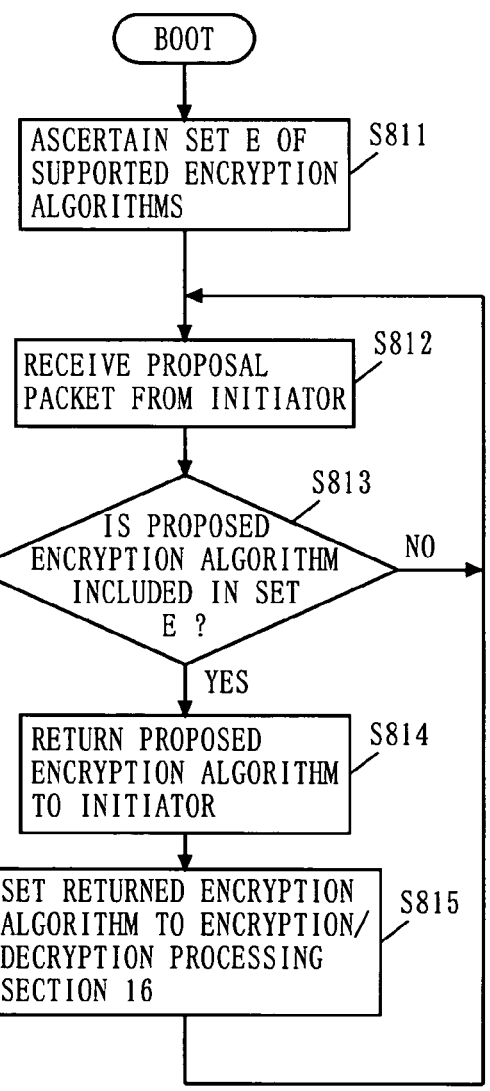

FIG. 12
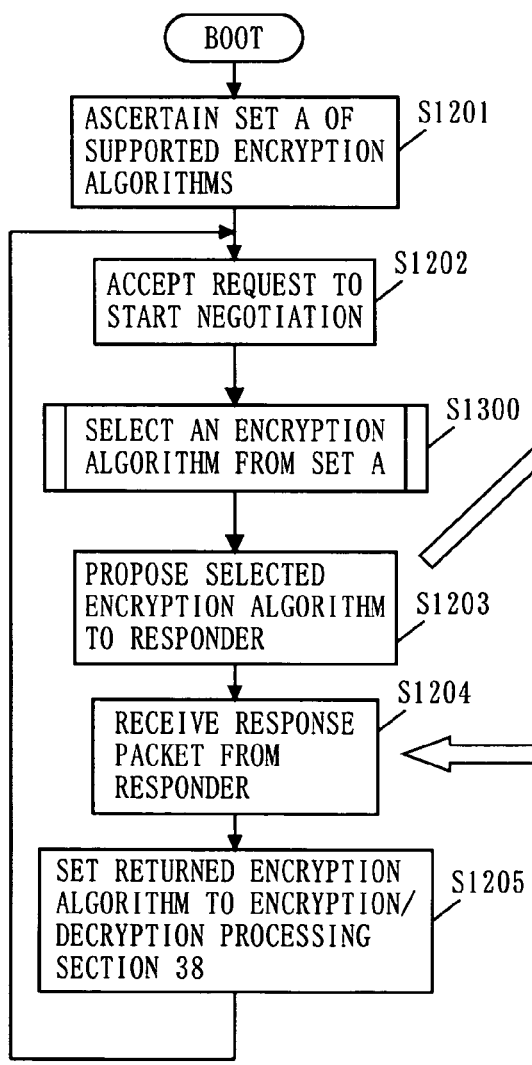
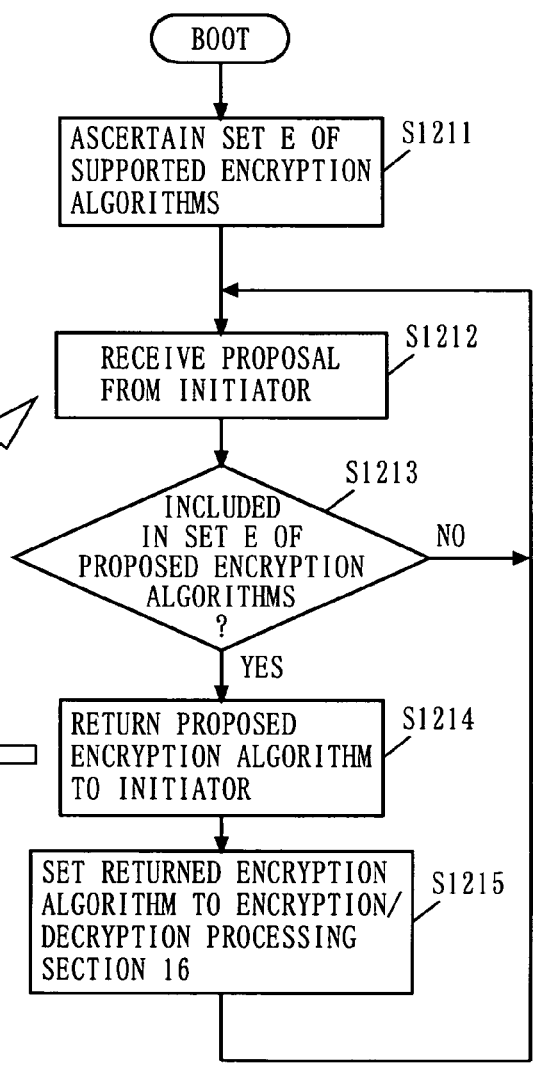

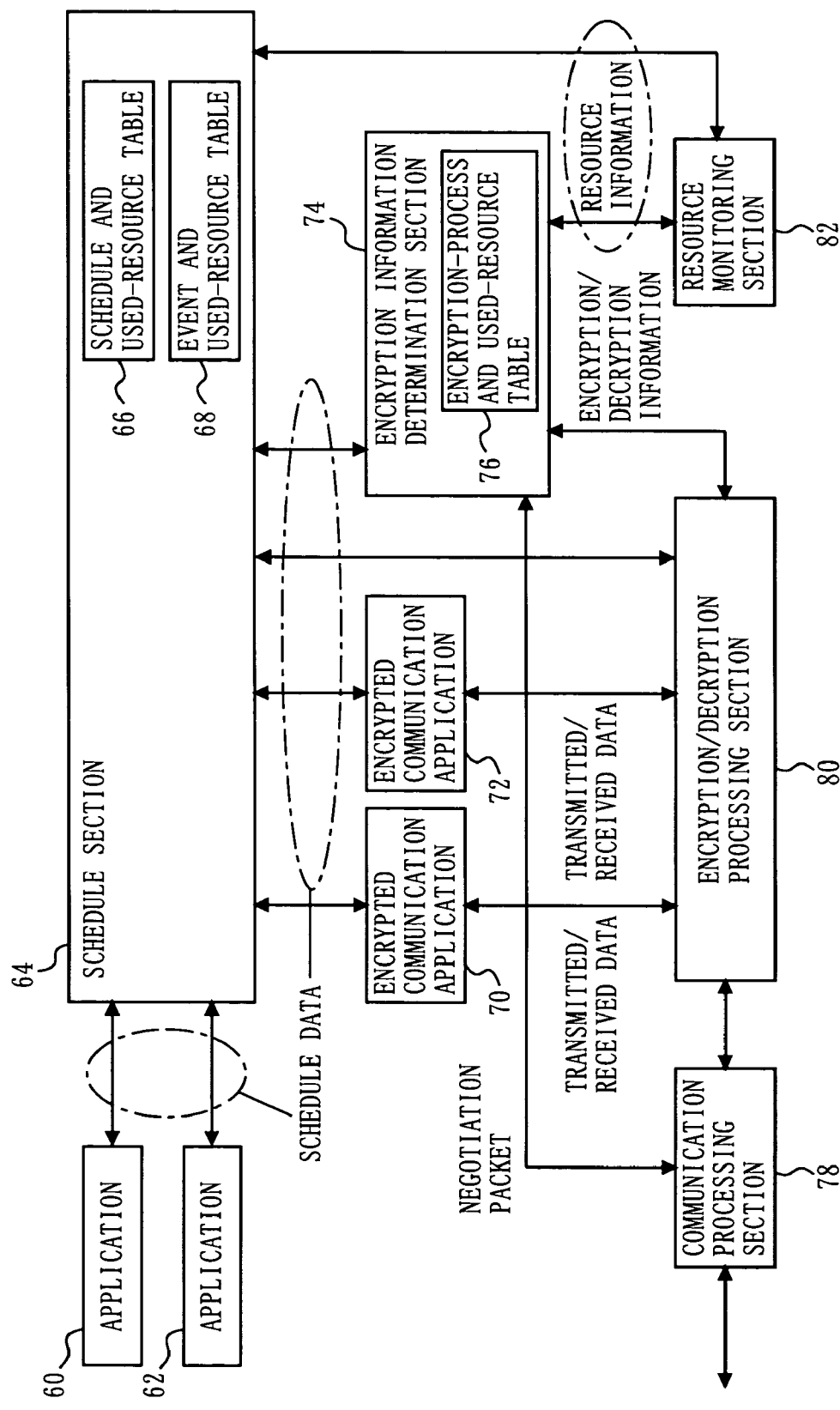

F I G. 1 9

SCHEDULE AND USED-RESOURCE TABLE IN SCHEDULE SECTION

| TASK | BELONGS TO APPLICATION | START TIME | END TIME | AVERAGE USED CPU RESOURCE | AVERAGE USED MEMORY RESOURCE | AVERAGE DATA TRANSFER AMOUNT | ENCRYPTED COMMUNICATION | NECESSARY ENCRYPTION STRENGTH |
|---|---|---|---|---|---|---|---|---|
| TASK a | A | 2002/11/1 12:00 | 2002/11/1 13:00 | 200MIPS | 50MB | 0Mbps | NO | — |
| TASK b | B | 2002/11/1 14:45 | — (UNKNOWN) | 50MIPS | 20MB | 1Mbps | YES | THIRD OR HIGHER |
| TASK c | A | 2002/11/1 12:30 | 2002/11/1 13:30 | 100MIPS | 20MB | 0Mbps | NO | — |

("AVERAGE DATA TRANSFER AMOUNT" MEANS AVERAGE DATA TRANSFER AMOUNT FOR ENCRYPTED COMMUNICATIONS)

FIG. 20

ENCRYPTION-PROCESS AND USED-RESOURCE TABLE IN ENCRYPTION
INFORMATION DETERMINATION SECTION

| ENCRYPTION ALGORITHM | AVERAGE USED CPU RESOURCE (MIPS/Mbps) | AVERAGE USED MEMORY RESOURCE (MB) | ORDER OF ENCRYPTION STRENGTH |
|---|---|---|---|
| DES-CBC | 100 | 13 | 2 |
| 3DES-CBC | 300 | 20 | 1 |

FIG. 22A
EVENT AND USED-RESOURCE TABLE IN SCHEDULE SECTION (DES-CBC)

| EVENT TIME | TASK b | | ENCRYPTION ALGORITHM | | TASK a | | TASK c | | TOTAL USED RESOURCE |
|---|---|---|---|---|---|---|---|---|---|
| | OPERATING STATE | USED RESOURCE | ALGORITHM NAME | USED RESOURCE | OPERATING STATE | USED RESOURCE | OPERATING STATE | USED RESOURCE | |
| 2002/11/1 11:45 | ACTIVE | 50MIPS | DES-CBC | 100MIPS | INACTIVE | | INACTIVE | | 150MIPS |
| 2002/11/1 12:00 | ACTIVE | 50MIPS | DES-CBC | 100MIPS | ACTIVE | 200MIPS | INACTIVE | | 350MIPS |
| 2002/11/1 12:30 | ACTIVE | 50MIPS | DES-CBC | 100MIPS | ACTIVE | 200MIPS | ACTIVE | 100MIPS | 450MIPS |
| 2002/11/1 13:00 | ACTIVE | 50MIPS | DES-CBC | 100MIPS | INACTIVE | | ACTIVE | 100MIPS | 250MIPS |
| 2002/11/1 13:30 | ACTIVE | 50MIPS | DES-CBC | 100MIPS | INACTIVE | | INACTIVE | | 150MIPS |

("USED RESOURCE" MEANS AVERAGE USED CPU RESOURCE)

FIG. 22B
EVENT AND USED-RESOURCE TABLE IN SCHEDULE SECTION (3DES-CBC)

| EVENT TIME | TASK b | | ENCRYPTION ALGORITHM | | TASK a | | TASK c | | TOTAL USED RESOURCE |
|---|---|---|---|---|---|---|---|---|---|
| | OPERATING STATE | USED RESOURCE | ALGORITHM NAME | USED RESOURCE | OPERATING STATE | USED RESOURCE | OPERATING STATE | USED RESOURCE | |
| 2002/11/1 11:45 | ACTIVE | 50MIPS | 3DES-CBC | 300MIPS | INACTIVE | | INACTIVE | | 350MIPS |
| 2002/11/1 12:00 | ACTIVE | 50MIPS | 3DES-CBC | 300MIPS | ACTIVE | 200MIPS | INACTIVE | | 550MIPS |
| 2002/11/1 12:30 | ACTIVE | 50MIPS | 3DES-CBC | 300MIPS | ACTIVE | 200MIPS | ACTIVE | 100MIPS | 650MIPS |
| 2002/11/1 13:00 | ACTIVE | 50MIPS | 3DES-CBC | 300MIPS | INACTIVE | | ACTIVE | 100MIPS | 450MIPS |
| 2002/11/1 13:30 | ACTIVE | 50MIPS | 3DES-CBC | 300MIPS | INACTIVE | | INACTIVE | | 350MIPS |

("USED RESOURCE" MEANS AVERAGE USED CPU RESOURCE)

F I G. 24

ENCRYPTION-PROCESS AND USED-RESOURCE TABLE IN ENCRYPTION
INFORMATION DETERMINATION SECTION

| ENCRYPTION ALGORITHM | AVERAGE USED CPU RESOURCE (MIPS/Mbps) | NUMBER OF PREPROCESS INSTRUCTIONS (MI) | ORDER OF ENCRYPTION STRENGTH |
|---|---|---|---|
| DES-CBC | 100 | 100 | 2 |
| 3DES-CBC | 300 | 300 | 1 |

F I G. 25

EVENT AND USED-RESOURCE TABLE IN SCHEDULE SECTION (DES-CBC, 3DES-CBC)

| EVENT TIME | TASK/ RESOURCE | TASK/ RESOURCE | TASK/ RESOURCE | CODE/ RESOURCE | TOTAL RESOURCE | CODE/ RESOURCE | TOTAL RESOURCE | USED ENCRYPTION ALGORITHM |
|---|---|---|---|---|---|---|---|---|
| 11:45 | b 50 | | | | | 3D 300 | 350 | 3D |
| 12:00 | b 50 | a 200 | | D 100 | 150 | 3D 300 | 550 | D |
| 12:30 | b 50 | a 200 | c 100 | D 100 | 350 | 3D 300 | 650 | D |
| 13:00 | b 50 | c 100 | | D 100 | 450 | 3D 300 | 450 | 3D |
| 13:30 | b 50 | | | D 100 | 250 | 3D 300 | 350 | 3D |

("RESOURCE" MEANS AVERAGE USED CPU RESOURCE (MIPS) ; "D" MEANS DES-CBS; "3D" MEANS 3DES-CBC)

F I G. 2 6

EVENT AND USED-RESOURCE TABLE IN SCHEDULE SECTION (DES-CBC, 3DES-CBC)

| EVENT TIME | TASK/ RESOURCE | TASK/ RESOURCE | TASK/ RESOURCE | WHEN USING ALGORITHM D FOR TASK b | | WHEN USING ALGORITHM 3D FOR TASK b | | USED ENCRYPTION ALGORITHM |
|---|---|---|---|---|---|---|---|---|
| | | | | RESOURCE | TOTAL RESOURCE | RESOURCE | TOTAL RESOURCE | |
| 11:45 | b 50 | | | 100 | 150 | 300 | 350 | 3D |
| 12:00 | b 50 | a 200 | | 100 | 350 | 300 | 550 | D |
| 12:30 | b 50 | a 200 | c 100 | 100 | 450 | 300 | 650 | D |
| 13:00 | b 50 | C 100 | | 100 | 250 | 300 | 450 | 3D |
| 13:30 | b 50 | | | 100 | 150 | 300 | 350 | 3D |

("RESOURCE" MEANS AVERAGE USED CPU RESOURCE (MIPS); "D" MEANS DES-CBS; "3D" MEANS 3DES-CBC)

FIG. 27

EVENT AND USED-RESOURCE TABLE IN SCHEDULE SECTION (DES-CBC, 3DES-CBC)

| EVENT TIME | TASK/ RESOURCE | TASK/ RESOURCE | TASK/ RESOURCE | CODE/ RESOURCE | TOTAL RESOURCE | CODE/ RESOURCE | TOTAL RESOURCE | USED ENCRYPTION ALGORITHM | PREPROCESS | PREPROCESS ENCRYPTION ALGORITHM |
|---|---|---|---|---|---|---|---|---|---|---|
| 11:42 | | | | | | | | | Mt1 | 3D |
| 11:45 | b 50 | | | D 100 | 150 | 3D 300 | 350 | 3D | | |
| 11:58 | SAME AS ABOVE | a 200 | | SAME AS ABOVE | SAME AS ABOVE | SAME AS ABOVE | SAME AS ABOVE | 3D | Mt2 | D |
| 12:00 | b 50 | a 200 | c 100 | D 100 | 350 | 3D 300 | 550 | D | | |
| 12:30 | b 50 | SAME AS ABOVE | SAME AS ABOVE | D 100 | 450 | 3D 300 | 650 | D | | |
| 12:56 | SAME AS ABOVE | c 100 | | SAME AS ABOVE | SAME AS ABOVE | SAME AS ABOVE | SAME AS ABOVE | D | Mt3 | 3D |
| 13:00 | b 50 | | | D 100 | 250 | 3D 300 | 450 | 3D | | |
| 13:30 | b 50 | | | D 100 | 150 | 3D 300 | 350 | 3D | | |

("RESOURCE" MEANS AVERAGE USED CPU RESOURCE (MIPS); "D" MEANS DES-CBS; "3D" MEANS 3DES-CBC)

FIG. 28

EVENT AND USED-RESOURCE TABLE IN SCHEDULE SECTION (DES-CBC, 3DES-CBC, AES)

| EVENT TIME | TASK/ RESOURCE | TASK/ RESOURCE | TASK/ RESOURCE | CODE/ RESOURCE | TOTAL RESOURCE | CODE/ RESOURCE | TOTAL RESOURCE | CODE/ RESOURCE | TOTAL RESOURCE | USED ENCRYPTION ALGORITHM | PREPROCESS | PREPROCESS ENCRYPTION ALGORITHM |
| --- | --- | --- | --- | --- | --- | --- | --- | --- | --- | --- | --- | --- |
| 11:43 | | | | | | | | | | | Mt1 | A |
| 11:45 | b 50 | | | D 100 | 150 | 3D 300 | 350 | A 200 | 250 | A | | |
| 12:00 | b 50 | a 200 | | D 100 | 350 | 3D 300 | 550 | A 200 | 450 | A | | D |
| 12:29 | SAME AS ABOVE | SAME AS ABOVE | | SAME AS ABOVE | SAME AS ABOVE | SAME AS ABOVE | SAME AS ABOVE | SAME AS ABOVE | SAME AS ABOVE | A | Mt2 | |
| 12:30 | b 50 | a 200 | c 100 | D 100 | 450 | 3D 300 | 650 | A 200 | 550 | D | | |
| 12:58 | SAME AS ABOVE | SAME AS ABOVE | SAME AS ABOVE | D 100 | 250 | 3D 300 | 450 | A 200 | 350 | D | Mt3 | A |
| 13:00 | b 50 | c 100 | | D 100 | 150 | 3D 300 | 350 | A 200 | 250 | A | | |
| 13:30 | b 50 | | | | | | | | | | | |

("RESOURCE" MEANS AVERAGE USED CPU RESOURCE (MIPS) ; "D" MEANS DES-CBS; "3D" MEANS 3DES-CBC; "A" MEANS AES)

F I G. 2 9

ENCRYPTION-PROCESS AND USED-RESOURCE TABLE IN ENCRYPTION
INFORMATION DETERMINATION SECTION

| ENCRYPTION ALGORITHM | AVERAGE USED CPU RESOURCE (MIPS/Mbps) | AVERAGE USED MEMORY RESOURCE (MB) | ORDER OF ENCRYPTION STRENGTH |
|---|---|---|---|
| DES-CBC | 100 | 13 | 3 |
| 3DES-CBC | 300 | 20 | 2 |
| AES | 200 | 16 | 1 |

FIG. 37

| ALGORITHM | CALCULATION AMOUNT | CALCULATION AMOUNT INDEX (ORDER) | ENCRYPTION STRENGTH (ORDER) |
|---|---|---|---|
| DES-CBC | 100 | 1 | 3 |
| 3DES-CBC | 300 | 3 | 2 |
| AES-CBC | 200 | 2 | 1 |

FIG. 38

| COMMUNICATION COUNTERPART | last | FREQUENCY | | |
|---|---|---|---|---|
| | | DES | 3DES | AES |
| COMMUNICATION COUNTERPART A | 3DES-CBC | 17 | 3 | * |
| COMMUNICATION COUNTERPART B | 3DES-CBC | * | 13 | 7 |
| COMMUNICATION COUNTERPART C | AES-CBC | * | 5 | 15 |

FIG. 40
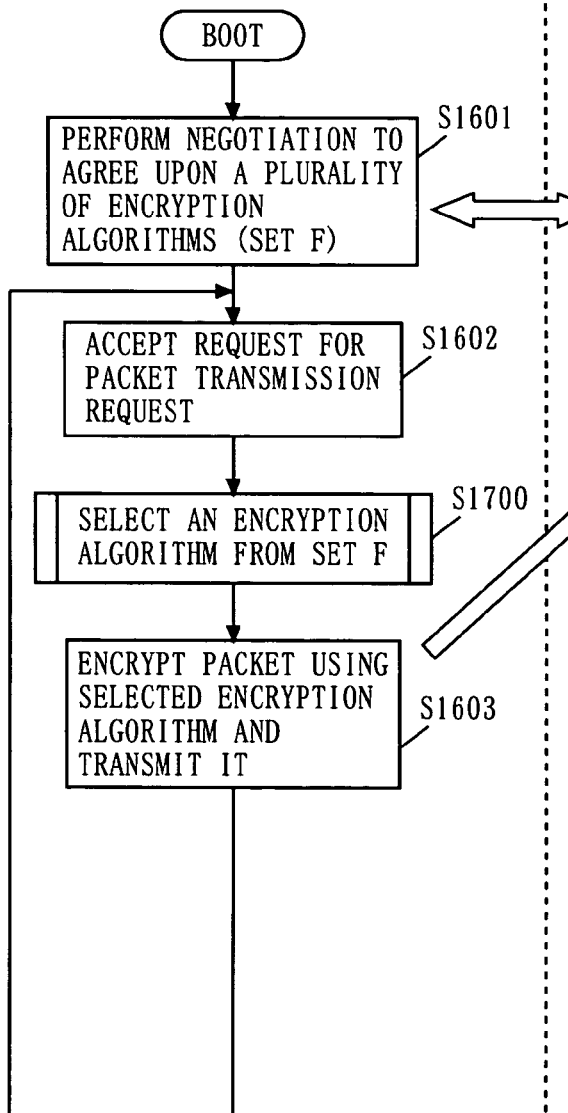
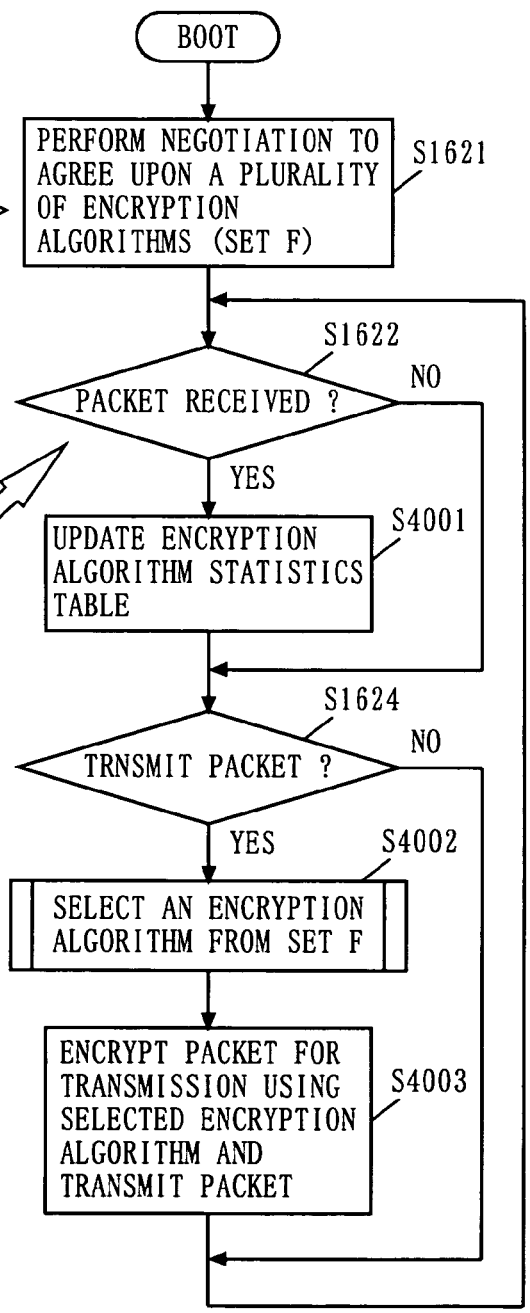

COMMUNICATION DEVICE, COMMUNICATION SYSTEM, AND ALGORITHM SELECTION METHOD

BACKGROUND OF THE INVENTION

1. Field of the Invention

The present invention relates to a communication device, a communication system, and an algorithm selection method, and more particularly to the selection of an encryption algorithm or the like to be used for performing data communications such as encrypted communications.

2. Description of the Background Art

<Network Appliances>

The prevalence of Internet technology in recent years has led to a trend for connecting mobile terminals, home appliances and the like to the Internet in order to provide various services thereon. Communication devices such as ep stations are being marketed as one of the first instances of home appliances capable of connecting to the Internet. An ep station is a device for realizing an ep service as illustrated in FIG. 42. An ep service has two features. Firstly, through an Internet connection between a broadcasting station and an ep station, services which combine broadcasting and communications, e.g., TV shopping or programs in which viewers can participate, can be realized. Secondly, since an ep station incorporates a hard disk drive, it can store TV programs or advertisement data which are broadcast from satellites, e-mail data received from the Internet, and the like.

A current ep station connects to the Internet by way of telephone circuits. However, high-speed Internet connection environments are becoming available in ordinary households due to the prevalence of high speed networks such as ADSL CATV, and optical fibers. Therefore, it is easily conceivable that next-generation machines for the ep station, with high-speed communication abilities, may appear.

Atsuko NOMURA, "Broad-band Kakumei-Mezase! ubiquitous network shakai", first edition, Chuokeizai-sha, Inc., Apr. 1, 2001, pp.225-227 (ISBN4-502-57211-X)", describes the so-called e-platform project, which is a precursor to the ep service, illustrating forms of services which combine high-quality broadcasting with data broadcasting, stored broadcast services, or high-speed Internet access. Examples of applications utilizing high-speed Internet access include download services such as video or music distribution, monitoring via videophones, or network cameras.

Among other applications, use of network cameras will be discussed. As for consumer use, network cameras maybe utilized to monitor one's children at day nurseries, one's parents who are living by themselves, or one's home when the monitor is away from it. In order to prevent such private video from being peeped at on the Internet, it is necessary to protect the video data by encryption or the like.

Encrypted communications may be required for the transmission of the aforementioned private data, exchange of data concerning E-commerce, transmission of equipment control information from an ISP to each client's system in an Internet service or the like, transmission of information concerning an operation which is made away from home with a personal terminal such as a cellular phone to a terminal device placed at the home (e.g., preparing a hot bath or turning the air conditioning on).

<Encrypted Communications>

It has been conventional practice to perform data encryption when exchanging confidential data over a public network such as the Internet. Uyless D. Black, translated by H. HATA and N. MATSUMOTO, "Internet Security Guide", first edition, issued from Pearson Education, Nov. 20, 2001, all pages (ISBN4-89471-455-8), specifically describes dangers existing on the Internet and encryption and authentication techniques as countermeasures thereto. Publications such as "RFC2401", issued from IETF (Internet Engineering Task Force) specifically describe IPsec (Internet Protocol Security), which is a representative encryption/authentication protocol used on the Internet.

Hereinafter, a general flow of encrypted communication processing will be described. First, the same encryption algorithm is set at both the transmitting end and the receiving end of data. At both ends, an encryption key as well as a decryption key with which to decrypt data that has been encrypted by the other end of the communication are also set. In the case where the encryption key and the decryption key are an identical key, such keys are called a shared key. The setting of the encryption algorithm and the keys may be performed manually, or through an automatic negotiation between both ends. Once such settings are completed, an encrypted communication is carried out in the following manner. First, the data-transmitting end encrypts data to be transmitted by using the encryption algorithm and encryption key which have been set, and send them out onto the Internet connection network. Then, upon receiving the encrypted packet, the receiving end decrypts the encrypted packet by using the encryption algorithm and decryption key which have been set.

FIG. 43 is a block diagram illustrating a system in which a network camera installed in a day nursery and a digital television device installed at home are connected via an Internet connection network, such that a mother at home can monitor her child's activities at the day nursery, with respect to a portion concerning encrypted communications.

In this case, an encryption/decryption processing section 218 in the digital television device performs communications of various data in packet format with an encryption/decryption processing section 204 of the network camera, via a communication processing section 216 of the digital television device itself, the Internet connection network, and a communication processing section 206 in the network camera. In order for the data-transmitting end and the data-receiving end to use the same encryption algorithm, the aforementioned negotiation is performed between the two ends. In a negotiation of an encryption algorithm, packets for the negotiation are exchanged with each end. First, the encryption information determination section 214 of the digital television device generates a negotiation packet for transmission in a predetermined format, and proposes to the network camera an encryption algorithm to be used. At the network camera, the proposed encryption algorithm which has been obtained via the communication processing section 206 and the encryption/decryption processing section 204 is passed to the encryption information determination section 202 as encryption/decryption information, and the encryption information determination section 202 determines whether the proposed encryption algorithm is usable. Then, a reply indicating the usability of the proposed encryption algorithm is given via the encryption/decryption processing section 204 and the communication processing section 206. The encryption information determination section 214 in the digital television device receives this reply via the communication processing section 216 and the encryption/decryption processing section 218, and if the received reply is "usable", it is notified, in the form of a negotiation packet, to the network camera that the proposed usable encryption algorithm is finalized; thus, the negotiation for the encryption algorithm to be used is ended. Moreover, the encryption information determination section 214 notifies the determined encryption algorithm to the encryption/decryption processing section 218, and instructs this algorithm to be set. Furthermore, the encryption information determination section 202 also notifies the determined encryption algorithm to the encryption/decryption processing section 204, and instructs this algorithm to be set. Next, the encryption information determination sections 214 and 202 and the encryption/decryption processing sections 218 and 204 perform predetermined communications with each other, and, through a procedure which is determined in accordance with the set encryption algorithm, generate and set an encryption key and a decryption key of a predetermined format. Once the encryption key and the decryption key are generated, encrypted communications are enabled. An encrypted communication application 200 passes Video data which is imaged by an imaging section (not shown) to the encryption/decryption processing section 204. By using the set encryption algorithm, the encryption/decryption processing section 204 encrypts the video data, and sends it as data packets to the digital television device via the communication processing section 206 and the Internet connection network. At the digital television device, the data packets are received by the communication processing section 216 and thereafter decrypted by the encryption/decryption processing section 218, and the decrypted video data is passed to the encrypted communication application 210. The encrypted communication application 210 performs a process of displaying the video data from the network camera, at a predetermined position and in a predetermined size on a display of the television device.

When proposing an encryption algorithm in such a conventional negotiation, the encryption information determination section 214 selects from among the encryption algorithms held therein one or more encryption algorithms that have been set by the user or preselected in the program, and proposes it or them to the other end. When a proposal from the other end is received, as a response to the proposal, the encryption information determination section 214 selects and notifies the highest-priority encryption algorithm among the encryption algorithms that are held.

In the case where there are a plurality of applications which need to perform encryption/decryption using encryption algorithms, e.g., the encrypted communication applications 210 and 212, such that a plurality of types of data are subjected to encryption/decryption processing in parallel, adopting algorithms having a high encryption strength for both would result in a system failure, because, encryption algorithms generally require a large CPU resource, such that the total load associated with the processing of the plurality of encrypted communication applications and a plurality of encryption processes therefor might exceed the CPU performance. In order to prevent such a situation, according to Japanese Patent Laid-Open Publication No.2002-190798 (page 6, FIG. 6), communication data are split in a plurality of blocks, such that an encryption algorithm having a high encryption strength is used for blocks in which highly important data is stored, whereas an encryption algorithm having a low encryption strength is used for blocks in which less important data is stored, thereby reducing the necessary amount of CPU processing resource.

As described above, encryption processes which are performed in encrypted communications entail complicated processing for the transmitted/received data. Therefore, encrypted communications impose a very high processing load as compared to communications which do not involve any encryption. For example, in the case where a decryption process for network camera data (encrypted communication application 210) concurrently occurs with a recording of TV broadcast video data (application 208), both of which are high-load processes that require real time processing, the aforementioned sort of negotiation will select an encryption algorithm having the highest possible encryption strength, so that it may not be possible to simultaneously process both processes, given the CPU performance. In other words, problems may occur such that the recording of the TV broadcast may fail, or the video of the network camera may be disturbed or stopped. FIG. 44 shows a relationship between the CPU performance, and the CPU resource necessary for receiving/displaying the network camera video and the CPU resource necessary for the TV recording. Thus, the aforementioned problem occurs only when the total of the CPU resource necessary for receiving/displaying the network camera video and the CPU resource necessary for the TV recording exceeds the CPU performance, as shown in FIG. 44.

SUMMARY OF THE INVENTION

Therefore, an object of the present invention is to reduce the load of an encryption process while providing as high confidentiality as possible in the case where an encrypted communication processing and another high-load processing must be simultaneously performed, thus solving the aforementioned problems associated with depletion of the CPU resource.

A communication device according to a first aspect of the present invention comprises an encryption information determination section for selecting an encryption algorithm from among a plurality of previously provided encryption algorithms, the selected encryption algorithm being different depending on a predicted total used resource or an actual total used resource; an encryption/decryption processing section for encrypting a packet in accordance with the encryption algorithm selected by the encryption information determination section; and a communication processing section for transmitting the packet encrypted by the encryption/decryption processing section.

A communication device according to a second aspect of the present invention comprises: an encryption information determination section for selecting an encryption algorithm from among a plurality of previously provided encryption algorithms, the selected encryption algorithm being different depending on an encryption algorithm or encryption algorithms used for one or more packets received from a communication counterpart; an encryption/decryption processing section for encrypting a packet to be transmitted to the communication counterpart in accordance with the encryption algorithm selected by the encryption information determination section; and a communication processing section for transmitting the packet encrypted by the encryption/decryption processing section.

According to the above-described first communication device, problems arising on the part of the communication device due to insufficient resource can be prevented.

According to the above-described second communication device, problems arising on the part of the communication counterpart due to insufficient resource can be prevented.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a diagram showing a database retaining correspondence between encryption algorithms and processing loads and encryption strengths thereof;

FIG. 8 is a flowchart illustrating the operation of the encryption information determination section in the case of performing an encryption algorithm negotiation as an initiator according to Embodiment 1 of the present invention;

FIG. 12 is a flowchart illustrating the operation of the encryption information determination section in the case of performing an encryption algorithm negotiation as an initiator according to Embodiment 2 of the present invention;

FIG. 18 is a block diagram illustrating a functional configuration of a communication device according to Embodiments 5 to 9 of the present invention;

FIG. 19 is a diagram showing an exemplary schedule and used-resource table used in Embodiments 5 to 9 of the present invention;

FIG. 20 is a diagram showing an exemplary encryption process and used-resource table used in Embodiment 5 and Embodiment 7 of the present invention;

FIG. 22A is a diagram showing an exemplary event and used-resource table used in Embodiment 5 of the present invention;

FIG. 22B is a diagram showing an exemplary event and used-resource table used in Embodiment 5 of the present invention;

FIG. 24 is a diagram showing an exemplary encryption process and used-resource table used in Embodiment 6 and Embodiment 8 of the present invention;

FIG. 25 is a diagram showing an exemplary event and used-resource table used in Embodiment 7 of the present invention;

FIG. 26 is a diagram showing another exemplary event and used-resource table used in Embodiment 7 of the present invention;

FIG. 27 is a diagram showing an exemplary event and used-resource table used in Embodiment 8 of the present invention;

FIG. 28 is a diagram showing an exemplary event and used-resource table use in Embodiment 9 of the present invention;

FIG. 29 is a diagram showing an exemplary encryption process and used-resource table used in Embodiment 9 of the present invention;

FIG. 37 is a diagram showing an exemplary encryption process and used-resource table according to Embodiment 18 of the present invention;

FIG. 38 is a diagram showing an exemplary encryption algorithm statistics table according to Embodiment 18 of the present invention;

FIG. 40 is a diagram illustrating the operation of a communication system according to Embodiment 18 of the present invention;

DESCRIPTION OF THE PREFERRED EMBODIMENTS

Hereinafter, various embodiments of the present invention will be described with reference to figures.

Embodiment 1

Figure 1:
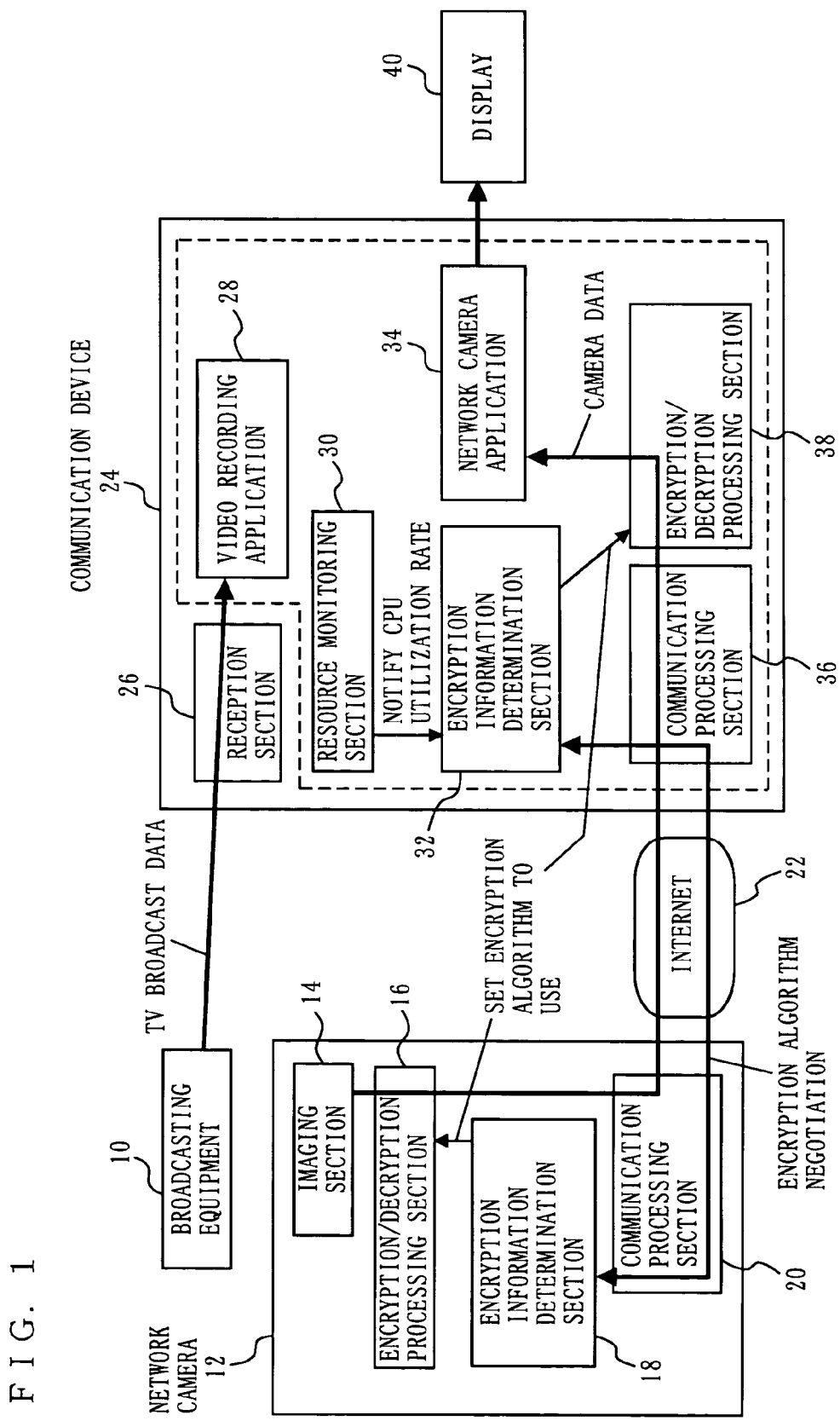
FIG. 1 is a diagram illustrating the overall structure of a system according to Embodiments 1 to 4 of the present invention.

FIG. 1 is a diagram illustrating the structure of a system according to Embodiment 1 of the present invention. In FIG. 1, the system according to Embodiment 1 is composed of broadcasting equipment 10, a communication device 24, a network camera 12, the Internet 22, and a display (image display device) 40.

Figure 43:
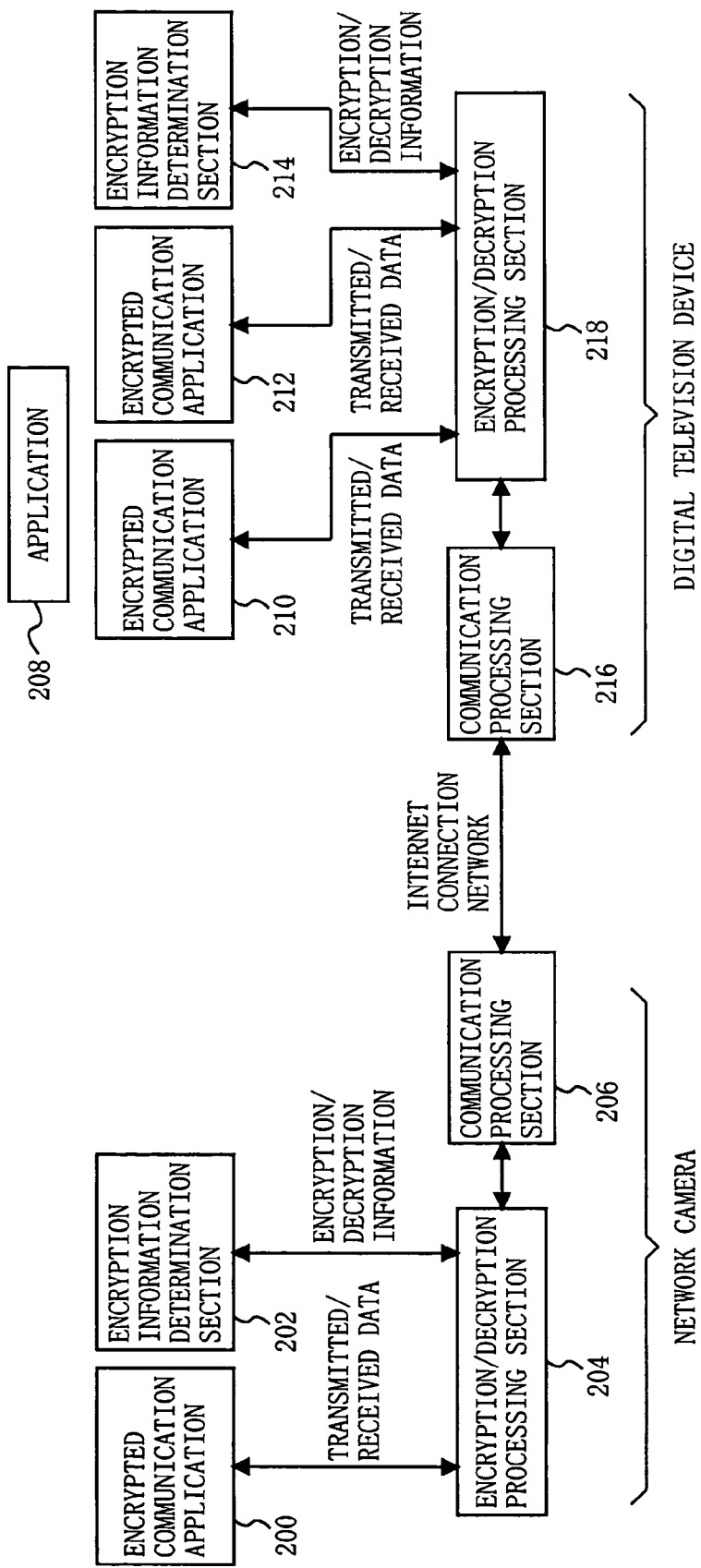
FIG. 43 is a functional block diagram illustrating a conventional system.

Next, the functions of the network camera 12 and the communication device 24 will be specifically described. The network camera 12 includes an imaging section 14, an encryption/decryption processing section 16, an encryption information determination section 18, and a communication processing section 20. The encrypted communication application 200 as shown in FIG. 43 may be provided between the imaging section 14 and the encryption/decryption processing section 16.

The communication device 24, which is a home appliance having a communication function and a video recording function, includes a reception section 26, a video recording application 28, a resource monitoring section 30, an encryption information determination section 32, a communication processing section 36, an encryption/decryption processing section 38, and a network camera application 34. The component elements encircled with a broken line in FIG. 1, i.e., the video recording application 28, the resource monitoring section 30, the encryption information determination section 32, the communication processing section 36, the encryption/decryption processing section 38, and the network camera application 34, are realized by software being executed by an internal CPU. In the present embodiment, it is assumed that the algorithm selection method according to the present invention is employed by the encryption information determination section 32 in the communication device 24.

Next, the operation of the present system will be described.

First, the operation of the system when performing a TV recording will be described. The reception section 26 receives TV broadcast data which is broadcast from the broadcasting equipment 10. Next, the video recording application 28 records the received TV broadcast data onto a storage medium within the communication device 24. This process is performed by employing the internal CPU. By continually performing the above process from a broadcasting start time to a broadcasting end time of a TV program to be recorded, a TV recording is accomplished.

Next, the operation of the system when displaying video from the network camera 12 on the display 40 will be described. This process is divided into a preprocess for performing an encrypted communication, and a process of actually causing the network camera application 34 to operate. The preprocess for performing an encrypted communication will be described later. First, an outline of the process of actually causing the network camera application 34 to operate will be described. First, in the network camera 12, the video data taken by the imaging section 14 is encrypted by the encryption/decryption processing section 16. The communication processing section 20 sends the encrypted video data onto the Internet 22 as packets directed to the communication device 24. At the communication device 24, the communication processing section 36 receives the encrypted packets from the Internet 22, the encryption/decryption processing section 38 decrypts them, and the network camera application 34 outputs the decrypted video data to the display 40. Then, the display 40 displays the video. In this manner, the video which has been taken by means of the network camera 12 is displayed on the display 40.

Figure 44:
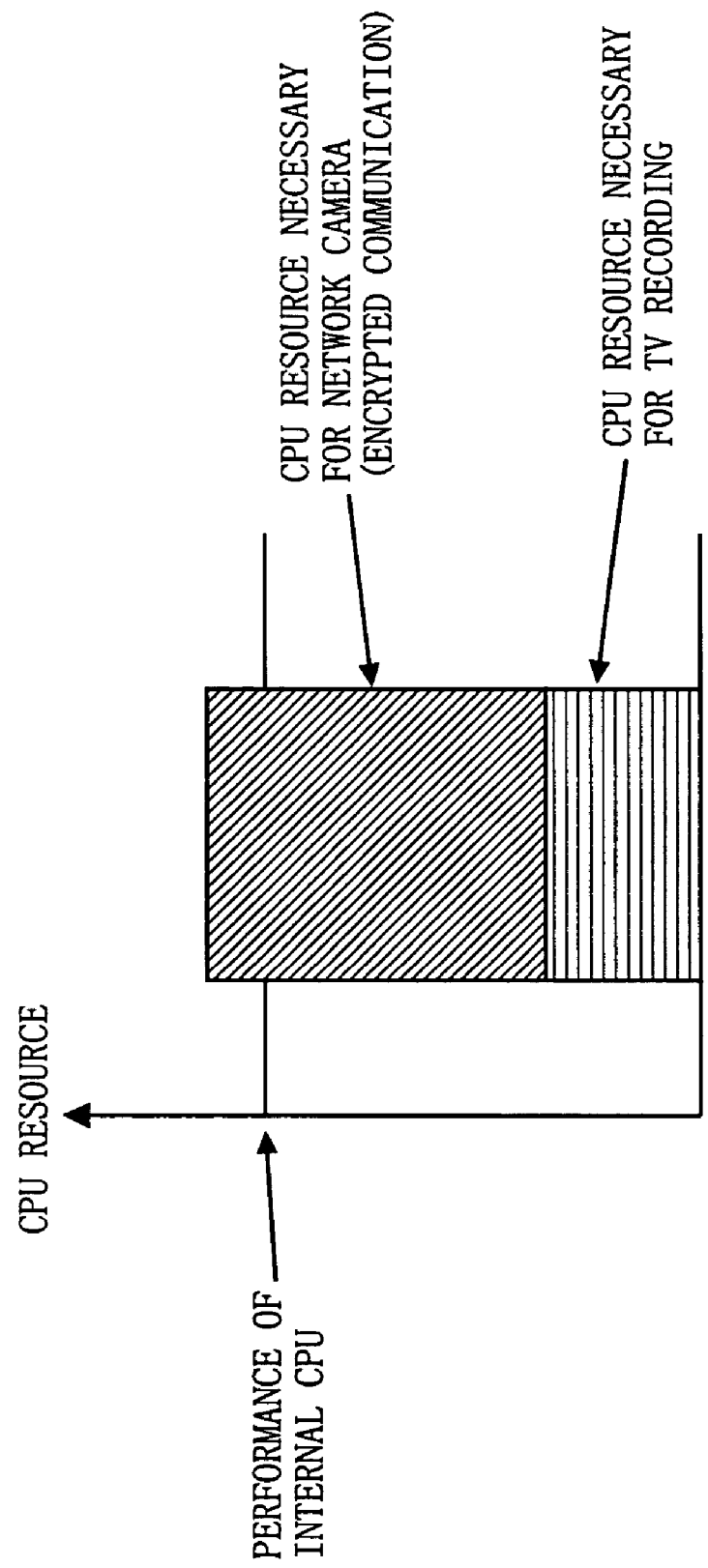
FIG. 44 is a graph illustrating insufficiency of CPU resource when a network camera application and a TV recording are simultaneously carried out.

Next, the preprocess for performing an encrypted communication will be described. As used herein, the preprocess is a process of negotiating an encryption algorithm to be used for the encrypted communication and what should be used as an encryption key and a decryption key between the encryption information determination section 18 in the network camera 12 and the encryption information determination section 32 in the communication device 24, and setting these parameters in the respective encryption/decryption processing sections 16 and 38. Hereinafter, a negotiation performed for preventing the load of the processing to be performed by the internal CPU of the communication device 24 from exceeding the performance of the internal CPU as shown in FIG. 44 will be described.

Figure 2:
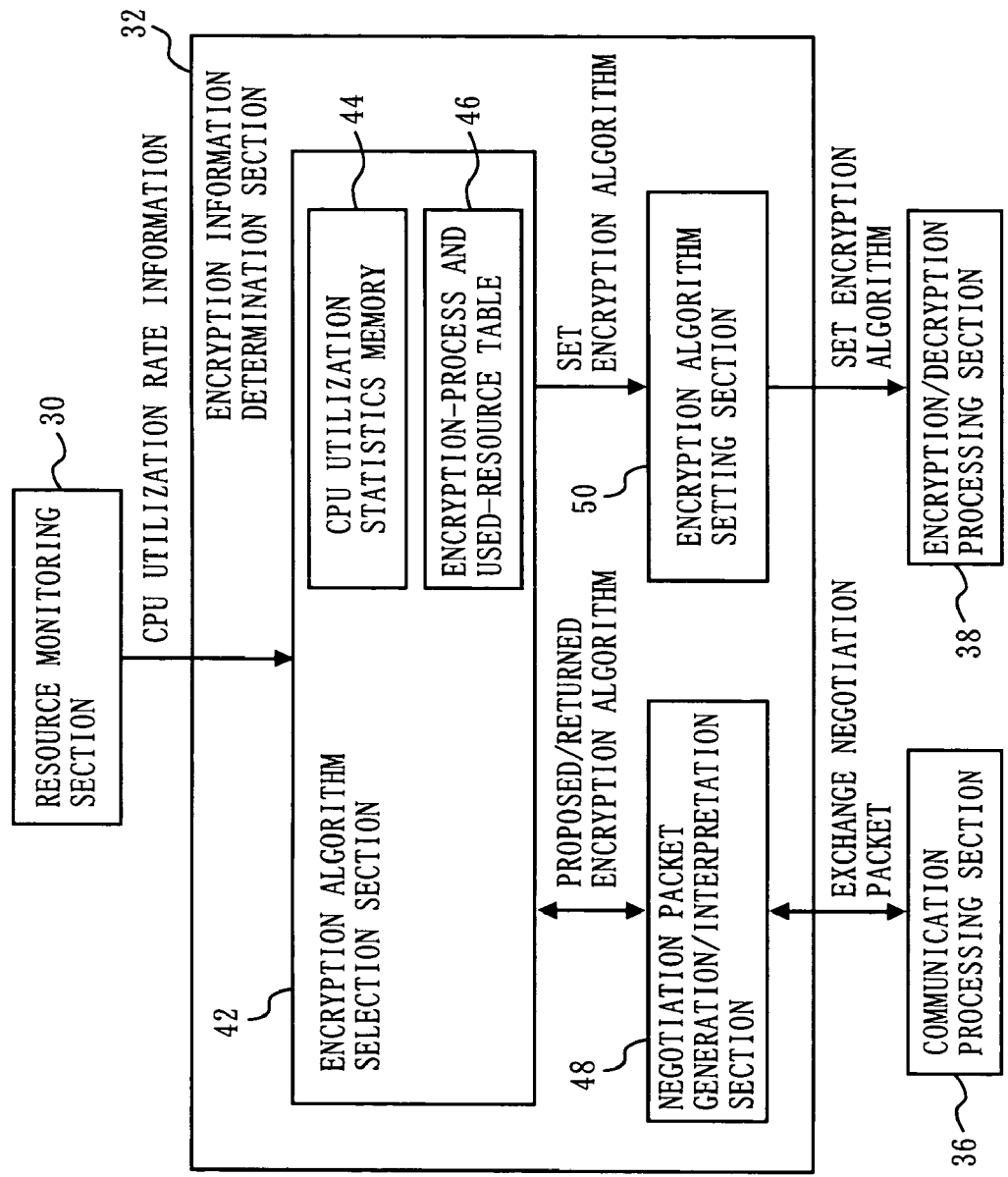
FIG. 2 is a block diagram illustrating a substantial portion of the system according to Embodiments 1 to 4 of the present invention.

FIG. 2 is a block diagram illustrating component elements of the communication device 24 that are involved in the negotiation. In order for the data-transmitting end and the data-receiving end to use the same encryption algorithm, the negotiation is performed between the two ends. The communication processing section 36 performs data packet communications with the counterparting communication processing section. During the encryption algorithm negotiation, packets for the negotiation are exchanged with the counterpart. When transmitting packets, a negotiation packet generation/interpretation section 48 generates a negotiation packet for transmission in a predetermined format in accordance with an instruction from an encryption algorithm selection section 42, and when receiving packets, interprets the content of a received negotiation packet and passes the acquired information to the encryption algorithm selection section 42. The encryption algorithm selection section 42 notifies the determined encryption algorithm to an encryption algorithm setting section 50, and instructs the algorithm to be set. The encryption/decryption processing section 38 uses the set encryption algorithm to perform data encryption and decryption. The encryption algorithm selection section 42 has a CPU utilization statistics memory 44 for storing CPU utilization rate information which was previously obtained from the resource monitoring section 30 or obtained at the time of the negotiation. In the present embodiment, the encryption algorithm selection section 42 performs encryption algorithm proposing and selecting processes while referring to an encryption process and used-resource table 46 and the CPU utilization rate information obtained from the resource monitoring section 30. The encryption process and used-resource table 46 will be described later.

In the present embodiment, after the encryption information determination section 32 generates a negotiation packet and encrypts it, the encrypted negotiation packet is transmitted via the communication processing section 36; however, other embodiments would also be possible. For example, after the encryption information determination section 32 generates a negotiation packet, the encryption/decryption processing section 38 may encrypt the negotiation packet, and the encrypted negotiation packet may be transmitted via the communication processing section 36. Alternatively, for example, the encryption information determination section 32 may generate a negotiation packet; the encryption/decryption processing section 38 may encrypt the negotiation packet; thereafter, the encrypted negotiation packet may be once sent back to the encryption information determination section 32; and the encryption information determination section 32 may transmit the encrypted negotiation packet via the communication processing section 36.

Now, the CPU utilization rate will be discussed. The CPU utilization rate is a percentage representation of the CPU resource used by each individual application, e.g., the video recording application 28 or the network camera application 34, assuming that the CPU has a maximum performance of 100%. While various processing methods are possible for the CPU, most common of all is a method of processing only one task at any given time. In the case where a plurality of tasks are to be processed, such tasks are processed in a time-sharing manner, thereby creating the illusion that they are simultaneously processed in parallel. One method assigns a shorter time for a lighter task and a longer time for a heavier task. Another method uses split processing time units which are short and constant (called "time slots" or "threads"), and assigns time units to heavy tasks more frequently than for lighter tasks. Any time or time unit during which there is plenty of CPU resource and the CPU is not processing any tasks other than commonly-shared processes, such as a monitor program, is detected as an idle state. In such CPU methods, a CPU utilization rate for a task can be measured as follows. By using a monitoring program or the like in the OS for the CPU, it is checked which task is under process, through sampling per relatively short period of time. A case where application A is composed of task A will be discussed. If, out of one thousand checks, task A is found five hundred times while for the other five hundred times the CPU is in a stand-by state, i.e., an idle state, then the CPU utilization rate of application A is 50%. Although the CPU performs commonly-shared kernel processes such as a monitoring program or the like in the OS, such processing is small relative to the overall processing, and therefore is assumed to be negligible for the sake of discussion.

Preferably, a fairly large number of samples are used, and, rather than the instantaneous CPU utilization rate for each particular moment, but a CPU utilization rate that has been leveled out to some extent, e.g., an average CPU utilization rate over a certain period of time up to that moment is measured and used. An instantaneous or short-time CPU utilization rate may greatly fluctuate temporarily, and therefore is unsuitable for calculating the CPU resource which is required by an application.

In the case where the processing by application A comes down in two parts, so as to be executed through task A and a kernel process, if task A is measured five hundred times, the kernel process is measured one hundred times, and the idle state is measured four hundred times, then the CPU utilization rate of application A is 60%. Moreover, task A can be measured to be 50%, whereas the kernel portion can be measured to be 10%. Next, a case where the two processing programs, application A and application B, are executed in parallel will be described. It is assumed that application B also has a portion which is processed in the kernel. Although respective portions from application A and application B are processed in the kernel, it is often the case that only the CPU utilization rate with respect to the overall kernel can be measured. In other words, it is often impossible to distinguish which application is being processed in the kernel, and whether or not a commonly-shared kernel process is being executed. Therefore, in this case, while a total value of the CPU utilization rates for application A and application B can be measured to be what remains after subtracting from 100% the CPU utilization rate for the idle processing, it is impossible to measure individual CPU utilization rates for application A and application B. The reason is that itemized measurements of application A and application B within the kernel process cannot be obtained. While only application A is being executed, if it has already been measured that application A is 60%, task A is 50%, and the kernel portion is 10% as mentioned above, then it is possible to calculate application B, task B, and the portion in the kernel attributable to application B, through subtractions.

Next, the encryption algorithm negotiation process will be specifically described below. Hereinafter, between the encryption information determination section 18 in the network camera 12 and the encryption information determination section 32 in the communication device 24, the one that begins a negotiation will be referred to as an "initiator", whereas the one that responds to the initiator will be referred to as a "responder".

Figure 3:
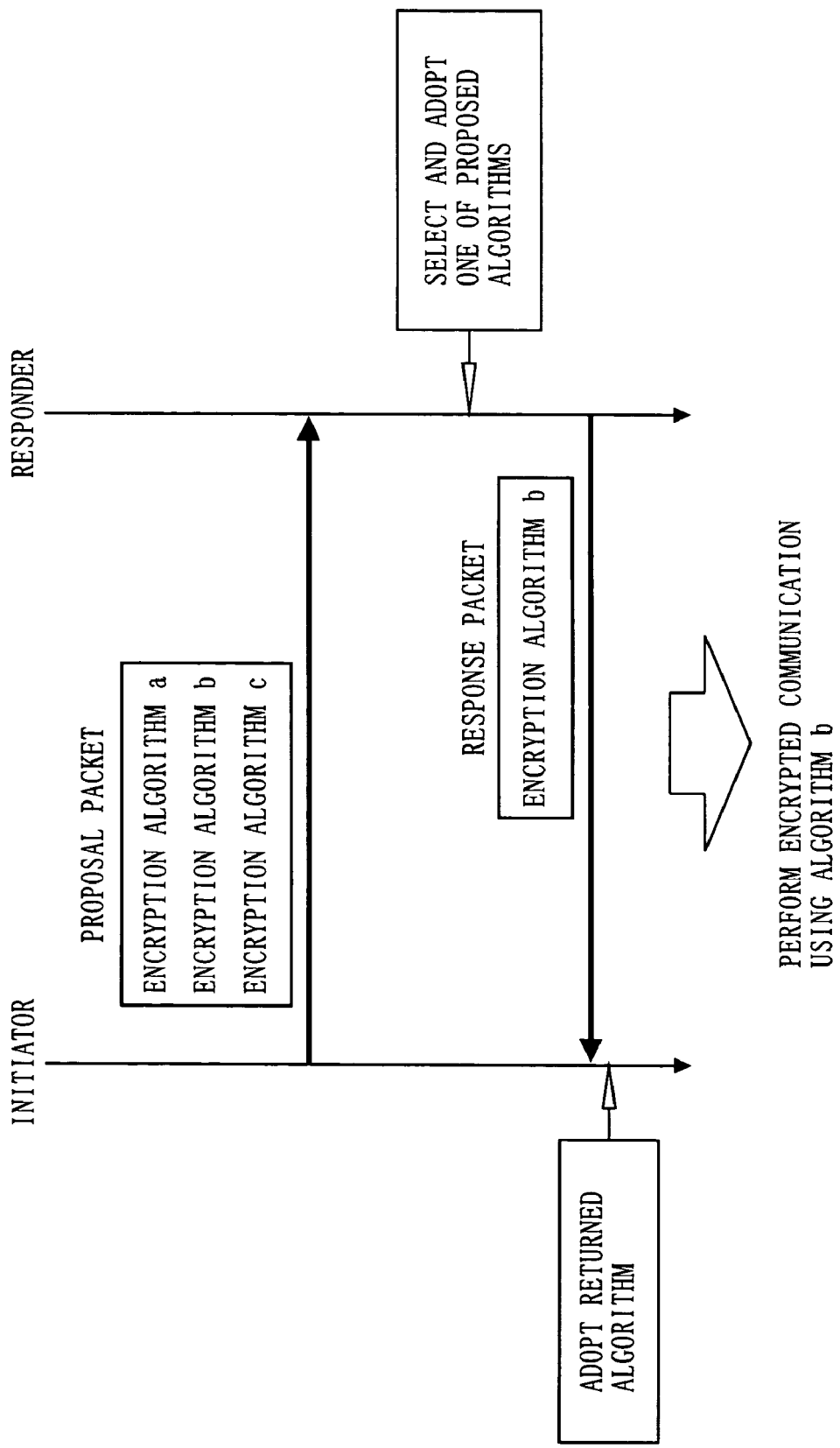
FIG. 3 is a diagram illustrating a method for determining an encryption algorithm through a negotiation.

FIG. 3 is a diagram illustrating a sequence of an encryption algorithm negotiation process. In FIG. 3, the initiator first transmits to the responder a proposal packet containing information concerning a plurality of encryption algorithms (which are herein assumed to be encryption algorithms a, b, and c for example). Upon receiving the proposal packet, the responder selects one of the encryption algorithms (herein assumed to be encryption algorithm b for example), and transmits to the initiator a response packet containing information concerning the selected encryption algorithm. When receiving the response packet from the responder, the initiator adopts the encryption algorithm contained therein (encryption algorithm b). In the above manner, it is promised that the same encryption algorithm (encryption algorithm b) will be used between both the initiator and the responder, whereby it becomes possible to perform encrypted communications.

Note that one encryption algorithm may be proposed by the initiator. The responder does not need to respond if no usable encryption algorithm is included among the proposed encryption algorithms. When the encryption information determination section 32 in the communication device 24 proposes an encryption algorithm as an initiator or selects an encryption algorithm as a responder, the CPU utilization rate information obtained from the resource monitoring section 30 is used; however, the specific procedure thereof will be described later.

The exchange of messages when negotiating an encryption algorithm is not limited to the sequence shown in FIG. 3, but may be performed according to the rules of an existing key exchanging protocol. For example, an encryption algorithm may be negotiated through a defined message sequence, by using a key exchanging protocol IKE (Internet Key Exchange), which is often used in conjunction with IPsec.

Although an example where an encryption algorithm negotiation is performed only once before performing an encrypted communication was illustrated above, the encryption algorithm may be again negotiated in the midst of the encrypted communication.

Next will be described a procedure in which the encryption information determination section 32 in the communication device 24 determines, as an initiator, an encryption algorithm to propose to a responder, and a procedure in which the encryption information determination section 32 in the communication device 24 selects, as a responder, an encryption algorithm to return to the initiator from among the plurality of encryption algorithms proposed by the initiator. There are various kinds of encryption algorithms, and the load associated with the encryption/decryption processes and the encryption strength (which indicates the difficulty to decipher the code) varies depending on the encryption algorithm. Therefore, as an encryption algorithm to be used for the encryption of video from the network camera, the present embodiment basically selects one that has as high an encryption strength as possible for enhanced security in the case where the CPU performance is more than sufficient, and selects one that requires a low processing load in the case where the CPU performance is less than sufficient so that the CPU resource will not become insufficient.

<The Case Where the Communication Device 24 Works as a Responder>

Figure 4:
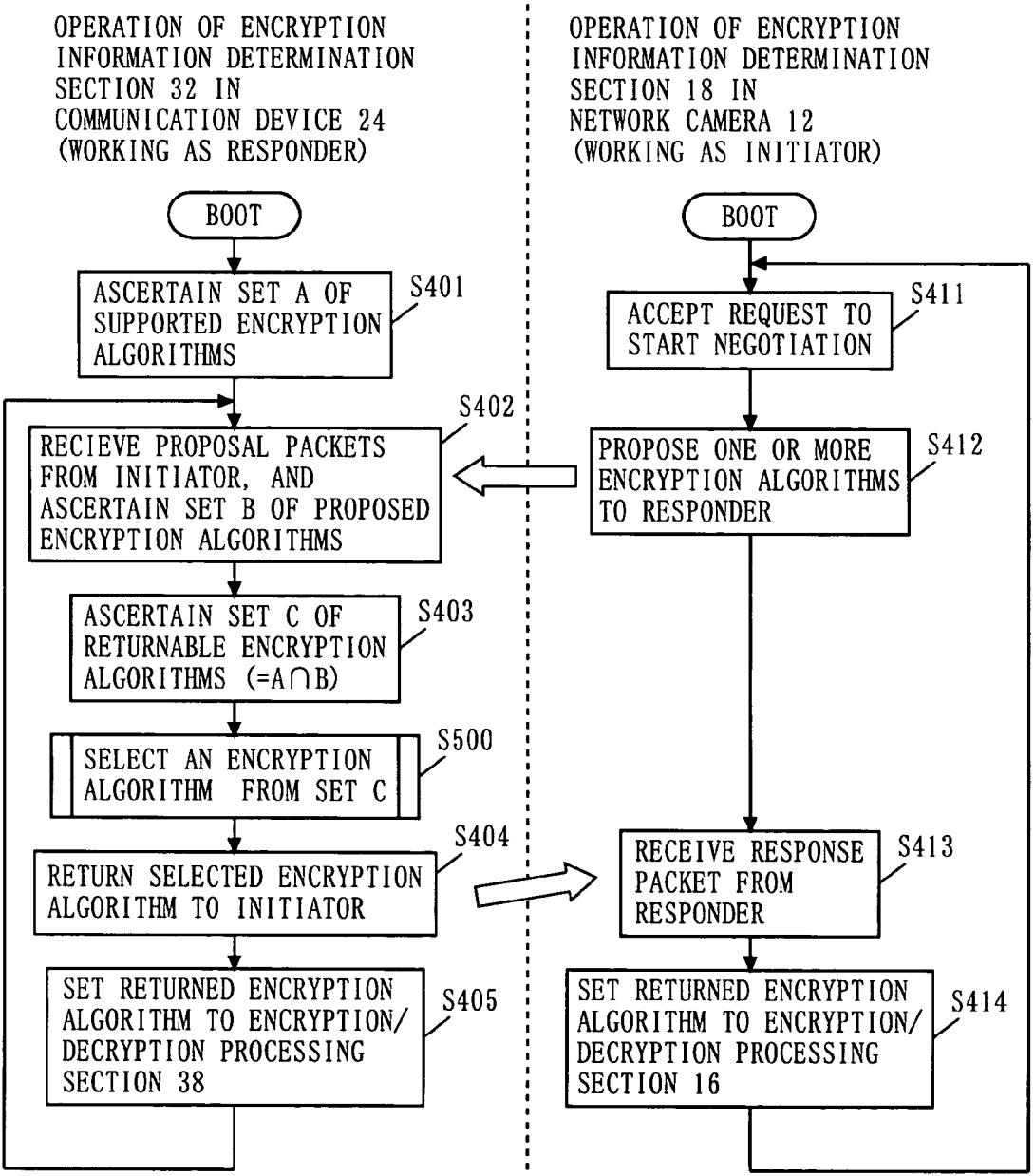
FIG. 4 is a flowchart illustrating the operation of an encryption information determination section in the case of performing an encryption algorithm negotiation as a responder according to Embodiment 1 of the present invention.
Figure 5:
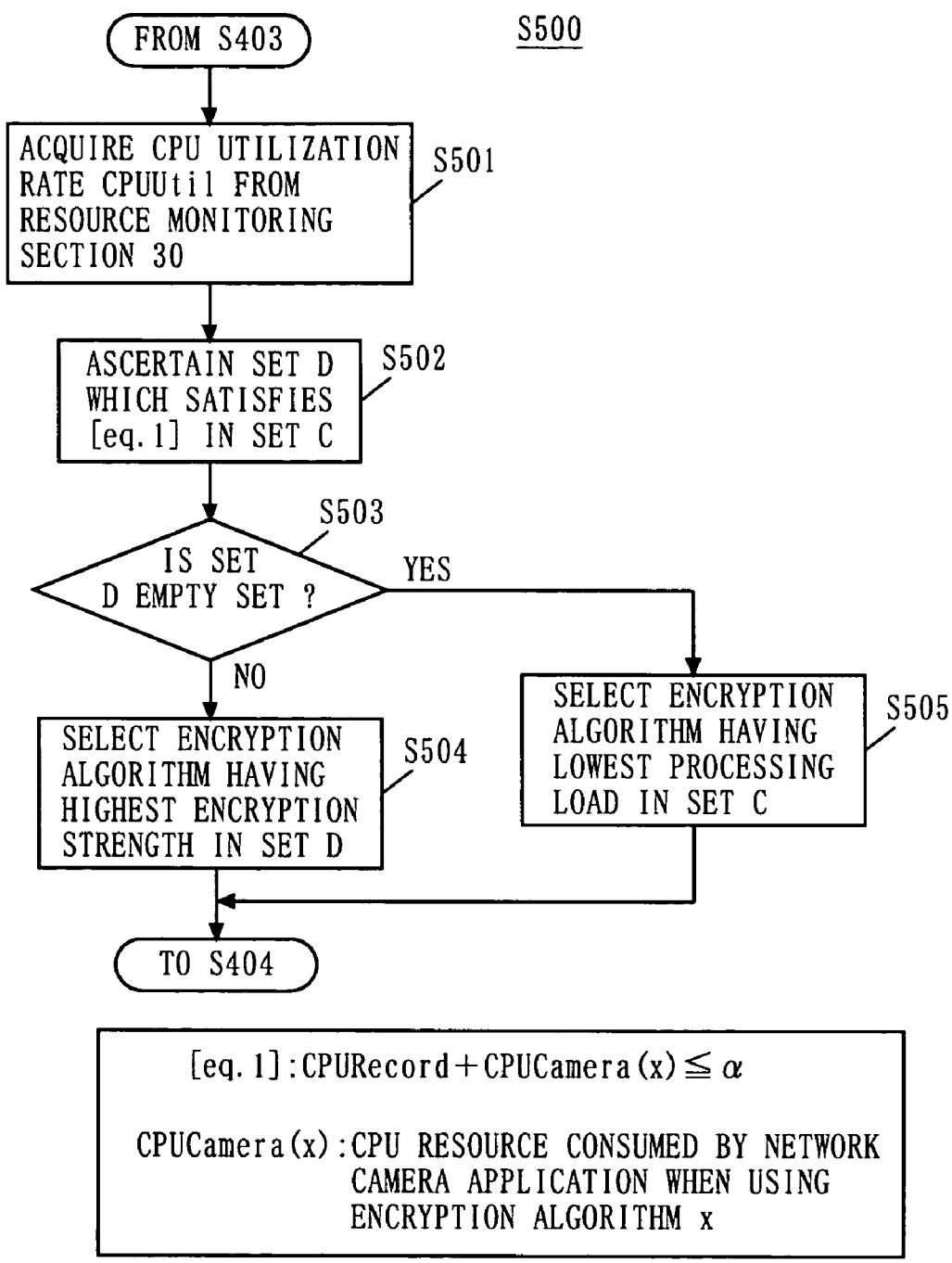
FIG. 5 is a more detailed flowchart illustrating a portion of the process shown in FIG. 4.

FIG. 4 and FIG. 5 are flowcharts in the case where the encryption information determination section 32 in the communication device 24 works as a responder. Hereinafter, descriptions will be given with reference to the flowchart of FIG. 4 first.

First, the encryption information determination section 32 in the communication device 24 (hereinafter "responder") ascertains a set of encryption algorithms (set A) supported by the encryption/decryption processing section 38 (S401). At this point, it enters a state of waiting for a proposal packet from the encryption information determination section 18 in the network camera 12 (hereinafter "initiator").

First, the initiator waits for a request to start negotiation. A request to start negotiation is issued when starting an encrypted communication, after the lapse of a predetermined period of time from a previous negotiation, or when a negotiation start command is executed. Upon receiving a request to start negotiation (S411), the initiator begins negotiation. In other words, the initiator transmits to the responder a packet containing one or more proposals of encryption algorithms (S412). The responder which has received this proposal packet reads the proposed encryption algorithms (set B) from the packet (S402). Returnable encryption algorithms (set C) are those among the proposed encryption algorithms (set B) which are supported by the encryption/decryption processing section 38 (set A), and therefore can be ascertained as C=A∩B (S403).

Next is a step of selecting an encryption algorithm to return to the responder (S500). The details of step S500 will be described with reference to the flowchart of FIG. 5.

It is assumed herein that the video recording application 28 and the network camera application 34 are the only applications to utilize the CPU. It is also assumed that, at this point, only the video recording application 28 is already utilizing the CPU, and the network camera application 34 has not been activated and is not utilizing the CPU yet.

First, the responder acquires a CPU utilization rate CPUUtil from the resource monitoring section 30 (S501). The CPUUtil represents a CPU utilization rate by an application which is being executed at a given point (or a total of such, in the case where there are a plurality of applications). However, as already described, a CPU utilization rate that has been leveled out to some extent (e.g., an average CPU utilization rate over a predetermined period of time up to that moment) is used as the CPU utilization rate which is notified by the resource monitoring section 30 to the encryption information determination section 32, rather than the instantaneous CPU utilization rate of that moment. The reason is that, an instantaneous CPU utilization rate is very susceptible to temporary fluctuations in the CPU utilization rate, and therefore cannot provide a suitable determination criterion for selecting an encryption algorithm to be used for a predetermined period of time.

Next, among the returnable encryption algorithms (set C), those encryption algorithms which satisfy (eq. 1) below (set D) are ascertained (S502).

$$CPURecord+CPUCamera(x) \leq \alpha \qquad (eq.\ 1)$$

Herein, CPURecord represents the CPU resource consumed by the video recording application 28, and CPUCamera represents the CPU resource required by the network camera application 34 when performing an encrypted communication using an encryption algorithm x. Therefore, (eq. 1) being satisfied means that the average CPU utilization rate is equal to or less than $\alpha[\%]$ even if a TV recording and an encrypted communication using encryption algorithm x are simultaneously performed, and therefore that both tasks will be properly executed. As for the value of $\alpha$, a value such as 95% is previously set. The encryption information determination section 32 acquires at step S501 a CPU utilization rate for each of the plurality of encryption algorithms from the resource monitoring section 30, because such is necessary for calculating the CPU resource which is required in the entire system when performing code processing, and carries out at step S502 a total processing load estimation procedure of estimating a total processing load (CPURecord+CPUCamera(x)). Moreover, in order to ascertain encryption algorithms (set D) which satisfy (eq. 1), a comparison procedure of comparing the aforementioned total processing load against a as a first reference value is carried out for each encryption algorithm at step S502.

Figure 6:
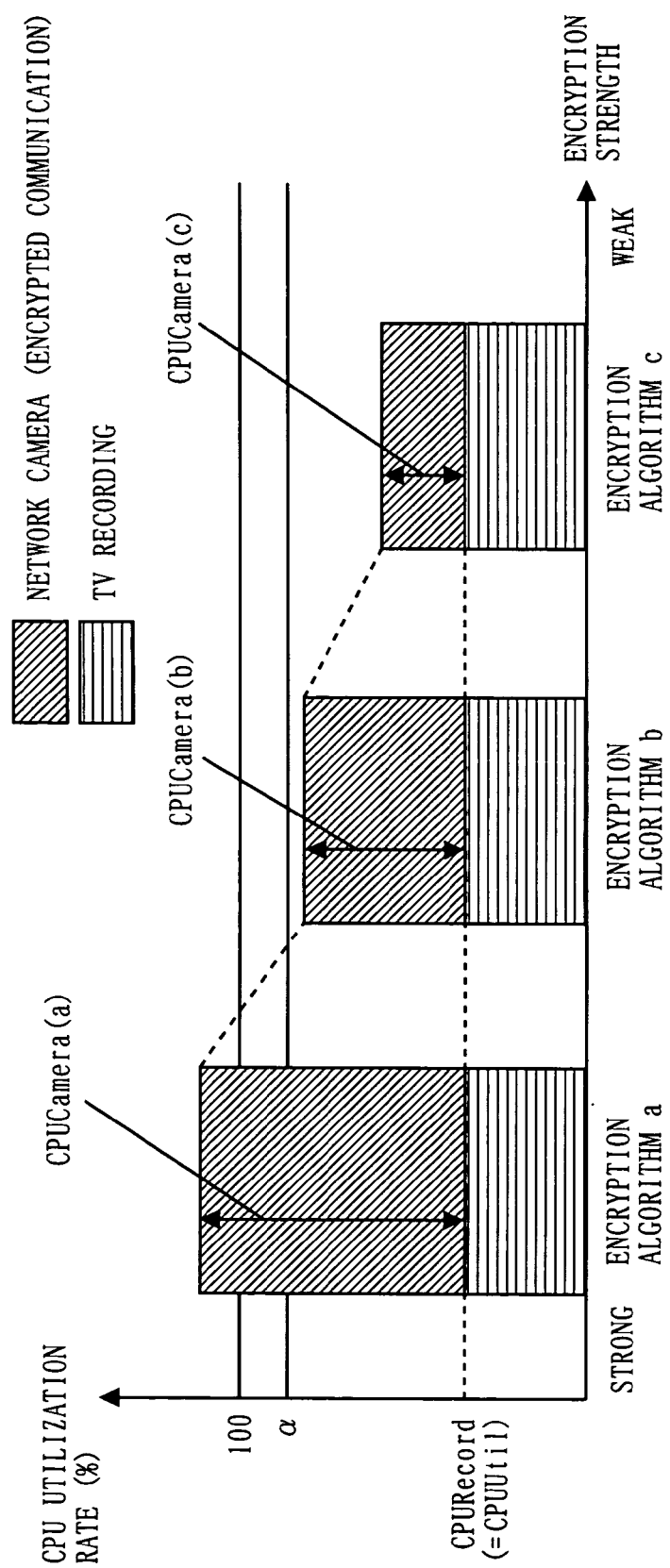
FIG. 6 is a graph illustrating differences in CPU utilization rate depending on encryption algorithms.

FIG. 6 illustrates an example where the members of set C are encryption algorithms a, b, and c. In this case, encryption algorithms (set D) which satisfy (eq. 1) are encryption algorithm b and encryption algorithm c.

By using the aforementioned concept of the CPU utilization rate, CPURecord and CPUCamera(x) can be ascertained in the following manner. Firstly, CPURecord=CPUUtil because it is only the video recording application 28 that is utilizing the CPU at this point. Meanwhile, CPUCamera(x) can be determined as CPUCamera(x)=CPUCameraConst+CPUCameraEnc(x). Herein, CPUCameraConst is the CPU resource which is consumed by the network camera application 34 for any processing other than the code processing. CPUCameraEnc(x) is the CPU resource which is consumed by the code processing when encryption algorithm x is used.

CPUCameraEnc(x) can be determined in the following manner, by assuming that it is in proportion with a communication speed in the application layer: CPUCameraEnc(x)=(CameraRate/EncRate(x))×100[%]. Herein, CameraRate is a communication speed, in the application layer, of the communication which is performed by the network camera application 34. EncRate(x) is the communication speed in the application layer when the internal CPU is utilized 100% for only the encrypted communication processing using encryption algorithm x.

It is assumed that the values of CPUCameraConst and CameraRate used herein are given by the system, rather than being measured. Moreover, the encryption process and used-resource table 46 as shown in FIG. 7 is provided in the encryption information determination section 32, as shown in FIG. 2. In the encryption process and used-resource table 46, the order of encryption strengths of encryption algorithms are stored together with their respective EncRate(x). Thus, it is possible to ascertain EncRate(x) from encryption algorithm x.

The above illustrates a case where the network camera application 34 has not been started yet. In the case where the network camera application 34 has already been started, using an encryption algorithm z, the CPU resource necessary for the video recording application 28 can be ascertained as CPURecord=CPUUtil−CPUCamera(z). In the case where a value of CPURecord is given by the system, that value may also be used. Alternatively, CPURecord may be an average CPU utilization rate over a period during which only the video recording application 28 was previously being executed on this CPU. CPUCamera(x) may be an average CPU utilization rate over a period during which only the network camera application 34, using encryption algorithm x, was previously being executed on this CPU. In that case, such CPU utilization rate information is stored in the CPU utilization statistics memory 44 shown in FIG. 2.

Note that CPURecord(%) can be restated as: (average used CPU resource for TV recording (MIPS, or megainstructions/second)/CPU resource (MIPS))*100(%). CPUCameraConst(%) can be restated as: (average used CPU resource for camera application (MIPS)/CPU resource (MIPS))*100. CameraRate(Mbps) can be restated as an average data transfer amount for the camera application. EncRate(x) (Mbps) can be restated as: maximum CPU resource (MIPS)/average CPU resource (MIPS/Mbps) necessary for encrypting 1 Mbps of data using encryption algorithm x.

Next, it is determined whether set D is an empty set, i.e., whether there exists any encryption algorithm that satisfies (eq. 1)(S503). If it is an empty set, i.e., there exists no encryption algorithm that satisfies (eq. 1), it means that the CPU resource will be insufficient regardless of which encryption algorithm is used. Therefore, in order to minimize the CPU processing load, one of the returnable encryption algorithms (set C) that requires the lowest processing load is selected (S505).

On the other hand, if set D is not an empty set, one of the encryption algorithms that has the highest encryption strength is selected (S504). In the example of FIG. 6, between encryption algorithms b and c which are contained in set D, encryption algorithm b is selected because it has a higher encryption strength. The information concerning processing loads and encryption strengths of encryption algorithms can be obtained from the encryption process and used-resource table 46 shown in FIG. 7. At step S503 and step S504, a selection procedure is being carried out which selects one or more encryption algorithms whose total processing load is less than the aforementioned first reference value.

In the present embodiment, the encryption algorithm in set C that has the lowest processing load is returned in the case where set D is an empty set; however, the CPU performance might be exceeded in this case. Therefore, in the case where precedence is to be given to the video recording application 28, the network camera application 34 may not be started, or if it has already been started, stopped, by not transmitting a response packet to the initiator. Alternatively, the video from the camera can be decimated so as to be transferred at a lower image quality.

Referring back to FIG. 4, the responder transmits to the initiator a response packet containing information concerning the encryption algorithm selected at step S500 (S404).

Next, in order to actually use the returned encryption algorithm, the responder sets the encryption algorithm in the encryption/decryption processing section 38 (S405). On the other hand, the initiator receives the response packet from the responder (S413), and sets the returned encryption algorithm in the encryption/decryption processing section 16 in the network camera 12 (S414).

Thereafter, the network camera 12 converts the video data imaged by the imaging section 14 into encrypted data by using the encryption function of the encryption algorithm that has been set in the encryption/decryption processing section 16, and appends thereto an identifier of the encryption algorithm, or an identification ID of information SA, i.e., a so-called security association which specifies the encryption algorithm and keys, that are set in the encryption information determination section 18. Then, the encrypted data is sent out on the Internet 22 as packets, via the communication processing section 20. The communication processing section 36 of the communication device 24 receives the packets, and based on the appended identifier of the encryption algorithm, or the identification ID of SA, performs decryption by means the encryption/decryption processing section 38 using the encryption algorithm that has been negotiated and agreed upon, and displays the resultant video data on the display 40.

<The Case Where the Communication Device 24 Works as an Initiator>

Figure 9:
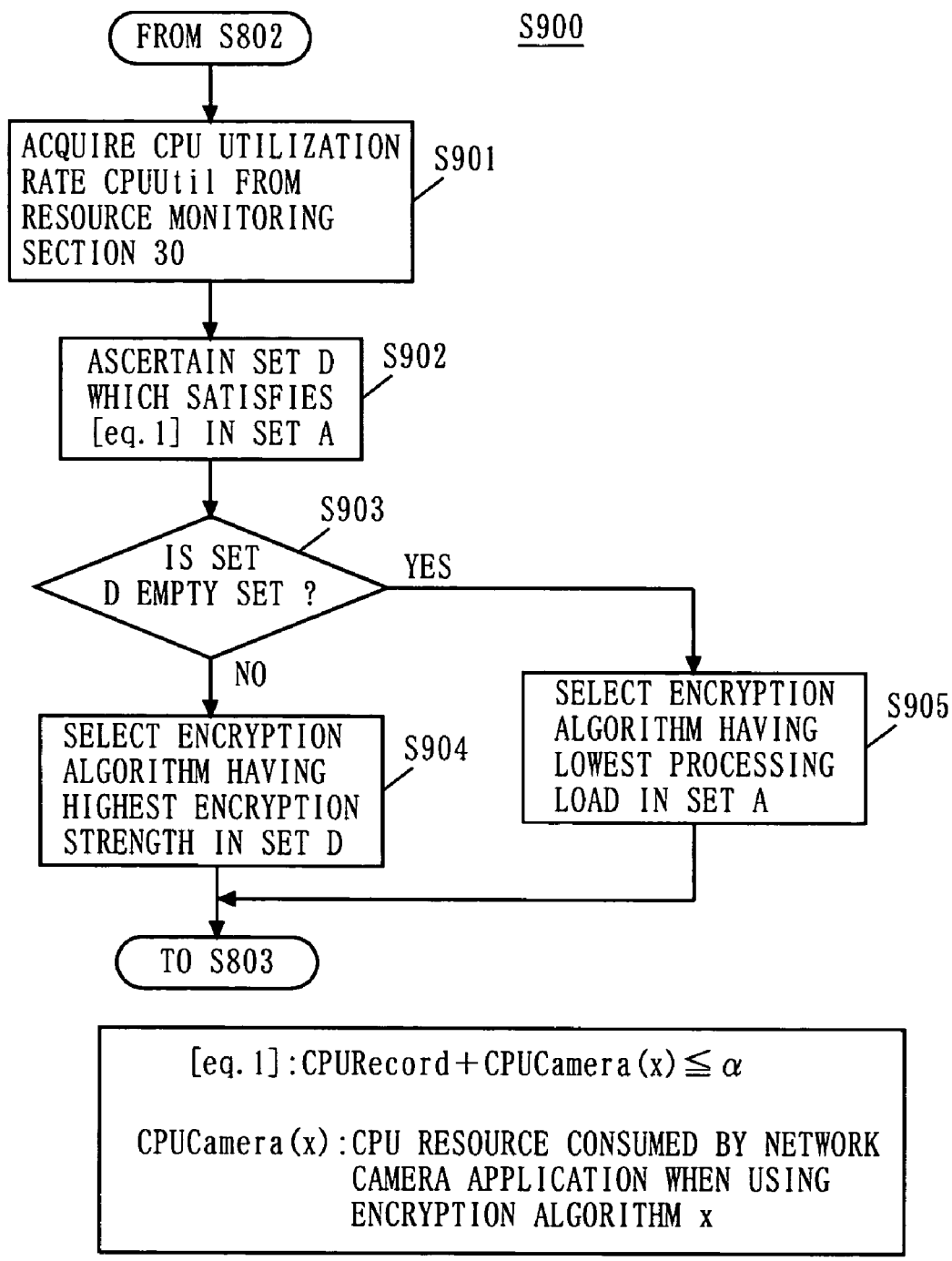
FIG. 9 is a more detailed flowchart illustrating a portion of the process shown in FIG. 8.

Next, a procedure in the case where the encryption information determination section 32 in the communication device 24 works as an initiator to perform a negotiation with the encryption information determination section 18 in the network camera 12 will be described. FIG. 8 and FIG. 9 are flowcharts illustrating the operation procedure in this case. Hereinafter, descriptions will be given with reference to the flowchart of FIG. 8 first.

First, the encryption information determination section 32 in the communication device 24 (hereinafter "initiator") ascertains encryption algorithms supported by the encryption/decryption processing section 38 (set A) (S801). Then, the initiator waits for a request to start negotiation. A request to start negotiation is issued when starting an encrypted communication, after the lapse of a predetermined period of time from a previous negotiation, or when a negotiation start command is executed.

Upon accepting a request to start negotiation (S802), the initiator selects an encryption algorithm on the basis of CPU utilization rates (S900). As shown from steps S901 to S905 in FIG. 9, the detailed procedure of step S900 is substantially the same as that in the case where the communication device 24 works as a responder (step S500 in FIG. 4, i.e., FIG. 5), and the descriptions thereof are omitted here. The only difference is whether the set from which to select an encryption algorithm is the returnable encryption algorithms (set C) or the supported encryption algorithms (set A).

Next, the initiator proposes a selected encryption algorithm to the responder (S803).

At the responder, encryption algorithms supported by the encryption/decryption processing section 16 (set E) are previously ascertained (S811). Thereafter, when a proposal packet is received from the initiator (S812), it is determined whether the encryption/decryption processing section 16 supports the proposed encryption algorithm (i.e., whether the proposed encryption algorithm is contained in set E) (S813). If the proposed encryption algorithm is not supported by the encryption/decryption processing section 16 (i.e., the proposed encryption algorithm is not contained in set E), a response cannot be returned to the initiator; therefore, the negotiation fails, and a next proposal packet is awaited. If the proposed encryption algorithm is supported by the encryption/decryption processing section 16 (i.e., the proposed encryption algorithm is contained in set E), the encryption algorithm is returned to the initiator (S814), and the returned encryption algorithm is set in the encryption/decryption processing section 16 (S815).

At the initiator, upon receiving the response packet (S804), the returned encryption algorithm is set in the encryption/decryption processing section 38 (S805).

Thus, according to the present embodiment, when selecting an encryption algorithm to be returned to the initiator, or when selecting an encryption algorithm to be proposed to the responder, one that has the highest encryption strength without allowing the CPU resource to become insufficient can be selected. As a result, while maintaining the firmest possible security, insufficiency of CPU resource can be prevented in the case where an application which requires encrypted communications, such as the network camera application 34, is performed in parallel with another process, such as a TV recording.

Although the number of encryption algorithms to be proposed to the responder is illustrated as one in the present embodiment, other encryption algorithms may also be proposed by assigning lower priority to them.

The present embodiment assumes that a TV recording is the only application other than the network camera application 34. In the case where other applications exist in addition to TV recording, however, similar processing would become possible by replacing the aforementioned "CPURecord" with "a total of CPU utilization rates used by all applications other than the encrypted communication which is the subject of encryption algorithm negotiation".

In the above illustration of the present embodiment, it was mentioned that "in the case where the network camera application 34 has already been started, using an encryption algorithm z, the CPU resource necessary for the video recording application 28 can be ascertained as CPURecord=CPUUtil−CPUCamera(z)". However, in the case where CPUUtil exceeds α[%], this method would underestimate CPURecord (for the reason described below); hence, even by performing an encrypted communication using an encryption algorithm selected at step S502 or S902, the CPU utilization rate may exceed α[%]. In order to avoid this problem, if the CPU utilization rate acquired at step S501 or S901 exceeds α[%], the encryption algorithm that has the lowest processing load in set C (in the case of the responder) or in set A (in the case of the initiator) may be selected.

If "CPUUtil exceeds α[%]", it means that the CPU resource required by the video recording application 28 is not being completely secured when a measurement of CPUUtil is taken. This will be explained in a specific example: assume that CPURecord, i.e., the CPU resource necessary for performing a TV recording is 80%; CPUCamera(z), i.e., the CPU resource required by the network camera application 34 when using encryption algorithm z is 40%; and α=95%. When the CPU is performing a TV recording and the network camera application 34 (which involves code processing), the necessary CPU resource would be 80%+40%=120%. However, since the CPU utilization rate will never be above 100%, the measurement CPUUtil of the CPU utilization rate would be taken to be a value near 100% (i.e., a value above α=95%, such as 98%). In this case, the TV recording and the network camera application 34 are not properly operating. If CPURecord is calculated based on the CPUUtil which has been measured in such a situation, CPURecord=CPUUtil−CPUCamera(z) would read 98%−40%=56%; that is, what is actually 80% is being erroneously calculated to be 56%. In other words, CPURecord is being underestimated relative to its actual value. Now, if there exists an encryption algorithm such that CPUCamera(y)=30%, for example, it follows that CPURecord+CPUCamera(y)=56%+30%=86%<95%(α), so it should be possible to select encryption algorithm y. However, since the actual CPU resource which is necessary for performing the TV recording is 80%, the CPU resource which is actually necessary for performing the TV recording and the network camera application 34 would be 80%+30%=110%>α; again, they cannot properly operate. Stated otherwise, when the measurement indicates CPUUtil>α, there is no guarantee that sufficient CPU resource is assigned to the applications which are under execution at that point. Therefore, when it is determined that CPUUtil>α and thus it is presumable that proper operations are not being attained, the actual CPURecord cannot be ascertained and therefore an appropriate encryption algorithm cannot be selected, which justifies selecting an encryption algorithm that has the lowest processing load, because it holds a relatively high likelihood that proper operations are obtained after the encryption algorithm is changed. Needless to say, selecting an encryption algorithm having the lowest processing load will not necessarily guarantee proper operations; therefore, in this case, a mode for reporting abnormal operation may be entered. In this mode, the processing of any non-urgent application may be paused or processed at a slower processing speed, for example, in order to secure the necessary CPU resource.

Embodiment 2

Next, Embodiment 2 will be described. However, descriptions of any portion that is not different from Embodiment 1, e.g., the overall system structure, will be omitted, and the figures for Embodiment 1 will be relied upon. The only difference from Embodiment 1 is the procedure of selecting an encryption algorithm, and therefore this portion will be described below.

Unlike in Embodiment 1, Embodiment 2 will illustrate a method which can be applied even to the case where the CPU resource necessary for performing the network camera application 34 is not known.

<The Case Where Communication Device 24 Works as a Responder>

Figure 10:
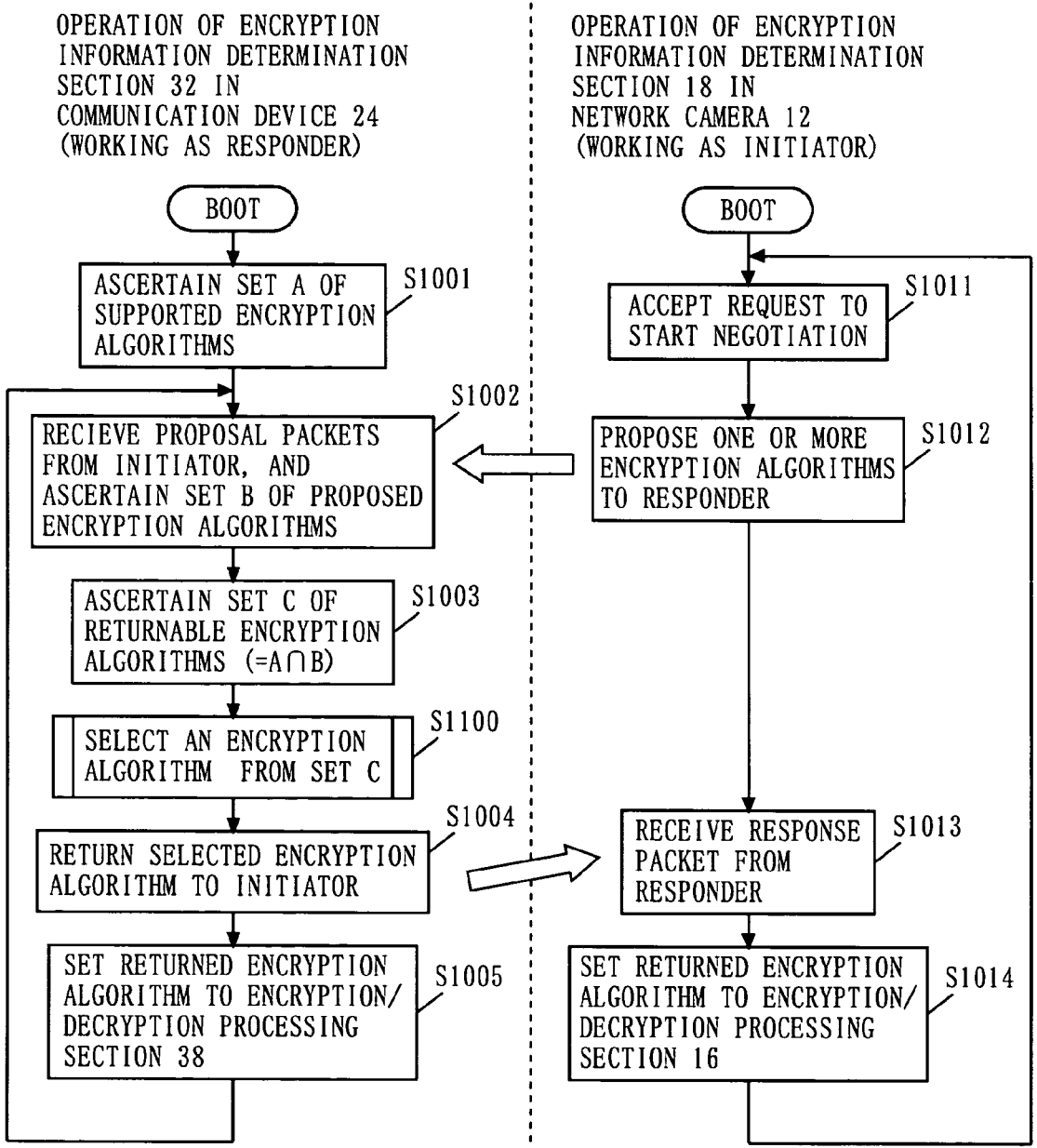
FIG. 10 is a flowchart illustrating the operation of the encryption information determination section in the case of performing an encryption algorithm negotiation as a responder according to Embodiment 2 of the present invention.
Figure 11:
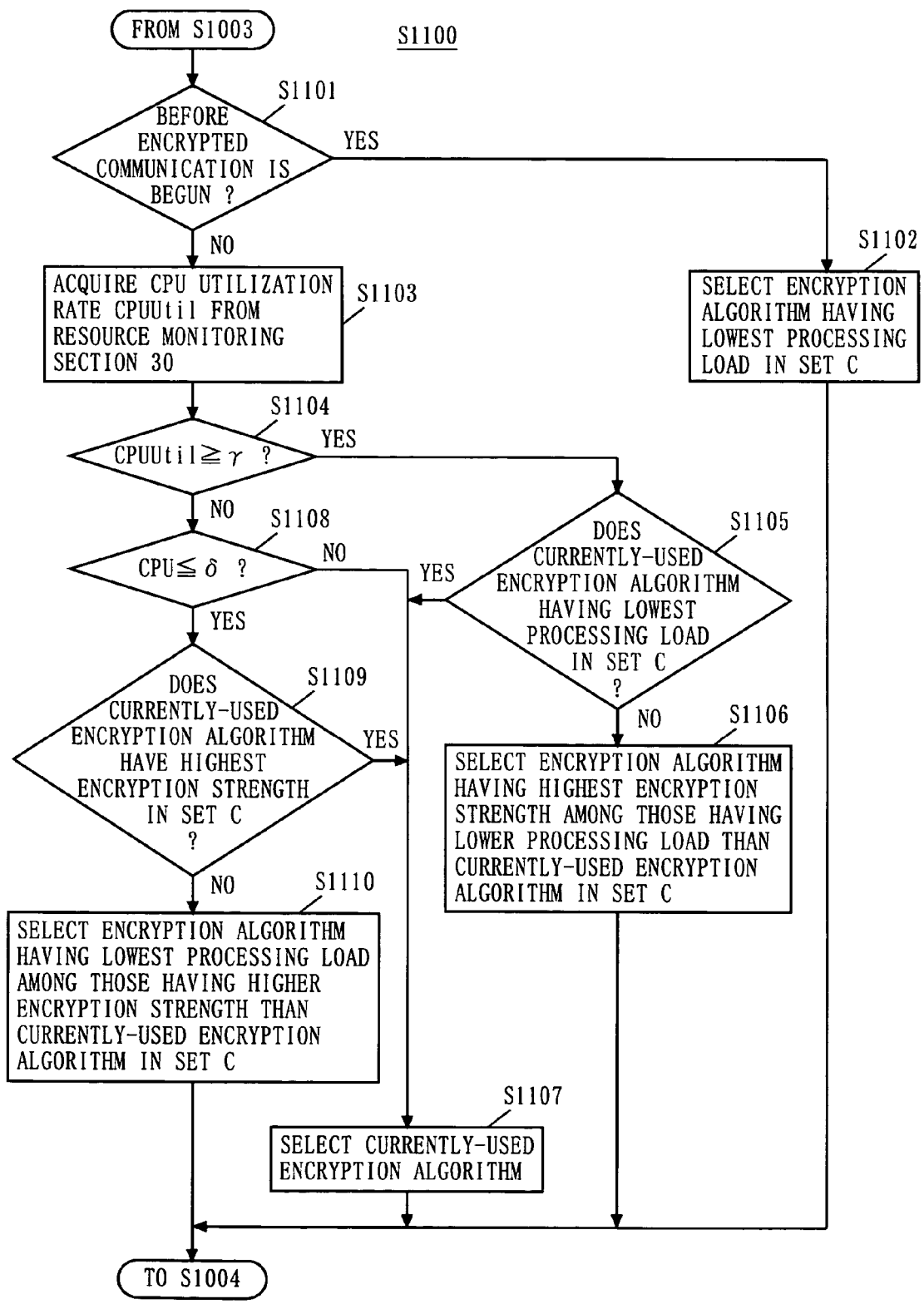
FIG. 11 is a more detailed flowchart illustrating a portion of the process shown in FIG. 10.

FIG. 10 and FIG. 11 are flowcharts in the case where the encryption information determination section 32 in the communication device 24 works as a responder. Hereinafter, descriptions will be given with reference to the flowchart of FIG. 10 first.

First, the encryption information determination section 32 in the communication device 24 (hereinafter "responder") ascertains the encryption algorithms supported by the encryption/decryption processing section 38 (set A) (S1001). Thus, it enters a state of waiting for a proposal packet from the encryption information determination section 18 in the network camera 12 (hereinafter "initiator").

First, the initiator accepts a request to start negotiation (S1011), and begins negotiation. In other words, the initiator transmits to the responder a packet containing one or more proposals of encryption algorithms (S1012). The responder which has received this proposal packet reads the proposed encryption algorithms (set B) from the packet (S1002). The encryption algorithms (set C) which can be returned from the responder are those among the encryption algorithms (set B) proposed by the initiator which are supported by the encryption/decryption processing section 38 (set A), and therefore can be ascertained as C=A∩B (S1003).

Next, the responder selects an encryption algorithm from set C (S1100). The details of step S1100 will be described with reference to the flowchart of FIG. 11.

First, the responder determines whether the encryption algorithm negotiation is to come before an encrypted communication is begun (S1104). If it is to come before an encrypted communication is begun, the encryption algorithm having the lowest processing load in set C is returned, thus giving priority to the reduction of CPU load over the encryption strength (S1102).

If an encrypted communication has already been begun, the responder switches the encryption algorithm to return depending on the CPU utilization rate at that moment. First, a CPU utilization rate CPUUtil in the current state, i.e., including the encryption algorithm which is currently in use or the like, is acquired from the resource monitoring section 30 (S1103). Next, as threshold values for switching the encryption algorithm, two values $\gamma[\%]$ and $\delta[\%]$ ($\gamma \geq \delta$) are used. The values of $\gamma$ and $\delta$ are previously set, e.g., 90[%] and 70[%]. If $\delta < CPUUtil < \gamma$, it is determined that the CPU utilization rate is neither too high nor too low and therefore is appropriate, and the currently-used encryption algorithm is selected (S1104, S1108, S1107).

If CPUUtil$\geq \gamma$ (S1104), the responder determines that the CPU load is too high, and selects an encryption algorithm which has a lower CPU load than that of the currently-used encryption algorithm. However, in order to use the firmest possible encryption algorithm, if any encryption algorithms exist which have lower CPU loads than that of the currently-used encryption algorithm, the one having the highest encryption strength is selected among them (S1105, S1106). If the currently-used encryption algorithm has the lowest load in set C, that encryption algorithm is selected (S1105, S1107).

If CPUUtil$\leq \delta$ (S1104, S1108), the responder determines that there is plenty of CPU resource, and in the case where there is an encryption algorithm having a higher encryption strength than that of the currently-used encryption algorithm, that encryption algorithm is selected (S1109, S1110). However, in order to prevent the CPU load from undergoing a sudden soar, an encryption algorithm that has the lowest processing load among the encryption algorithms which have higher encryption strength than that of the currently-used encryption algorithm is selected. If the currently-used encryption algorithm has the highest encryption strength in set C, that encryption algorithm is selected (S1109, S1107).

In step S1103, it is assumed that the CPU utilization rate CPUUtil is previously ascertained through a procedure of calculating, at an arbitrary point in time during code processing, an average value of the CPU utilization rate which has been measured for a predetermined period up to that point. Alternatively, the CPU utilization rate CPUUtil may be calculated at step S1103. Step S1104 involves a procedure of comparing the CPU utilization rate against a second reference value $\gamma$. Step S1105 and step S1106 involve comparison procedures such that, if the CPU utilization rate is higher than the second reference value, one or more encryption algorithms which have a lower load than that of the encryption algorithm which is being used at that moment is selected.

At step S1106, step S1109, and step S111, an encryption algorithm is selected on the basis of encryption strengths. To that end, before or during these steps, a procedure of ascertaining the order of encryption strengths is performed. In the encryption process and used-resource table 46 shown in FIG. 7, the order of encryption strengths of encryption algorithms are stored together with their respective EncRate (x), as encryption strength data. By referring to this encryption strength data, selection of an encryption algorithm on the basis of encryption strengths is facilitated.

Step S1108 involves a procedure of comparing the CPU utilization rate against a third reference value $\delta$. Step S1109 and step S1110 CPU involve a procedure of, in the case where the utilization rate is lower than the third reference value, selecting one or more encryption algorithms which have a higher encryption strength than that of the encryption algorithm which is being used at that moment.

At step S1104 and step S1108, the CPU utilization rate is compared against the second reference value $\gamma$ and the third reference value $\delta$, and if the CPU utilization rate is lower than the second reference value $\gamma$ and higher than the third reference value $\delta$, a procedure of selecting the encryption algorithm which is being used at that moment is performed at step S1107.

Referring back to FIG. 10, the responder returns to the initiator the encryption algorithm selected at step S1100 (S1004).

Next, in order to actually use the returned encryption algorithm, the responder sets the encryption algorithm in the encryption/decryption processing section 38 (S1005). On the other hand, the initiator receives a response packet from the responder (S1013), and sets the returned encryption algorithm in the encryption/decryption processing section 16 in the network camera 12 (S1014).

<The Case Where the Communication Device 24 Works as an Initiator>

Figure 13:
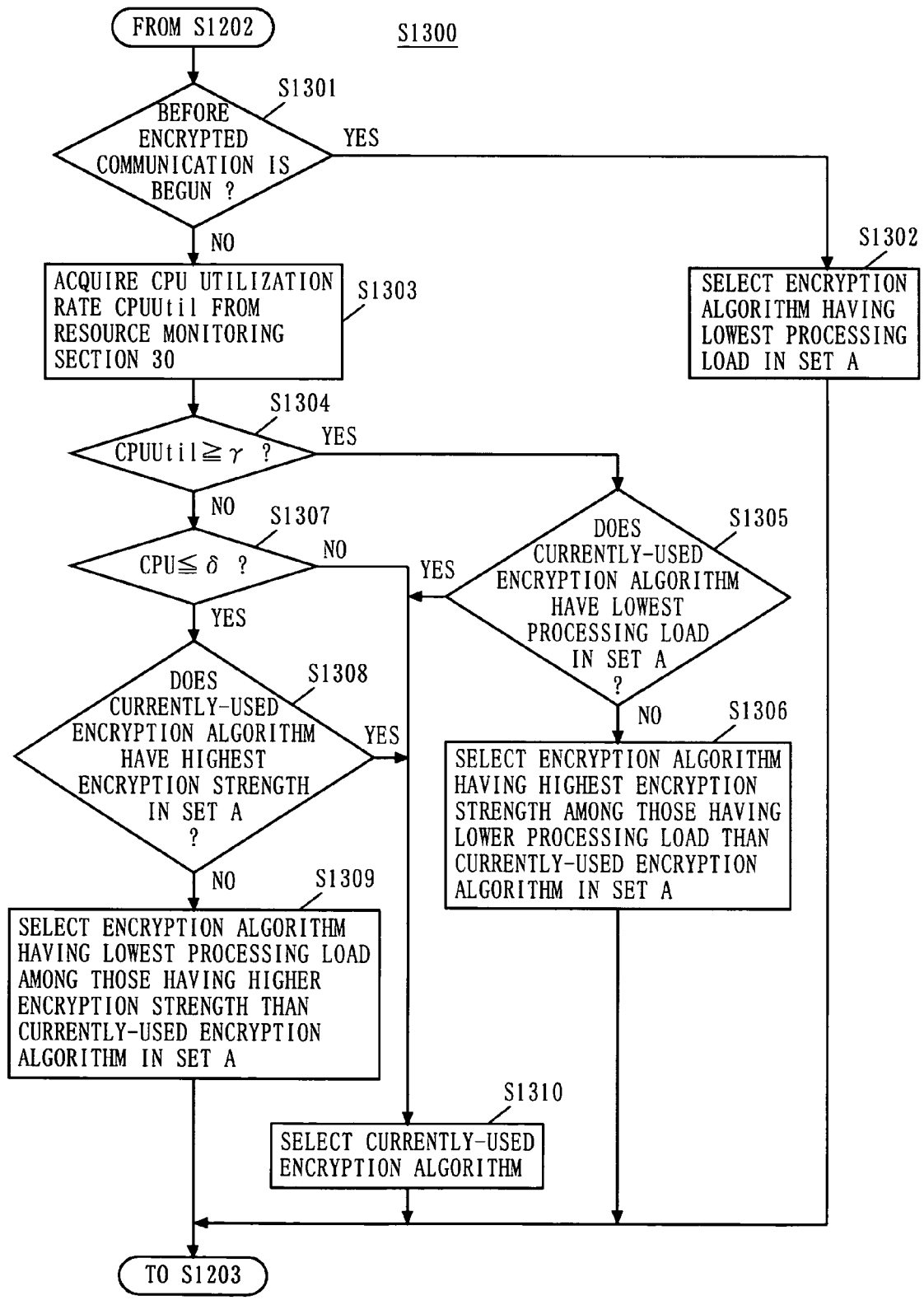
FIG. 13 is a more detailed flowchart illustrating a portion of the process shown in FIG. 12.

Next, a procedure in the case where the encryption information determination section 32 in the communication device 24 works as an initiator to perform a negotiation with the encryption information determination section 18 in the network camera 12 will be described. FIG. 12 and FIG. 13 are flowcharts illustrating the operation procedure in this case. Hereinafter, descriptions will be given with reference to the flowchart of FIG. 12 first.

First, the encryption information determination section 32 in the communication device 24 (hereinafter "initiator") ascertains the encryption algorithms supported by the encryption/decryption processing section 38 (set A) (S1201). Then, the initiator waits for a request to start negotiation. A request to start negotiation is issued when starting an encrypted communication, after the lapse of a predetermined period of time from a previous negotiation, or when a negotiation start command is executed.

Upon accepting a request to start negotiation (S1202), the initiator selects an encryption algorithm on the basis of CPU utilization rates (S1300). As shown from steps S1301 to S1305 in FIG. 13, the detailed procedure of step S1300 is substantially the same as that in the case where the communication device 24 works as a responder (step S1100 in FIG. 10, i.e., FIG. 11), and the descriptions thereof are omitted here. The only difference is whether the set from which to select an encryption algorithm is the returnable encryption algorithms (set C) or the supported encryption algorithms (set A).

Next, the initiator proposes a selected encryption algorithm to the responder (S1203).

At the responder, encryption algorithms supported by the encryption/decryption processing section 16 (set E) are previously ascertained (S1211). Thereafter, when a proposal packet is received from the initiator (S1212), it is determined whether the encryption/decryption processing section 16 supports the proposed encryption algorithm (i.e., whether the proposed encryption algorithm is contained in set E) (S1213). If the proposed encryption algorithm is not supported by the encryption/decryption processing section 16 (i.e., the proposed encryption algorithm is not contained in set E), a response cannot be returned to the initiator; therefore, the negotiation fails, and a next proposal packet is awaited. If the proposed encryption algorithm is supported by the encryption/decryption processing section 16 (i.e., the proposed encryption algorithm is contained in set E), the encryption algorithm is returned to the initiator (S1214), and the returned encryption algorithm is set in the encryption/decryption processing section 16 (S1215).

At the initiator, upon receiving the response packet (S1204), the returned encryption algorithm is set in the encryption/decryption processing section 38 (S1205).

Thus, according to the present embodiment, when selecting an encryption algorithm to be returned to the initiator, or when selecting an encryption algorithm to be proposed to the responder, the currently-used encryption algorithm can be switched to a more suitable encryption algorithm depending on the CPU utilization rate. As a result, while maintaining the firmest possible security, insufficiency of CPU resource can be prevented in the case where an application which requires encrypted communications, such as the network camera application 34, is performed in parallel with another process, such as a TV recording.

Although the number of encryption algorithms to be proposed to the responder is illustrated as one in the present embodiment, other encryption algorithms may also be proposed by assigning lower priority to them.

Embodiment 3

Next, Embodiment 3 will be described. However, descriptions of any portion that is not different from Embodiment 1, e.g., the overall system structure, will be omitted, and the figures for Embodiment 1 will be relied upon. The only differences from Embodiment 1 are the timing with which to perform an encryption algorithm negotiation and the procedure of selecting an encryption algorithm, and therefore these portions will be described below.

In Embodiment 3, variation in the CPU utilization rate is regularly detected by the communication device 24. Thus, rather than in accordance with a predetermined timing, but in accordance with a timing with which the CPU utilization rate varies, the encryption information determination section 32 in the communication device 24 performs a negotiation, as an initiator, with the encryption information determination section 18 in the network camera 12.

Figure 14:
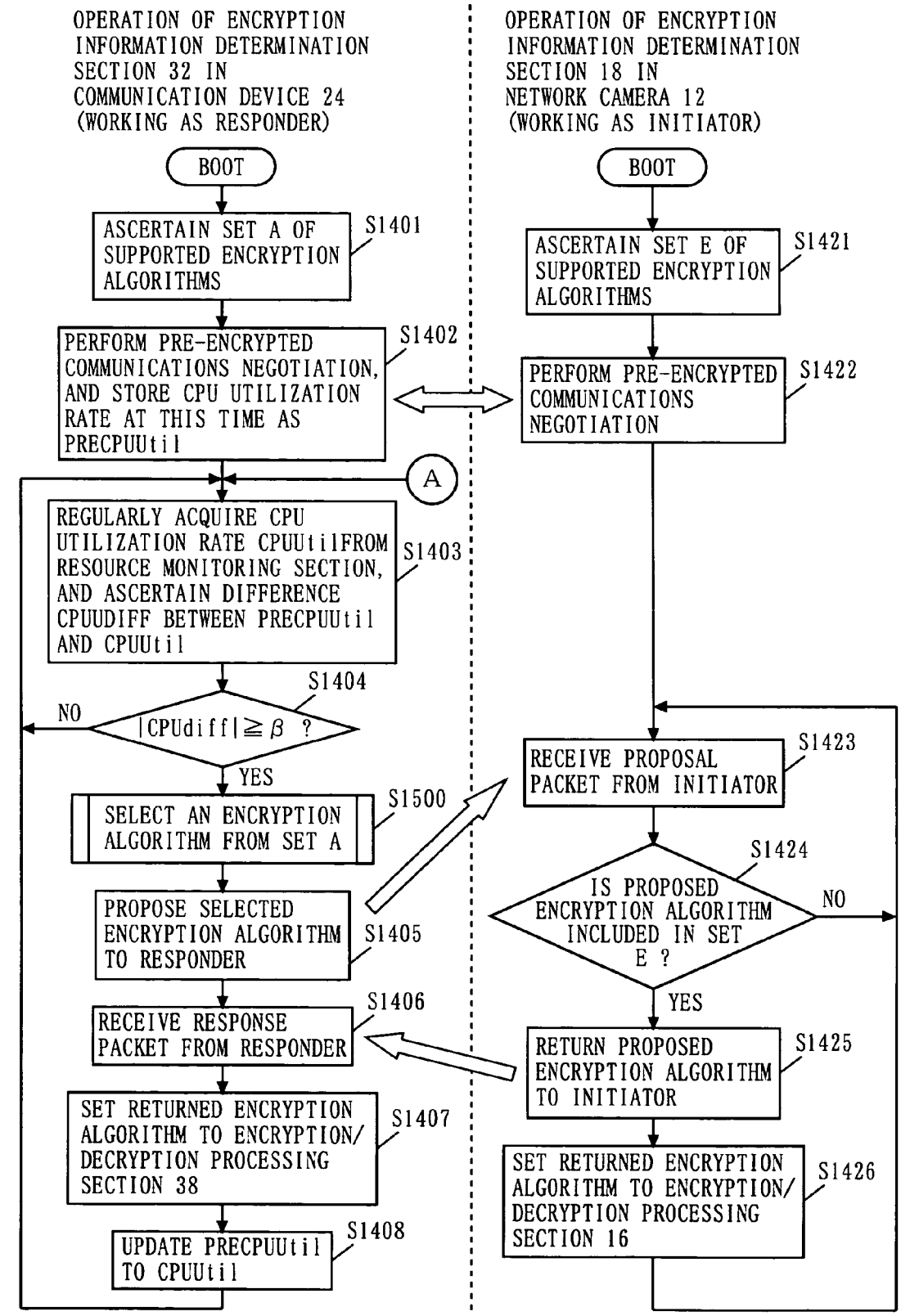
FIG. 14 is a flowchart illustrating the operation of the encryption information determination section in the case of performing an encryption algorithm negotiation as an initiator at the time when the CPU utilization rate changes according to Embodiment 3 of the present invention.
Figure 15:
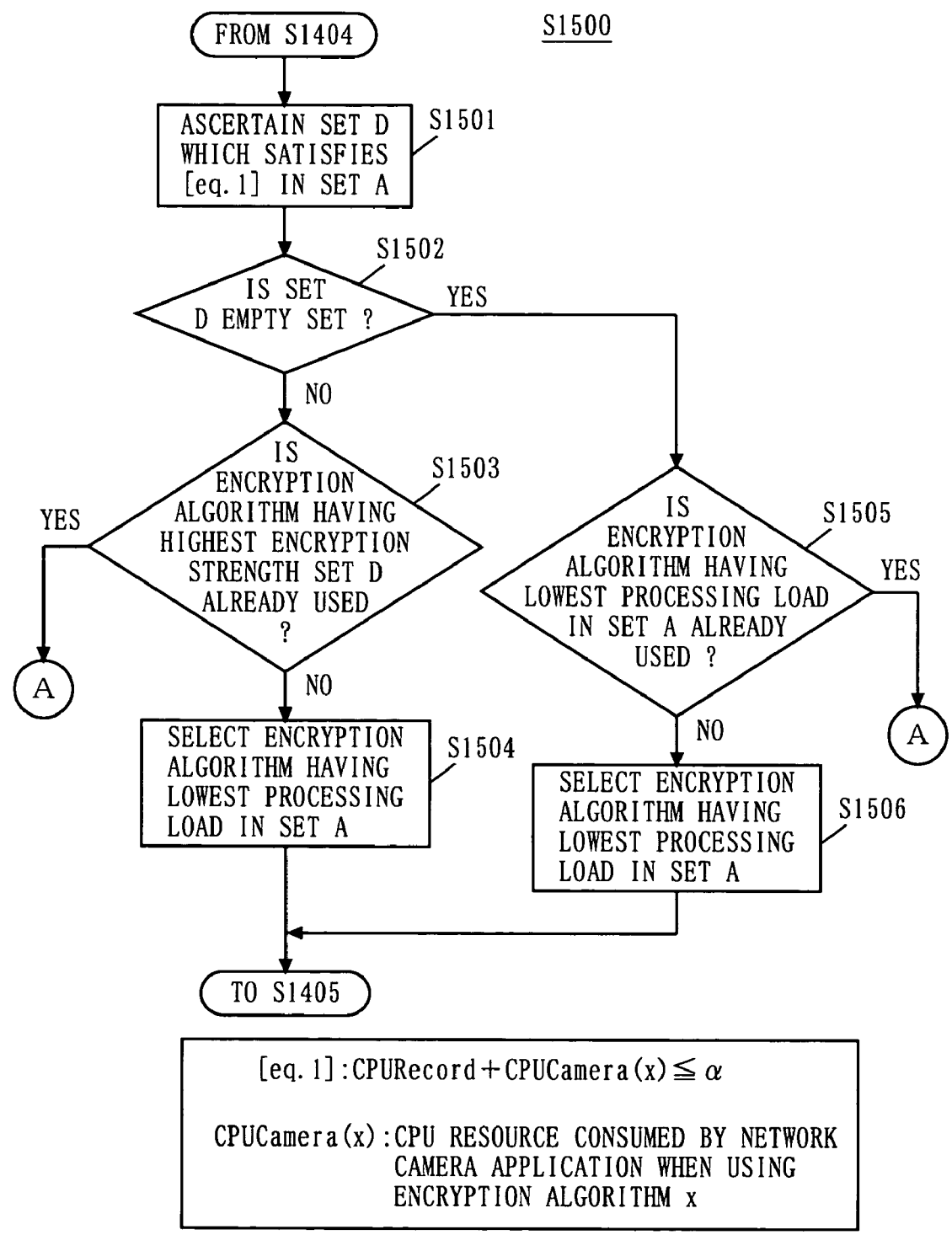
FIG. 15 is a more detailed flowchart illustrating a portion of the process shown in FIG. 14.

FIG. 14 and FIG. 15 are flowcharts illustrating an operation procedure of Embodiment 3. Hereinafter, descriptions will be given with reference to the flowchart of FIG. 14 first.

First, the encryption information determination section 32 ascertains the encryption algorithms supported by the encryption/decryption processing section 38 (set A) (S1401). Moreover, the encryption information determination section 18 ascertains the encryption algorithms supported by the encryption/decryption processing section 16 (set E) (S1421).

Next, before an encrypted communication is begun, an encryption algorithm negotiation is performed between the encryption information determination sections 32 and 18 in accordance with the procedure described in Embodiment 1 (S1402, S1422). By using an encryption algorithm which is selected through this negotiation, an encrypted communication is begun. At this time, the encryption information determination section 32 retains the CPU utilization rate at this moment as preCPUUtil. Herein, it does not matter which one of the encryption information determination sections 32 and 18 is working as an initiator to perform negotiation.

During the ensuing encrypted communication, the encryption information determination section 32 regularly acquires the CPU utilization rate CPUUtil from the resource monitoring section 30 (S1403). Then, the encryption information determination section 32 calculates a difference CPUdiff from the CPU utilization rate preCPUUtil obtained from the previous negotiation as CPUdiff=CPUUtil−preCPUUtil.

The encryption information determination section 32 determines whether the difference between CPUUtil and preCPUUtil is greater than a constant value β[%], by checking whether the inequality |CPUdiff|≧β is satisfied (S1404). The value of β is predetermined, e.g., 5%. If this inequality is not satisfied, i.e., if the variation in the CPU utilization rate from the previous negotiation is less than β[%], the encryption information determination section 32 determines that it is unnecessary to change the encryption algorithm, and does not perform a negotiation.

If the above inequality is satisfied, i.e., if the variation in the CPU utilization rate from the previous negotiation is equal to or greater than β[%], the encryption information determination section 32 determines that it may be necessary to change the encryption algorithm, and determines an encryption algorithm to be used (S1500). As shown from steps S1501 to S1506 of FIG. 15, the detailed procedure of step S1500 is substantially the same as that in the case where the communication device 24 works as an initiator (step S900 in FIG. 8, i.e., FIG. 9) in Embodiment 1, and the descriptions thereof are omitted here. The only difference is whether a proposal packet is always transmitted, or transmitted only if the encryption algorithm is to be changed (S1503, S1505). If it is determined necessary to change the encryption algorithm, the encryption information determination section 32 transmits a proposal packet as an initiator to a responder (S1405).

Next, the responder transmits a response packet in response to the received proposal packet (S1423 to S1425), and sets the returned encryption algorithm to the encryption/decryption processing section 16 (S1426). Upon receiving the response packet (S1406), the initiator sets the returned encryption algorithm to the encryption/decryption processing section 38 (S1407). The above procedure (S1406, S1407, S1423 to S1426) is exactly the same as that in the case where the communication device 24 works as an initiator in Embodiment 1 (S804, S805, S812 to S815 in FIG. 8), and any detailed descriptions thereof are omitted.

Finally, in order to calculate the variation in the CPU utilization rate at a next run of step S1403, the value of the CPU utilization rate CPUUtil this time is set as preCPUUtil (S1408).

As described above, according to the present embodiment, while maintaining the firmest possible security, insufficiency of CPU resource can be prevented in the case where an application which requires encrypted communications, such as the network camera application 34, is performed in parallel with another process, such as a TV recording. Since the encryption algorithm is reviewed when the CPU utilization rate varies, it is possible to select an optimum encryption algorithm in a flexible and efficient manner.

Although the value of β was assumed to be constant, the value of β may be dynamically varied depending on the CPU resource or the like required by the currently-used encryption algorithm or any other encryption algorithm contained in set A. For example, if the β value is small relative to the differences between the CPU utilization rates for a plurality of encryption algorithms, the variation in the CPU utilization rate, even though small, exceeds the β value; therefore, the selection/determination of step S1500 will begin. However, since it will turn our that there is no extra CPU utilization rate for allowing the encryption algorithm to be changed, the selection/determination will be performed in vain. Therefore, by designating a difference in CPU utilization rate between an encryption algorithm which is being selected and an encryption algorithm which lies next thereto in terms of CPU utilization rate as the β value, and dynamically changing the β value depending on the encryption algorithm which is being selected, redundant processing can be reduced.

Embodiment 4

Next, Embodiment 4 will be described. However, descriptions of any portion that is not different from Embodiment 1, e.g., the overall system structure, will be omitted, and the figures for Embodiment 1 will be relied upon. The only differences from Embodiment 1 are the timing with which to perform an encryption algorithm negotiation and the procedure of selecting an encryption algorithm, and therefore these portions will be described below.

In Embodiment 4, the encryption information determination section 32 in the communication device 24 and the encryption information determination section 18 in the network camera 12 agree upon a plurality of encryption algorithms during an encryption algorithm negotiation. Thus, it is ensured that the decrypting end can properly perform decryption regardless of which one of the encryption algorithms that have been agreed upon is used for encrypting the packets to be transmitted from the encrypting end.

Hereinafter, an operation procedure of an end which selects an encryption algorithm on the basis of CPU utilization rates and encrypts packets for transmission using the encryption algorithm, and an operation procedure of the counterparting end will be described.

Figure 16:
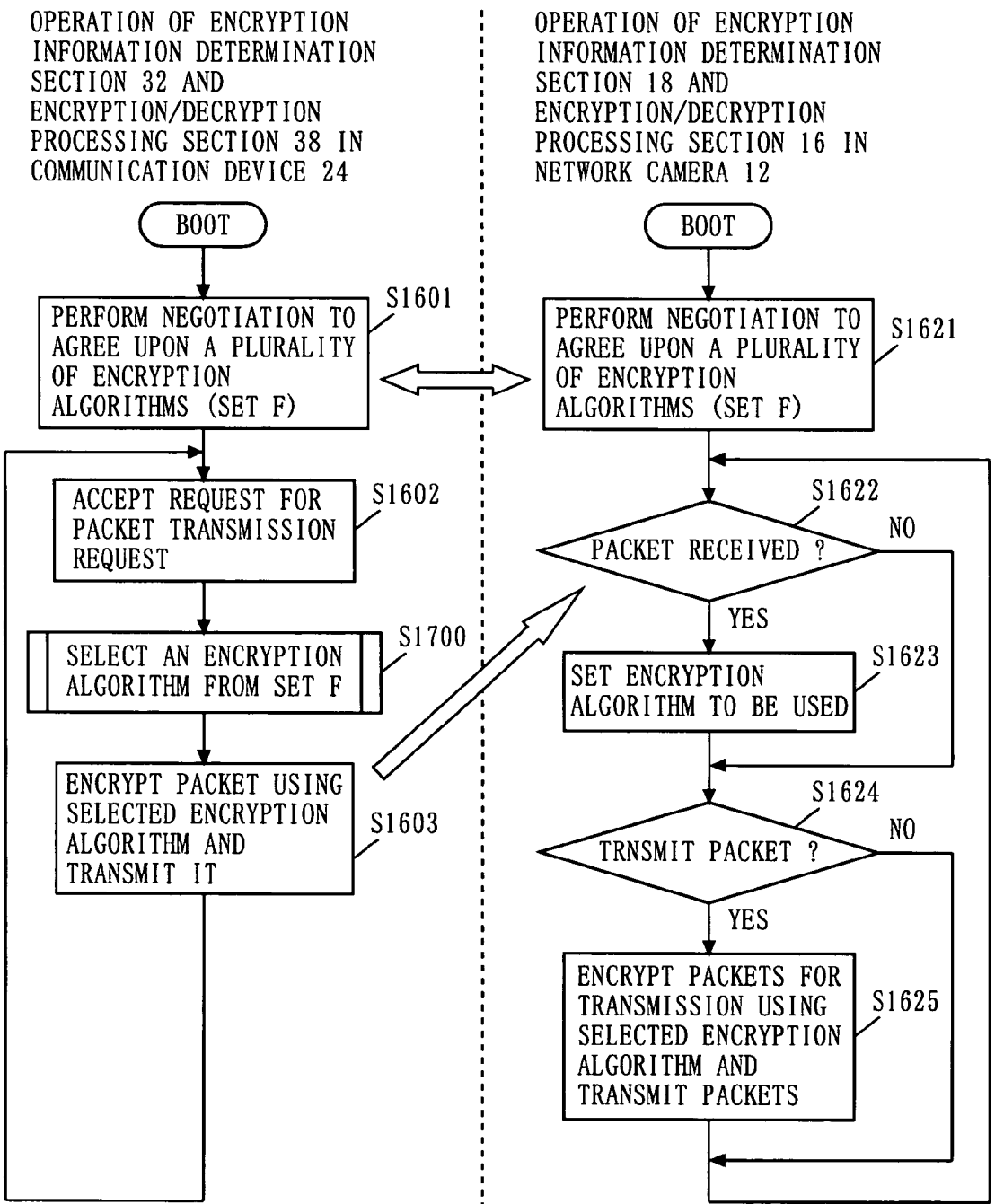
FIG. 16 is a flowchart illustrating a flow of processes in the case where a plurality of encryption algorithms have previously been negotiated according to Embodiment 4 of the present invention.
Figure 17:
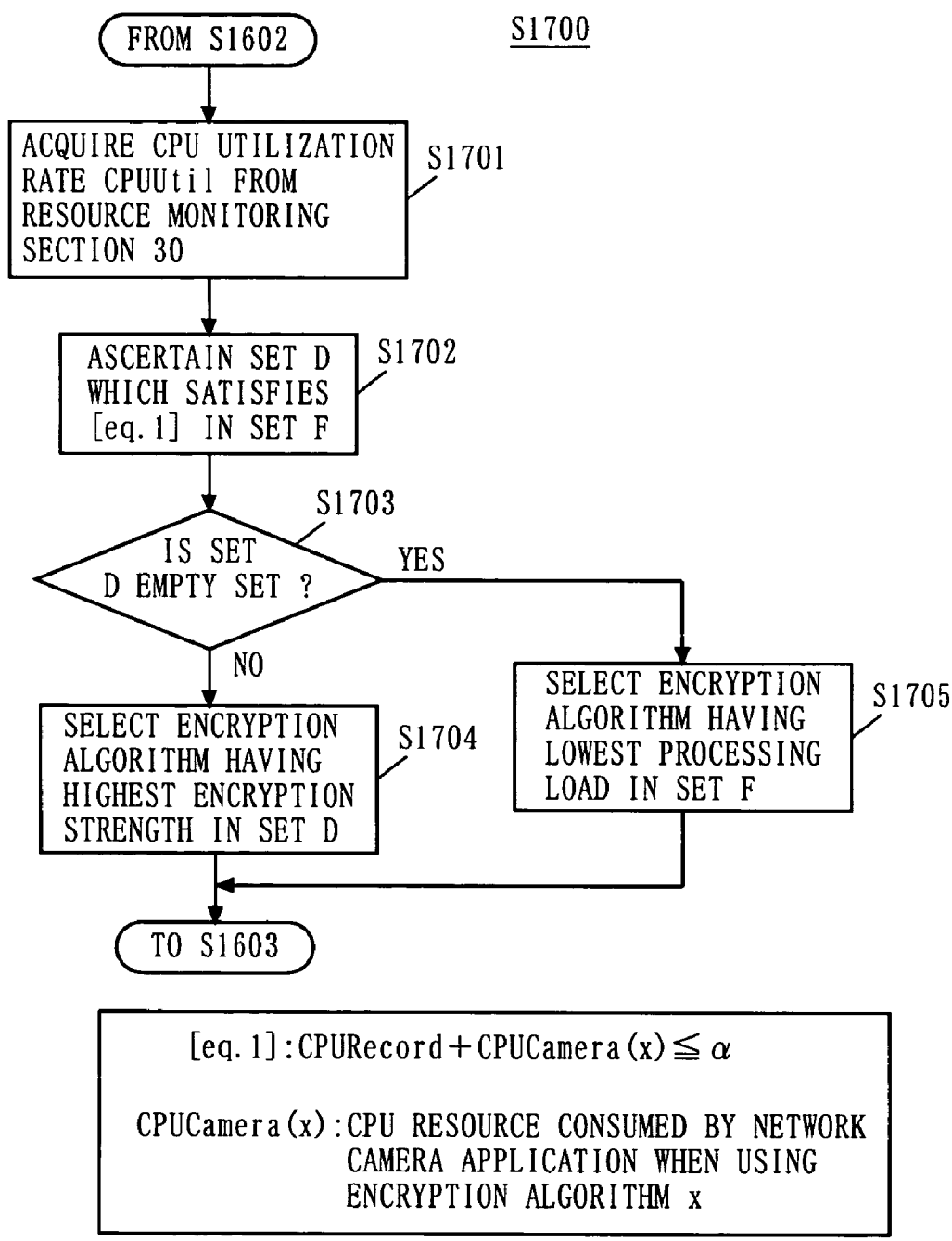
FIG. 17 is a more detailed flowchart illustrating a portion of the process shown in FIG. 16.

FIG. 16 and FIG. 17 are flowcharts illustrating an operation procedure according to Embodiment 4. The left-hand side of FIG. 16 and FIG. 17 show the operation procedure of an end which selects an encryption algorithm on the basis of CPU utilization rates (which is herein assumed to be the encryption information determination section 32 in the communication device 24). The right-hand side of FIG. 16 shows the operation procedure of the counterparting end (which is herein assumed to be the encryption information determination section 18 in the network camera 12). Hereinafter, descriptions will be given with reference to the flowchart of FIG. 16 first.

<Operation Procedure of the Encryption Algorithm Selecting-End>

First, the operation procedure of the encryption algorithm selecting-end will be described. The encryption algorithm selecting-end performs an encryption algorithm negotiation with the counterparting end, i.e., the end to which an encryption algorithm is to be notified (S1601). At this time, a plurality of encryption algorithms are agreed upon between itself and the communication counterpart, and encryption keys and decryption keys for all such encryption algorithms are generated. The set of encryption algorithms which have thus been agreed upon will be referred to as set F.

Next, issuance of a packet transmission request is awaited (S1602). Once a packet transmission request is issued, an encryption algorithm is selected on the basis of CPU utilization rates (S1700). As shown from steps S1701 to S1705 in FIG. 17, Embodiment 1, the details of the encryption algorithm selection method at step S1700 is substantially the same as the algorithm selection method (step S500 in FIG. 4, i.e., FIG. 5), and the descriptions thereof are omitted here. The only difference from the algorithm selection method of Embodiment 1 is whether the set from which to select an encryption algorithm is set C or set F.

Although it is assumed herein that an encryption algorithm to be used is selected for each packet transmission, the selection may be made for every plurality of packets, or at predetermined time intervals.

Finally, packets for transmission are encrypted using the selected encryption algorithm and transmitted (S1603), and control returns to the state of awaiting a packet transmission request (S1602).

The packet transmission request which is received at step S1602 may be that which is generated through the operation of an application, as in the case of transmitting an instruction for controlling the network camera 12 to the network camera 12, or that which is generated through the operation of a protocol, as in the IP layer. A typical example would be where a user presses an operation button provided on the communication device 24, causing the communication device 24 to activate the camera application, in response to which the camera application requests the network camera 12 to transmit video data packets. Moreover, in some cases, encryption of packets for communication control and packets for encryption algorithm negotiation may also be performed at the same time.

At step S1603, packets for which a transmission request was received at step S1602 are encrypted and transmitted.

In the case where the encrypted packets which are transmitted at step S1603 are decrypted by the network camera 12, it is determined which encryption algorithm was used to encrypt the packets, by referring to the SA identification ID(SPI) which is appended to the encrypted packets, and decryption of the coding is performed. This step may be performed within the flowchart of FIG. 16, or may be performed in accordance with a flowchart of decrypting received packets.

<Operation Procedure of the Counterparting End>

Next, the operation procedure of the counterparting end will be described. First, the counterparting end performs an encryption algorithm negotiation with the encryption algorithm selecting-end (S1621). At this time, a plurality of encryption algorithms are agreed upon between itself and the encryption algorithm selecting-end, and encryption keys and decryption keys for all such encryption algorithms are generated. Then, it is determined whether an encrypted packet has been received from the communication device 24 (S1622). If the result of the determination is YES, the encryption algorithm which is applied to this packet is set as the encryption algorithm to be used in the encryption/decryption processing section 16 (S1623).

Next, it is checked whether a packet transmission request has been issued (S1624). If a packet transmission request has been issued, packets for transmission are encrypted by using the encryption algorithm which has been set at step S1623, and are transmitted (S1625).

In order for the communication device 24 to receive the packets transmitted at step S1625, a step of determining whether packets of encrypted data have been received and performing decryption when such is received may be added between step S1603 and step S1602 which are performed at the communication device 24. Alternatively, separately from this flowchart, the communication device 24 may perform a procedure of receiving packets of encrypted data and decrypting them in response to an interruption or the like.

As described above, according to the present embodiment, the encryption algorithm selecting-end and the counterparting end previously come to an agreement as to using a plurality of encryption algorithms. Therefore, when the algorithm selecting-end changes the encryption algorithm to be used, there is no need to negotiate the encryption algorithm again. As a result, the CPU load can be more flexibly controlled.

In Embodiment 4, if there is plenty of CPU resource, an encryption algorithm having a higher load than that of the encryption algorithm which has so far been used is selected at the communication device 24, and is notified to the network camera 12. However, if the CPU utilization rate increases in the communication device 24 immediately after this notification for some reason, there is a danger in that the communication device 24 having received the camera video packets which were encrypted using encryption algorithm x in the network camera 12 immediately before the increase in the CPU utilization rate may not be able to decrypt these packets because the CPU resource is running low. In order to prevent such danger, while a communication using an encryption algorithm is being performed, any addition or change of an application that would result in more CPU resource being consumed may be prohibited in the communication device 24 until the encrypted communication is over, or such danger may be notified to the OS or the user so that appropriate processing is performed. Such processing for danger prevention would also be applicable to other embodiments of the present invention.

In Embodiments 1 to 4 above, when an estimate of CPU utilization rate by each application becomes necessary, such an estimate is obtained from the resource monitoring section 30. Meanwhile, among a variety of applications which may possibly be executed on the communication device 24, it is often known in advance which applications are to be simultaneously executed in parallel. As for such applications, each of them may be executed by itself in advance, while allowing the resource monitoring section 30 to measure their respective CPU utilization rates under such circumstances, and these measured values may be stored as default values in the CPU utilization statistics memory 44, such that the default values are retrieved for use at the time of negotiation. As for two or more applications which may possibly be executed in the same combination, they may be experimentally executed simultaneously in advance for measuring CPU utilization rates, or CPU utilization rates may be measured from any past period during which the same combination was executed, and such measurement results may be stored in the CPU utilization statistics memory 44 as default values, such that the default values are retrieved for use at the time of negotiation. Alternatively, when designing the communication device 24, the CPU utilization rates by the respective applications may be calculated, and the calculation results may be stored in the CPU utilization statistics memory 44 as default values.

As for the mechanism and measurement methods for CPU utilization rates, the mechanism and measurement methods that are applicable to the particular CPU which is adopted may be used, rather than being confined to the above-illustrated example.

The present embodiment illustrates a case where the counterparting end determines an encryption algorithm used by the encryption algorithm selecting-end based on encrypted packets received from the encryption algorithm selecting-end. Alternatively, the encryption algorithm selecting-end may separately transmit to the counterparting end a packet for notifying encryption algorithm used by the encryption algorithm selecting-end. In this case, the counterparting end may encrypt the packets to be transmitted to the encryption algorithm selecting-end by using the encryption algorithm notified from the encryption algorithm selecting-end.

Although Embodiments 1 to 4 describe methods for selecting an encryption algorithm in a communication device 24 having a video recording function, it will be appreciated that the present invention is also applicable to communication devices having functions other than a video recording function. Moreover, the equipment on the communication counterpart (which is not limited to a network camera) may also be provided with the negotiation mechanism according to the present invention, and while selecting a plurality of applicable algorithms in accordance with the CPU utilization rate within that equipment, the algorithm to be finally used may be selected through a negotiation between the two ends.

Embodiment 5

FIG. 18 is a block diagram illustrating the structure of a communication device according to Embodiment 5 of the present invention. Referring to FIG. 18, the communication device comprises a schedule section 64, applications 60 and 62, encrypted communication applications 70 and 72, an encryption information determination section 74, a communication processing section 78, an encryption/decryption processing section 80, and a resource monitoring section 82. In the following description, it is assumed that the present communication device has functions such as TV reception, TV recording, playing back recorded programs, receiving and displaying video from the camera through encrypted communications, as does the communication device 24 shown in FIG. 1.

In accordance with a preprogramming instruction from a remote control or the exterior, the schedule section 64 performs registration of preprogrammings for each application, management of execution times and control of the execution. As one example, the application 60 is an application (corresponding to the video recording application 28 in FIG. 1), having an application A, which records video data obtained by receiving TV broadcast onto a hard disk memory, and plays it back with a time shift. Recording of TV broadcast will be referred to as task a, and time-shifted play back will be referred to as task c. As one example, the encrypted communication application 70 is an application (corresponding to the network camera application 34 shown in FIG. 1), having an application B, which decodes camera video data sent from a network camera and displays it on a display. Application B is composed of task b, and uses an encryption algorithm.

The encryption information determination section 74 manages various information necessary for the selection/proposal/determination of encryption algorithms in conjunction with a negotiation for an encryption algorithm to be used (e.g., used resource information as consumed by each encryption algorithm, and encryption strength information) and various information necessary for encrypted communications (e.g., information concerning keys used for encryption/decryption, such as public keys, secret keys, and shared keys), and selects and determines an encryption algorithm to be used.

The encryption/decryption processing section 80, which comprises a plurality of encryption algorithm processing means (or programs for executing encryption algorithm processing procedures), performs processing of negotiation packets, generation of keys, disclosed values, public keys, secret keys, and shared keys used for encryption/decryption, encryption of data to be transmitted, decryption of received data, and the like.

The communication processing section 78 transmits packets which are generated by the encryption/decryption processing section 80 onto an Internet connection network in predetermined communication protocol format, and extracts packets from data in communication protocol format which are received from the Internet connection network and passes them to the encryption/decryption processing section 80.

Next, the operation of the communication device according to the present embodiment will be described.

First, an operation when performing a TV recording will be described. In the communication device shown in FIG. 18, the reception section (not shown) receives TV broadcast data, and the application 60 records the received TV broadcast data onto a storage medium (not shown) which lies internal to the communication device. This process is realized by the internal CPU of the present communication device executing the process of task a in the application 60 CPU. By continuously carrying out recording from a broadcasting start time to a broadcasting end time of a TV program on a channel which is to be recorded, TV recording is accomplished.

Preprogramming of a TV recording is realized as the user previously instructs a recording channel number, a recording start time, and a recording end time with a remote control, the instructions being received by the schedule section 64 so as to be registered to a schedule and used-resource table 66 (to be described later).

The application 60 also has a function of playing back recorded TV programs with a time shift (task c). As for this time-shifted play back task c, too, a program number to be played back, a play back start time, and a play back end time are instructed through remote control preprogramming, and these instructions are registered to the schedule and used-resource table 66 by the schedule section 64.

Next, the operation of the system when displaying video from a network camera on a display will be described. This process is split into two processes: preprocess for performing encrypted communications and a process of actually running a network camera application. The preprocess for performing encrypted communications will be described later. First, an outline of the process of actually running a network camera application will be described. The processing at the network camera side has been described with reference to FIG. 43 and in Embodiment 1 (FIG. 1), and the descriptions thereof are omitted here. In the communication device shown in FIG. 18, encrypted packets based on video data is received from the Internet connection network by the communication processing section 78, decrypted by the encryption/decryption processing section 80, and the decrypted video data is passed to the encrypted communication application 70, which outputs the video data at a predetermined position and in a predetermined size on a display (not shown). Then, the display displays the video. In this manner, video which has been taken by the network camera is displayed on the display.

A preprogramming instruction for a time zone during which to receive video data from the network camera is also previously given from a remote control to the schedule section 64, and registered to the schedule and used-resource table 66.

Next, the schedule and used-resource table 66 will be described. FIG. 19 shows an example thereof. In FIG. 19, a TV video recording application A (the application 60) is composed of task a and task c. Task a in TV recording has been instructed to perform a preprogrammed recording of a program from 12:00 to 13:00 on Nov. 1, 2002, this being registered in a start time column and an end time column. Although not shown, a channel number, a program code, and the like are also registered as other data. Task c is a part of the functions of application A which allows the recorded program to be viewed with a time shift of 30 minutes, and is preprogrammed and registered to be executed from 12:30 to 13:30 on Nov. 1, 2002. Although not shown, as other data, a channel number and a program code of the recorded program, or a program file management code within the HDD or the like is registered. Application B (the encrypted communication application 70) realizes the network camera's receiving function and displaying function of video data, and is composed of task b. Task b has been instructed via the remote control to be continuously executed from 11:45 on Nov. 1, 2002 onwards, this being registered in the start time and the end time in the schedule and used-resource table 66.

In the schedule and used-resource table 66, the amount of used resource required for the execution of each of tasks a, b, and c, i.e., CPU resource, memory amount, and data transfer amount when performing communications, are stored as an average used CPU resource (MIPS, or mega-instructions/second), an average used memory resource (MB, or megabytes), and an average data transfer amount for encrypted communications (Mbps, or megabits/second), respectively. As for tasks a and c, the average data transfer amount for encrypted communications is 0 Mbps because encrypted communications are not performed. An encrypted communication column shows presence or absence of encrypted communications. As for task b, the encrypted communication column indicates "YES". A necessary encryption strength column designates a necessary encryption strength when performing encrypted communications. In this example, the encryption algorithm to be used for task b is designated to be selected from among those whose encryption strengths are the first, second, and third highest.

The encryption information determination section 74 includes an encryption process and used-resource table 76 in itself. An example of the encryption process and used-resource table 76 is shown in FIG. 20. In FIG. 20, for two kinds of encryption algorithms (DES-CBC, 3DES-CBC) held in the encryption/decryption processing section 80, their respective used resource amounts, i.e., average used CPU resource (unit:MIPS/Mbps), average used memory resource (MB), and encryption strengths (indicated in terms of order) are stored. In this example, one unit average used CPU resource indicates the CPU resource necessary for performing encryption/decryption for a data transfer amount of 1 Mbps. As there is more data transfer amount, more encryption/decryption resource is proportionally required. It is indicated that CPU resources of 100 MIPS and 300 MIPS are respectively consumed when transferring 1 Mbps of data.

Figure 21:
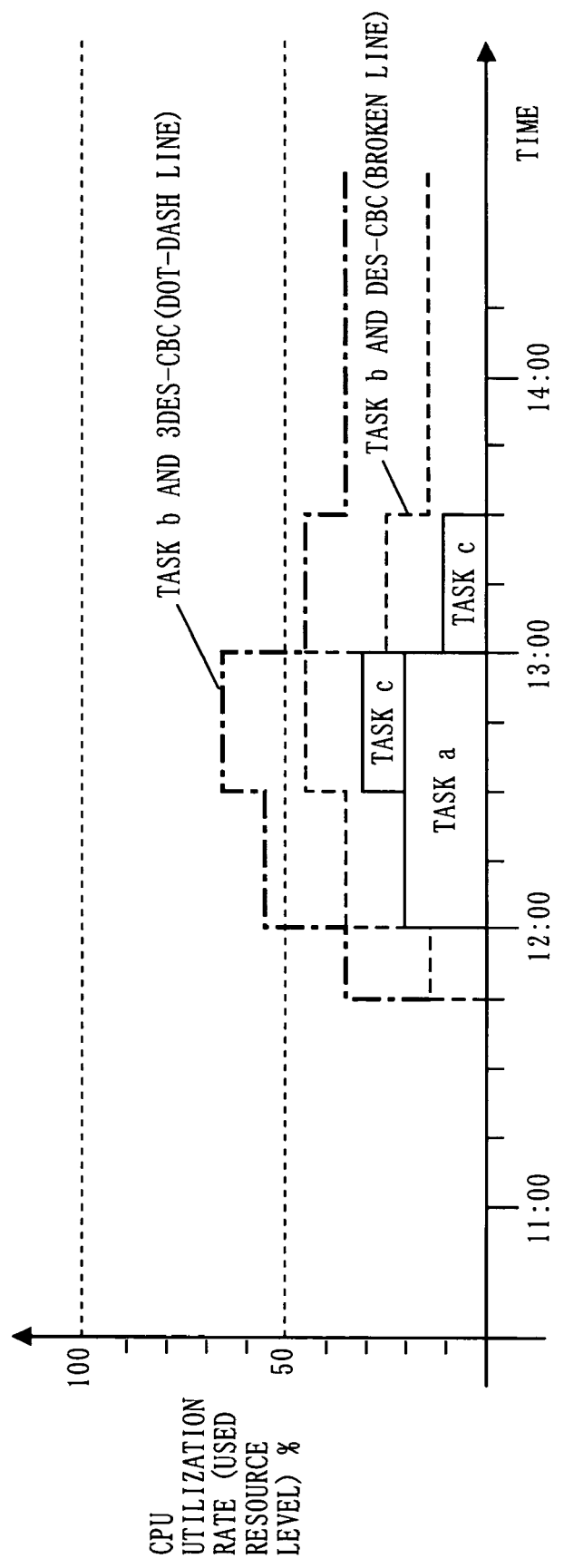
FIG. 21 is a diagram illustrating transitions in the CPU utilization rate.

FIG. 21 is a diagram illustrating temporal transitions in the CPU utilization rate based on the schedule and used-resource table 66 and the encryption process and used-resource table 76. The CPU utilization rate is represented as a percentage assuming that the CPU maximum performance is 1000 MIPS. A broken line indicates a CPU utilization rate in the case where DES-CBC is adopted as the encryption algorithm. The dot-dash line indicates a CPU utilization rate in the case where 3DES-CBC is adopted as the encryption algorithm. The CPU utilization rate is highest in the slot from 12:30 to 13:00 during which task b is processed in addition to task a and task c. It is common practice to give a margin to the CPU utilization rate in order to be able to cope with instantaneous fluctuations in the processing amount or unpredictable emergencies. Assuming that a tolerable total average CPU utilization rate which will not prove problematic for performing proper processing is 50%, FIG. 21 indicates that, in the case of 3DES-CBC, the CPU utilization rate will exceed 50% between 12:00 and 13:00, thereby possibly hindering proper processing. On the other hand, in the case of DES-CBC, the CPU utilization rate is 50% or less at all times.

According to the present embodiment, by using the schedule and used-resource table 66 and the encryption process and used-resource table 76, the encryption algorithms are scheduled so that a tolerable amount of used resource, i.e., tolerable total average CPU utilization rate (or tolerable used CPU resource) will not be exceeded.

To this end, a schedule analysis process is performed as follows. The schedule section 64 monitors the content of the schedule and used-resource table 66 and an internal clock (not shown) to check whether an event exists a predetermined period of time (e.g., five minutes) after the current time of the internal clock. According to the schedule and used-resource table of FIG. 19, if the current time is before 11:40, there is no event to occur five minutes later; therefore, the schedule section 64 is in a stand-by state. At 11:40, the schedule section 64 detects that an event is scheduled to occur five minutes later. Accordingly, the schedule section 64 checks all tasks registered in the schedule and used-resource table 66, and calculates a total of average used CPU resource for each event slot that is defined by a start time and an end time (i.e., slot (11:45-12:00), slot (12:00-12:30), slot (12:30-13:00), slot (13:00-13:30), and slot (13:30-unknown) in this example). Since task b, which involves encrypted communications, designates that an encryption algorithm having a third or higher encryption strength be selected, a total of average used CPU resource when applying the respective encryption algorithms shown in the encryption process and used-resource table 76 is calculated.

Instead of checking the presence or absence of an event to occur five minutes later, the aforementioned total of average used CPU resource may be calculated at a time when execution of an arbitrary application is preprogrammed.

FIG. 22 shows an example of the event and used-resource table 68 which is generated by the schedule section 64 in order to calculate total values. FIG. 22A is an event and used-resource table 68 in the case where DES-CBC is used. For each event time, a column indicating an operating state (active/inactive) of each task name and its used resource, a column indicating an encryption algorithm name and its used resource, and a column indicating a total used resource are provided. In the case where there are plurality of tasks, correspondingly many columns are to be provided. In each column, a task and an encryption algorithm to be executed from that event time to the event time of the next row are written. In other words, a task name which is preprogrammed between each event time and each next event time is described together with its used resource amount. If a task is to be ended at a certain point in time, a row may be provided indicating such an end time in the event time column, while omitting the task name to be ended. In the case of using an encryption algorithm, the encryption algorithm and its used resource amount are also described. Although the example of FIG. 20 shows DES-CBC to be 100 MIPS/Mbps, the average used CPU resource for DES-CBC is indicated as 100 MIPS because the average data transfer amount for encrypted communications of video data from a camera application (application B) is 1 Mbps in the example of FIG. 19. FIG. 22B is an event and used-resource table 68 in the case where 3DES-CBC is used. If the total used resources shown in FIG. 22A and FIG. 22B is indicated in terms of percentage against a CPU performance of 1000 MIPS, temporal transitions in the CPU utilization rate (%) as shown by the broken line and the dot-dash line of FIG. 21 are obtained.

The schedule section 64 checks the total used resource columns in the generated event and used-resource table 68, selects all encryption algorithms which never exceed tolerable used CPU resource of 500 MIPS, i.e., 50% of the tolerable total average CPU utilization rate of the maximum CPU performance of 1000 MIPS, and notifies the selected encryption algorithm names to the encryption information determination section 74. The encryption information determination section 74 refers to the notified encryption algorithm names and the encryption process and used-resource table 76 to select one of the notified encryption algorithms that has the highest encryption strength. In the present embodiment, only DES-CBC will be notified to the encryption information determination section 74, and therefore this encryption algorithm is to be selected.

Next, the encryption information determination section 74 notifies to the schedule section 64 that the DES-CBC thus adopted is to be used. The schedule section 64 puts the use of the notified encryption algorithm into the schedule. In this example, FIG. 22A is selected. Thus, an encryption algorithm has been selected based on schedule analysis and its schedule of use has been generated.

Using the event and used-resource table 68 of FIG. 22A which corresponds to the notified encryption algorithm (which herein is DES-CBC), the schedule section 64 controls the activation/execution/stopping of each preprogrammed application. The schedule section 64 is always referring to the event and used-resource table 68 (FIG. 22A), so that, when the internal clock reaches 11:45, the schedule section 64 will instruct the encrypted communication application 70 to activate task b, and instructs the encryption/decryption processing section 80 to perform a preprocess for encrypted communications using DES-CBC.

As a preprocess for encrypted communications, the encryption/decryption processing section 80 performs a negotiation with the encryption/decryption processing section 204 in the network camera shown in FIG. 43 (which is the communication counterpart) in order to generate a shared key required for encrypted communications, and generates the shared key according to specifications such as Diffie-Hellman, IKE, or IPsec. Once the generation of the shared key is completed in both encryption/decryption processing sections 80 and 204, the encryption/decryption processing section 80 in the communication device notifies to the encrypted communication application 70 that encrypted communications are ready to be performed, and the encryption/decryption processing section 204 in the network camera notifies to the encrypted communication application 200 that encrypted communications are ready to be performed. Upon receiving this notification, the encrypted communication application 200 sends video data from the camera to the encryption/decryption processing section 204; the encryption/decryption processing section 204 encrypts this video data by using DES-CBC; and the communication processing section 206 generates encrypted packets of video data and sends the packets to the communication processing section 78 via the Internet connection network. The encryption/decryption processing section 80 gets the received data from the communication processing section 78 and performs decryption of the coding, and passes the video data to the encrypted communication application 70. As already described above, the encrypted communication application 70 displays the video on the display. When the schedule section 64 detects that the current time has reached 12:00 by referring to its internal clock, the schedule section 64 activates task a (i.e., the application 60) while continuing task b, in accordance with the event and used-resource table 68. At 12:30, task c is also activated. At 13:00, task a is stopped. At 13:30, task c is stopped. Thus, at each event time, the content of the row of that event time is compared against the content of the row of the immediately previous event time, and any additional task or encryption algorithm from the previous row is activated, and any task or encryption algorithm from the previous row which is no longer described is stopped.

As described above, according to the communication device or algorithm selection method of Embodiment 5, the schedule section 64 checks the contents of preprogrammings in the schedule and used-resource table 66 and the data in the encryption process and used-resource table 76, and generates a schedule in which an encryption algorithm is selected such that the used CPU resource amount will not exceed the tolerable used CPU resource. Accordingly, the danger of the used CPU resource amount exceeding the tolerable used CPU resource during an encrypted communication, which would result in a system failure or interruption of the encrypted communication, can be precluded.

Moreover, according to the present embodiment, encryption setting information, such as selecting an encryption algorithm, can be determined in view of future actions. Therefore, depletion of processing resource can be prevented without having to switch encryption algorithms along the way. As compared to a dynamic resource control technique which controls the selection of an encryption algorithm or the like depending on the ever-changing state of resource use, the danger of not being able to provide a timely solution can be reduced.

The values of used resource amounts for tasks a, b, and c, e.g., average used CPU resource, average used memory resource, and average data transfer amount may be previously stored in the application 60 or the encrypted communication application 70 at the time of manufacture or shipment of the communication device, or they may be stored to the application 60 or the encrypted communication application 70 at the time when each application program is externally downloaded via the Internet connection network or TV data broadcast. The average used CPU resource, average used memory resource, order of encryption strengths, the number of preprocess instructions (described later), and the like for each encryption algorithm may be stored as encryption/decryption information in a table which is provided in the encryption/decryption processing section 80. In this case, the encryption information determination section 74 reads such encryption/decryption information and writes it to the encryption process and used-resource table 76. Alternatively, it may be previously stored in the encryption process and used-resource table 76.

Alternatively, average used CPU resource, average used memory resource, average data transfer amount, the number of preprocess instructions(described later), and the like for each encryption algorithm may be measured at the previous run of the encryption algorithm, and the measured data may be stored in a storage section such as the CPU utilization statistics memory 44 in FIG. 2. These measurements are made in the resource monitoring section 82, and the measured information is notified to the encryption information determination section 74, which stores this data in the aforementioned storage section. When generating the schedule and used-resource table 66 upon receiving a preprogramming instruction, the encryption information determination section 74 reads these data from the storage section and writes them into predetermined columns of the schedule and used-resource table 66. As for data concerning encryption algorithms, the measurement results may be transferred to the encryption process and used-resource table 76. Generally speaking, the measurements of an amount of CPU resource used are made by utilizing a monitoring program or part of kernel programs. In the case where the CPU itself has the ability to measure an amount of CPU resource used by a task under execution, the CPU may notify such measurement results to the encryption information determination section 74.

Although separate event and used-resource tables 68 are provided for different encryption algorithms as shown in FIG. 22A and FIG. 22B in the present embodiment, common portions in such tables may be combined so as to be representable as one table, as shown in FIG. 25 or FIG. 26 which will be discussed in Embodiment 7 (described later).

Figure 23:
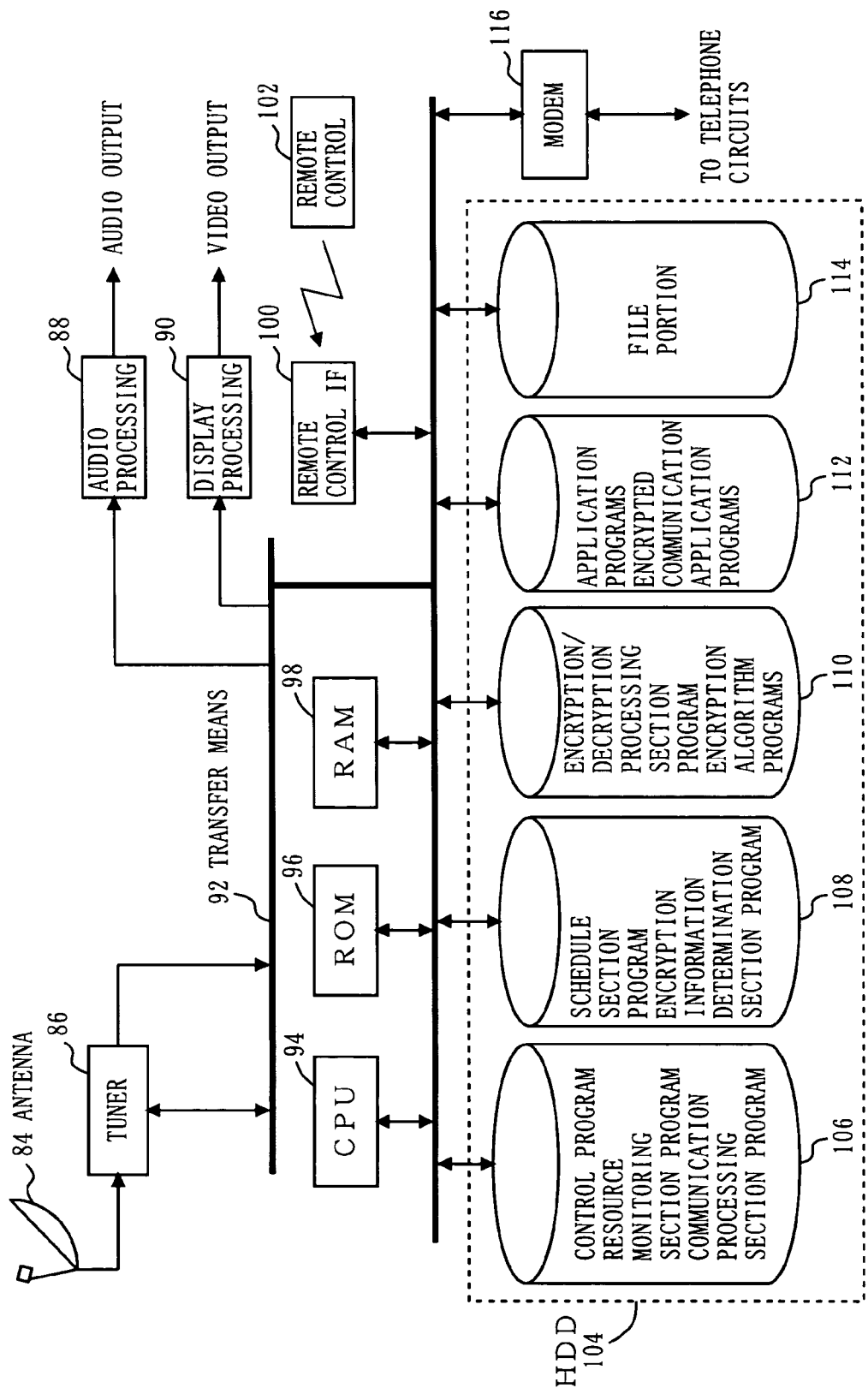
FIG. 23 is a block diagram illustrating a hardware structure of an encrypted communication according to Embodiments 5 to 9 of the present invention.

FIG. 23 shows an exemplary hardware structure of a communication device which performs the aforementioned process. In FIG. 23, a CPU 94, a ROM 96, a RAM 98, an HDD 104, and a modem 116 are coupled to a bus line which constitutes transfer means 92. Such a structure is a standard computer system structure. In the ROM 96, a program for system boot and data which does not need to be updated are stored. An area 106 in the HDD 104 stores a control program, e.g., operating system (OS), for managing the overall system and performing various controls, a resource monitoring section program for allowing the CPU 94 to function as the resource monitoring section 82, and a communication processing section program for allowing the CPU 94 to function as the communication processing section 78. An area 108 stores a schedule section program for allowing the CPU 94 to function as the schedule section 64 and an encryption information determination section program for allowing the CPU 94 to function as the encryption information determination section 74. An area 110 stores an encryption/decryption processing section program for allowing the CPU 94 to function as the encryption/decryption processing section 80 and encryption algorithm programs. An area 112 stores application programs and encrypted communication application programs. A file portion in an area 114 stores data of recorded TV programs. A transport stream of TV programs received by an antenna 84 and a tuner 86 is decoded by the CPU 94 in accordance with the application 60 which has been loaded into the RAM 98 from the area 112, and the decoded results are stored (recorded) in the file portion of the area 114. The recorded data is read after a predetermined time shift period, and subjected to an AV decoding by the CPU 94. The decoded audio data and video data are output as an audio output and a video output via an audio processing 88 and a display processing 90. Preprogramming information which is instructed by operating a remote control 102 is received by the schedule section program via a remote control IF (interface) 100, and is registered by the schedule section program to the schedule and used-resource table 66. Thereafter, in accordance with the control program, the CPU 94 sequentially loads the schedule section program, the encryption information determination section program, the encryption/decryption processing section program, the encryption algorithm programs, application programs, the encrypted communication programs, the resource monitoring section program, and the communication processing section program onto the RAM 98, and performs the above-described processes in accordance with the respective programs.

Next, based on Embodiment 5, various other embodiments will be described. In the description of each embodiment below, any portion having the same block structure as that in Embodiment 5 will not be described again, and the differences from Embodiment 5 will be mainly described.

As the encryption/decryption information, in addition to an encryption algorithm, information which is necessary for the encryption/decryption processes may also be notified. For that matter, identifiers indicating an encryption algorithm and/or encryption/decryption keys may be notified.

Embodiment 6

The communication device of Embodiment 5 described with reference to FIG. 18 may have a problem in that, if a non-negligible amount of time is required by preprocess to be performed before an encrypted communication, i.e., negotiations of parameters concerning various types of encrypted communications and exchange of shared keys, an encrypted communication may not be begun at a preprogrammed time. Embodiment 6 solves such a problem.

In the present embodiment, as shown in FIG. 24, a column indicating a number of preprocess instructions is further provided in the encryption process and used-resource table 76 shown in FIG. 20, and for each encryption algorithm, the CPU processing amount necessary for a preprocess is described as a number of instructions to be executed Im (unit: MI or megainstructions). This value may be previously stored at the time of manufacture or shipment of the communication device, or, the number of instructions executed by the CPU last time performing a preprocess may be measured and this value may be stored. In the case of taking measurements, the resource monitoring section 82 performs the measurement, and the results of measurements are stored to the encryption process and used-resource table 76 as resource information. When generating the event and used-resource table 68 of Embodiment 5, an amount of time required for the preprocess can be determined as Mt(sec.) =Im/Ycpu, by calculating (tolerable used CPU resource−total used resource)=CPU resource margin Ycpu (MIPS) in a time zone before a start event of encrypted communication task b.

The processing of a shared key also entails a processing time on the part of a counterparting device as well as a communication time. In the case where the processing time of the counterparting device is negligible, a value obtained by adding margin α to the aforementioned calculated value may be regarded as the time required for the preprocess. In the case where the processing time of the counterparting device is not negligible, this processing time must also be taken into consideration. In the case where the processing time of the counterparting device is substantially the same as the processing time of the present device, it may be defined that Mt=(Im/Ycpu)×2+β (where β is the communication time plus a margin time). Alternatively, the processing time in a previous encrypted communication may be stored, and Mt may be defined as a sum of the processing times of the present device and the counterparting device plus a margin time. As in the present communication device, if the processing time of the counterparting device is unknown because the CPU performance of the counterparting device fluctuates depending on the situation, for example, Mt may be determined after inquiring the counterparting device about its processing time. In any case, it may be defined that the time required for a preprocess Mt=Im/Ycpu+δ+β (where δ is the processing time of the counterparting device).

Once Mt is determined, the schedule section 64 changes the start time of task b in the event and used-resource table 68 so as to be earlier by Mt(sec.). By doing so, task b of the encrypted communication application 70 is activated Mt(sec.) before 11:45. Therefore, it becomes possible to perform an actual encrypted communication by the encrypted communication application 70 when it is Mt(sec.) after the completion of the preprocess, i.e., 11:45. Specifically, an event indicating the start of a preprocess for task b may be additionally inserted at a time which is Mt earlier than the start event time of task b, and the schedule section 64 may instruct the encryption/decryption processing section 80 to start the preprocess Mt(sec.) before 11:45, and task b may be activated at 11:45, by which time the preprocess has been completed.

According to the present embodiment, in the case where there is little CPU resource margin Ycpu in a time zone in which a preprocess for encrypted communications is to be performed, the preprocess can be started earlier, thereby allowing encrypted communications to start at a preprogrammed time.

Moreover, according to the present embodiment, encryption/decryption information such as shared keys can be prepared in advance in view of future actions, so that it is possible to readily perform encrypted communications when necessary. Moreover, encryption/decryption information such as shared keys can be prepared while not much resource is used.

In the case where a given encryption algorithm is switched to another encryption algorithm along the way and thereafter the first encryption algorithm is used again, the keys for communications which were being used before switching encryption algorithms may be retained while the other encryption algorithm is in use, and these keys may be reused when the first encryption algorithm is to be used again. As a result, it becomes possible to omit a preprocess when using the first encryption algorithm again.

As the encryption/decryption information, in addition to an encryption algorithm, information which is necessary for the encryption/decryption processes may also be notified. For that matter, identifiers indicating an encryption algorithm and/or encryption/decryption keys may be notified.

Embodiment 7

Next, as Embodiment 7, an embodiment in which encryption algorithms having the highest encryption strength are switchably selected in a single encrypted communication application, within a range up to a tolerable used CPU resource Kcpu (MIPS). The structure of the present embodiment is similar to that shown in FIG. 18. Hereinafter, differences from Embodiment 5 will be described.

Referring to FIG. 21 or FIG. 22, in the slot (11:45-12:00) and the slot (13:00-unknown), those encryption algorithms whose CPU resource does not exceed a tolerable used CPU resource Kcpu (MIPS) of 500 MIPS, i.e., whose CPU utilization rate does not exceed a tolerable limit of 50%, are 3DES-CBC and DES-CBC, but the former is higher in encryption strength. Based on the event and used-resource table 68 shown in FIG. 22A and FIG. 22B, for each event slot, the schedule section 64 notifies to the encryption information determination section 74 an encryption algorithm which does not allow the total used resource to exceed the tolerable used CPU resource Kcpu (MIPS)=500 MIPS. In the case where a plurality of encryption algorithms have been notified, the encryption information determination section 74 selects one that has the highest encryption strength, and notifies the selected encryption algorithm to the schedule section 64. For each event time and for each encryption algorithm in the event and used-resource table 68, there is newly provided a selection registering column (not shown) which indicates whether that encryption algorithm has been selected. In a selection registering column for the encryption algorithm that has been notified from the encryption information determination section 74, the schedule section 64 writes a selection code indicating that that encryption algorithm has been selected. Next, as in the case of Embodiment 6, the schedule section 64 calculates (tolerable used CPU resource−total used resource)=CPU resource margin Ycpu (MIPS) in a time zone before an event time at which to switch encryption algorithms, determines Mt(sec.)=Im/Ycpu, and inserts a preprocess event at Mt(sec.) before this event time. After generating such event and used-resource tables 68 (one corresponding to DES-CBC and another corresponding to 3DES-CBC), the schedule section 64 controls the activation/execution/stopping of each application and a preprocess and code processing and the like for an encryption algorithm to be used next, by referring to these event and used-resource tables 68. At this point, by referring to the selection code in the selection registering column in the event and used-resource table 68, the schedule section 64 causes the encryption/decryption processing section 80 to perform a preprocess and encryption/decryption processes for the selected encryption algorithm.

FIG. 25 shows an example of the event and used-resource table 68 used in Embodiment 7. Among year, month, date, and time, at least time is described in the event time column. In a task/resource column, a scheduled task name and a used resource amount (MIPS) are described. The used resource amount (MIPS) is an average used CPU resource amount. The task/resource columns are increased accordingly as there are more preprogrammed applications. In a code/resource column, the name of a candidate encryption algorithm and its used resource amount (MIPS) are described. In a total resource column, a total used resource(MIPS) based on the scheduled task and the candidate encryption algorithm are described. As many code/resource columns and total resource columns are provided as there are candidate encryption algorithms.

In a used encryption algorithm column, the name of an encryption algorithm having the highest encryption strength within a range such that the total used resource does not exceed the tolerable used CPU resource is described. This process may be performed as follows. For each event slot, the schedule section 64 notifies to the encryption information determination section 74 candidate encryption algorithms which does not allow the total used resource to exceed the tolerable used CPU resource. By referring to the encryption process and used-resource table 76 shown in FIG. 20, the encryption information determination section 74 selects one of the notified candidate encryption algorithms that has the highest encryption strength, and notifies that encryption algorithm name to the schedule section 64. The schedule section 64 writes the notified encryption algorithm name in the used encryption algorithm column.

Thus, according to the present embodiment, an encryption algorithm which does not allow the used CPU resource amount to exceed the tolerable used CPU resource and which has the highest encryption strength can be selected for each event slot. Therefore, an optimum encryption algorithm can be used in accordance with variations in the CPU utilization rate.

The event and used-resource table 68 is not limited to the example shown in FIG. 25. For example, as in the column dedicated to encryption algorithms in FIG. 26, encryption algorithm names and resource amounts may be described in separate columns.

Embodiment 8

Next, as Embodiment 8, an embodiment in which above-described Embodiment 7 and Embodiment 6 are combined will be described. In other words, the present embodiment is a modification of Embodiment 7 such that, as in Embodiment 6, a preprocess is performed earlier in order to cope with a situation where a non-negligible amount of time is required by a preprocess for encrypted communications.

FIG. 27 shows an example of the event and used-resource table 68 used in the present embodiment, which includes a preprocess column and a preprocess encryption algorithm column being further added to the event and used-resource table 68 shown in FIG. 25. In the preprocess column, a time required for a preprocess Mt(sec.)=Im/Ycpu, as illustrated in Embodiment 7, is described. In the preprocess encryption algorithm column, the name of an encryption algorithm which is the subject of a preprocess is described. The preprocess column may be omitted if it is unnecessary.

Next, a procedure of generating the event and used-resource table 68 of FIG. 27 from the event and used-resource table 68 of FIG. 25 will be described. For 3DES-CBC, which is the encryption algorithm scheduled to be used first, Mt(sec.)=Im/Ycpu is calculated based on a state existing immediately before 11:45. Let us assume that the result of this calculation is Mt=180(sec.). Since it is necessary to begin a preprocess at Mt before 11:45, a row having an event time column indicating 180 seconds before 11:45, i.e., 11:42, is inserted. Then, Mt1=180 is written in the preprocess column of this row, and "3D" (as an abbreviation of 3DES-CBC) is written in the preprocess encryption algorithm column.

Since the encryption algorithm is switched to DES-CBC at 12:00, Mt(sec.) is calculated based on a state existing immediately before this. Let us assume that the result of this calculation is Mt=120(sec.). Since it is necessary to complete the preprocess by 12:00, a row having an event time column indicating 120 seconds before 12:00, i.e., 11:58, is inserted. Then, Mt2=120 is written in the preprocess column of this row, and "D" (as an abbreviation of DES-CBC) is written in the preprocess encryption algorithm column.

Since the encryption algorithm is switched to 3DES-CBC at 13:00, Mt(sec.) is calculated based on a state existing immediately before this. Let us assume that the result of this calculation is Mt=225(sec.). Since it is necessary to complete the preprocess by 13:00, a row having an event time column indicating 225 seconds=3.75 minutes=about 4 minutes (where 15 seconds are given as a margin) before 13:00, i.e., 11:56, is inserted. Then, Mt3=225 is written in the preprocess column of this row, and "3D" (as an abbreviation of 3DES-CBC) is written in the preprocess encryption algorithm column.

Into the task/resource, code/resource, total resource columns of each inserted row, the corresponding contents from the immediately upper row are copied.

By using the event and used-resource table 68 thus generated, the schedule section 64 performs the activation/ controlling/stopping of tasks a to c, preprocesses for the code processing, and the code processing. Since the preprocess can be completed before each encryption algorithm is used, it is possible to start an encrypted communication application (e.g., a camera application) at a preprogrammed time.

In the present embodiment, as an encryption/decryption processing section 80, that which is capable of executing a given encryption algorithm and a preprocess for another encryption algorithm in parallel is provided.

Note that, in the case where another task is added or stopped in a time zone in which to perform a preprocess, the CPU resource margin Ycpu (MIPS) will vary, rather than being a constant value, and thus it is impossible to calculate Mt(sec.) simply as Im/Ycpu. Therefore, in such a case, an integral of CPU resource margins Ycpu (MIPS) may be calculated retrospectively from the time by which the preprocess must be completed, and a length of time at which the integral equals the number of instructions to be executed Im (unit: MI or megainstructions) for the CPU processing required for the preprocess may be adopted as Mt(sec.). In this case, a row with a new event time column is to be inserted in the event and used-resource table 68, not immediately before an encryption algorithm begins to be used or switched, but immediately before a number of rows above.

In the event and used-resource table 68 shown in FIG. 27, it is ensured that a preprocess is performed at 12:56 for 3DES-CBC, which is to be used next. However, after 3DES-CBC is switched to DES-CBC at 12:00, the public key, secret key, or the like for 3DES-CBC may be retained, rather than being destroyed, so that 3DES-CBC can be again used; thus, the preprocess set at 12:56 may be omitted. As a result, the consumption of CPU resource due to reexecuting of the preprocess can be reduced.

Embodiment 9

Next, as Embodiment 9, an example will be described where there are as many as three candidate encryption algorithms in Embodiment 8. FIG. 28 and FIG. 29 illustrate examples of an event and used-resource table 68 and an encryption process and used-resource table 76 in the case where there are three candidate encryption algorithms of DES-CBC, 3DES-CBC, and AES (Advanced Encryption Standard). AES has a rather high encryption strength in spite of its small average used CPU resource amount, and ranks in the first place in terms of encryption strength among the three encryption algorithms. In the event and used-resource table 68, total resources a recalculated respectively for the three candidate encryption algorithms. Taking the event time of 11:45 for example, the encryption algorithms which do not exceed the tolerable used CPU resource of 500(MIPS) are DES-CBC, 3DES-CBC, and AES. The schedule section 64 notifies these three candidates to the encryption information determination section 74. In the schedule and used-resource table 66 shown in FIG. 19, it is stipulated that an encryption algorithm to be used for task b beginning at 11:45 must have a third or higher encryption strength. This information is also notified from the schedule section 64 to the encryption information determination section 74. By referring to the encryption process and used-resource table 76 in FIG. 29, the encryption information determination section 74 selects from among the three encryption algorithms those having a third or higher encryption strength and further selects one that ranks the highest in terms of encryption strength among them (which herein is AES), and notifies it to the schedule section 64. Then, the schedule section 64 writes "AES" (abbreviated as A) in the used encryption algorithm column for an event time of 11:45.

Embodiment 10

In a Diffie-Hellman exchange or a shared key exchange according to IKE, it is possible to set a life for a shared key. Using a single key for a long period of time will increase the likelihood that the key may be stolen during such a period for deciphering purposes. Therefore, it would be effective to generate a new key, i.e., an update key, and switch to the update key after an appropriate period of time. In the method of setting such a key life, it is necessary, before the key life expires, to complete the generation of an update key to be used next. The generation of an update key is referred to as a rekeying process. Both the generation of the first key and the rekeying process are likely to require as large CPU resource for the key generation as for encryption and decryption. Therefore, it is desirable to start a rekeying process at a time which is sufficiently earlier than the time at which the key life expires. However, if a high CPU resource-consuming application exists in a time zone in which to perform a rekeying process, the CPU processing load may exceed the tolerable used CPU resource, so that the update key may not be prepared in time.

Therefore, in Embodiment 10, the value of key life until updating of a key and transitions in total used resource based on a preprogramming schedule are taken in to consideration, and an appropriate rekeying process start time is added as an event in the event and used-resource table 68.

First, a key life time column is provided in the encryption process and used-resource table 76, and a key life time Jt to be set for each encryption algorithm is described. Generally speaking, for a given a constant overall danger level, the key life can be made longer as the algorithm has a higher encryption strength. Assuming that the start time of using an encryption algorithm is Ct and that the start time of using the first key is Kt1, then the start time of using the first key is Kt1=Ct, and the key life expiration time is (Ct+Jt). Assuming that a CPU resource margin in the time zone before the time (Ct+Jt) is Ycpu (MIPS) and that the number of CPU instructions necessary for the rekeying process is Ir (unit: MI or megainstructions), then the time required for there keying process is Rt=Ir/Ycpu. By beginning a rekeying process by the time (Ct+Jt−Rt), an update key can be prepared before reaching the key life expiration time (Ct+Jt).

In the case where the CPU resource margin Ycpu (MIPS) is not constant but varies in the time zone in which a rekeying process is to be performed, based on the same principle in Embodiment 8 regarding preprocesses, an integral of CPU resource margins Ycpu (MIPS) may be calculated retrospectively from the time (Ct+Jt) by which the rekeying process must be completed, and a length of time at which the integral equals the number of instructions to be executed Ir for the CPU processing required for the rekeying process may be adopted as Rt.

Next, a rekeying process event row whose event time is the rekeying process start time (Ct+Jt−Rt) is inserted into the event and used-resource table 68, thus writing the rekeying process into the schedule. This operation can be accomplished by performing between the schedule section 64 and the encryption information determination section 74 an operation similar to that which was described with respect to preprocesses for encrypted communications.

As for the life of the next update key, since the key life expiration time will be (Ct+2*Jt), a rekeying process start time shall be calculated with respect to this time, and an additional event shall be accordingly provided. Similar operations are to be performed until reaching an event time at which the use of the encryption algorithm is to be ended.

Thus, according to the present embodiment, rekeying processes can be previously scheduled in accordance with the scheduled CPU resource margins Ycpu (MIPS). Therefore, system failures due to the tolerable used CPU resource being exceeded at the time of rekeying processes can be prevented.

It would be safer to prescribe Rt so as to be a predetermined period of time a longer for providing some margin.

Generally speaking, key life management can be accomplished by, for example:

(1) a time-based management technique (for example, a key life is defined in terms of a lapse of time (X seconds) since the key is generated or a lapse of time (Y seconds) since the use of the key is started); or (2) a data transfer amount-based management technique (for example, a key life is defined in terms of a number of processed packets (m packets) or a number of processed bytes (n bytes)). The present embodiment can be easily applied to technique (1), in the case where the key life is defined in terms of a lapse of time since the use of the key is started. In the case where the key life is defined in terms of a lapse of time since the key generation, the following measures can be taken. The key generation time may not be identical between the present communication device and the communication counterpart device. Specifically, key generation is generally performed in such a manner that one's own secret key is generated only after receiving a disclosed value from its counterpart, so that one of the key life expiration times will inevitably be later by the time required for generating its own secret key after receiving the disclosed value. This time relationship is determined by the device which activates key generation, and the procedure of key generation. In the case where the key generation at one end occurs later than at the other end, a value of Jt which is calculated from the generation time of the earlier-generated key may be defined as a key life; thus, during the time Jt, both keys will be in their respective lifetimes and neither key life will expire. In the case where the present device and the counterparting device can communication with each other to know the completion of key generations at both ends, the key life calculation may be made from this point in time, thus resulting in both key life expiration times being equal.

Although the above description is directed to an example where only the processing time at the present communication device is taken into consideration, a shared key processing would also entail a processing time and a communication time at the counterparting device. In order to take such into consideration, the key generation processing time at the counterparting device may be stored during a preprocess, and Rt can be calculated by adding to this the aforementioned Rt=Ir/Ycpu for the present communication device plus a margin time. However, in the case where the processing time at the counterparting device is negligible, Rt may be calculated by simply adding a margin a to Ir/Ycpu. On the other hand, in the case where the processing time at the counterparting device is substantially equal to the processing time at the present communication device, it may be defined that Rt=(Ir/Ycpu)×2+β (where β is the communication time plus a margin time). In the case where the processing time may be affected not only on the present device but also on the counterparting device due to some other regular application, Rt may be determined after performing a process of inquiring the counterparting device about its processing time. In any case, it may be defined that Rt=Ir/Ycpu+δ+β (where δ is a processing time at the counterparting device).

As already described, in a rekeying process, the generation of an update key must be completed by the key life expiration time (Ct+Jt*n) as calculated from the start time Ct of using the encryption algorithm. If the rekeying process is started slightly earlier in order to secure a margin for being able to finish the update key generation before the expiration of the life of a previous key, the key will be generated correspondingly earlier. If the life of this key is Jt, the life of this key may expire even before the life expiration time (Ct+Jt*(n+1)) of the next key as originally scheduled. In order to prevent this, the key life to be set in a rekeying process may be set so as to be slightly longer than the scheduled time intervals between key updates.

Embodiment 11

Next, as Embodiment 11, an embodiment in which a key life value is appropriately set in accordance with the transitions in the CPU resource margin Ycpu (MIPS) as scheduled from the event and used-resource table 68 will be described.

When the schedule section 64 and the encryption information determination section 74 have selected an encryption algorithm to be used, the schedule section 64 checks the CPU resource margin Ycpu (MIPS) in the time zone before the start time Ct of using an encryption algorithm, by referring to the schedule and used-resource table 66 and the encryption process and used-resource table 76, or by referring to the event and used-resource table 68. Then, the schedule section 64 ascertains a time required for the rekeying process Rt=Ir/Ycpu, and further calculates (Rt+α), and notifies this value to the encryption information determination section 74 as a key life. Herein, α is a margin. Therefore, the key life expiration time is (Ct+Rt+α). Next, the CPU resource margin in the time zone before (Ct+Rt+α) is checked, a time required for the rekeying process is calculated and used as a life for the next update key. By repeating such processes, the start time of each rekeying process is added as an event. Thus, a rekeying process is begun as soon as a key life is expired, and a newly-generated key can immediately begin to be used upon completion of the rekeying process.

In this manner, a rekeying process can be performed early on, by effectively utilizing the CPU resource margin Ycpu (MIPS). As a result, the key life can be shortened, making it possible to keep a high encrypted communication security.

In the case of utilizing only a portion of the CPU resource margin Ycpu (MIPS), more margin can be left in the CPU resource, although a long rekeying processing time will be required and thus the key life time will need to be prolonged accordingly.

According to the present embodiment, it is possible to plan a schedule of the aforementioned flexibly processing.

The present embodiment is preferably applied to a time-based technique of key life management.

Embodiment 12

According to Embodiment 8 which was illustrated with reference to FIG. 27, and Embodiment 9 which was illustrated with reference to FIG. 28 and FIG. 29, a preprocess of exchanging shared keys is performed immediately before using an encryption algorithm, and immediately before switching encryption algorithms. However, in the case where a plurality of encryption algorithms are switchably used in a single encrypted communication application, a required plurality of shared keys may be generated all at once before starting the encrypted communication application. In this case, taking FIG. 27 for example, events may be inserted such that preprocesses Mt1, Mt2, and Mt3 are sequentially executed by 11:45.

In order to generate a key early on in the aforementioned manner, the life of a key is preferably defined as, for example:

(1) J seconds after it begins to be used;

(2) after m packets are processed after it begins to be used; or (3) after n bytes are processed after it begins to be used. In the case where it is necessary to define a key life in terms of a lapse of time from the key generation, a time obtained by adding a period of time to lapse before the key is actually used after generation to time (1) above may be set as the key life.

Embodiment 13

In the case where it is predictable on the schedule that "the processing load will increase a seconds after starting an encrypted communication application", keys to both a high-strength/high-load encryption algorithm and a low-strength/low-load encryption algorithm may be prepared during a preprocess to be performed before starting the encrypted communication application, and at a point when the schedule predicts an increase in the overall processing load, the high-strength/high-load encryption algorithm may be switched to the low-strength/low-load encryption algorithm. In this case, after switching the encryption algorithm to the low-strength/low-load encryption algorithm, the key information concerning the high-strength/high-load algorithm may be explicitly deleted, thus reducing the waste on memory resource.

Note that it is commonplace to determine a key life in cooperation with a communication counterpart. When deleting a key, it must be notified to the communication counterpart, which will incur a communication processing load. Such a processing load may also be reflected on the schedule and used-resource table 66 and the event and used-resource table 68.

Alternatively, the key life of the high-strength/high-load encryption algorithm may be prescribed to be until the time the overall processing load increases (or around that time), whereby the notification of a key deletion can be omitted.

Embodiment 14

In each of the above-described embodiments, CPU resource (MIPS) is paid attention to as the used resource, and effective utilization of the CPU and prevention of system failure are ensured within the bounds of tolerable used CPU resource as the tolerable amount of used resource. However, there are other resources in the communication device, e.g., used memory size (MB) and time occupancy rate on internal bus lines (%). For example, if the used memory size exceeds the system RAM size(e.g., 521 MB), swapping to the HDD will occur frequently, so that some applications may not be executed as preprogrammed, or the service may be temporarily suspended. Similar problems may also occur if the time occupancy rate on internal bus lines (%) exceeds 100%. Such problems can be substantially prevented by reducing the used resource, i.e., the average used memory size or the average time occupancy rate on internal bus lines, to a tolerable amount of used resource of about 50% of the maximum value, for example.

With respect to the total value of the used memory size or the time occupancy rate on internal bus lines (%), too, the aforementioned schedule and used-resource table 66 and event and used-resource table 68 may be generated, based on which an encryption algorithm not exceeding the tolerable value can be selected.

Moreover, the selection of an encryption algorithm may be made based not only on just one of the three factors of the CPU resource, used memory size, and time occupancy rate on bus lines, but on a comprehensive utilization rate involving two or three factors. Such a comprehensive utilization rate can be represented as, for example, a weighted average value obtained by multiplying the utilization rate concerning each factor by a predetermined weight.

Embodiment 15

In each of the above-described embodiments, execution of an application is preprogrammed via the remote control 102 or externally. It is envisaged that an external preprogramming may be made from a hand-held type information device or a cellular phone via an Internet connection network.

In the structure of FIG. 18 or FIG. 23, an application that is dedicated to schedule registration may be further provided for accepting a preprogramming request, and the preprogramming request may be notified to the schedule section 64, so that the schedule section 64 can reflect the preprogramming request on the schedule and used-resource table 66. Alternatively, each application may temporarily accept only those preprogramming requests which relate to the application itself, and request the schedule section 64 to register the same. In the latter technique, registrations can be made in a format which is unique to each application.

Embodiment 16

Figure 30:
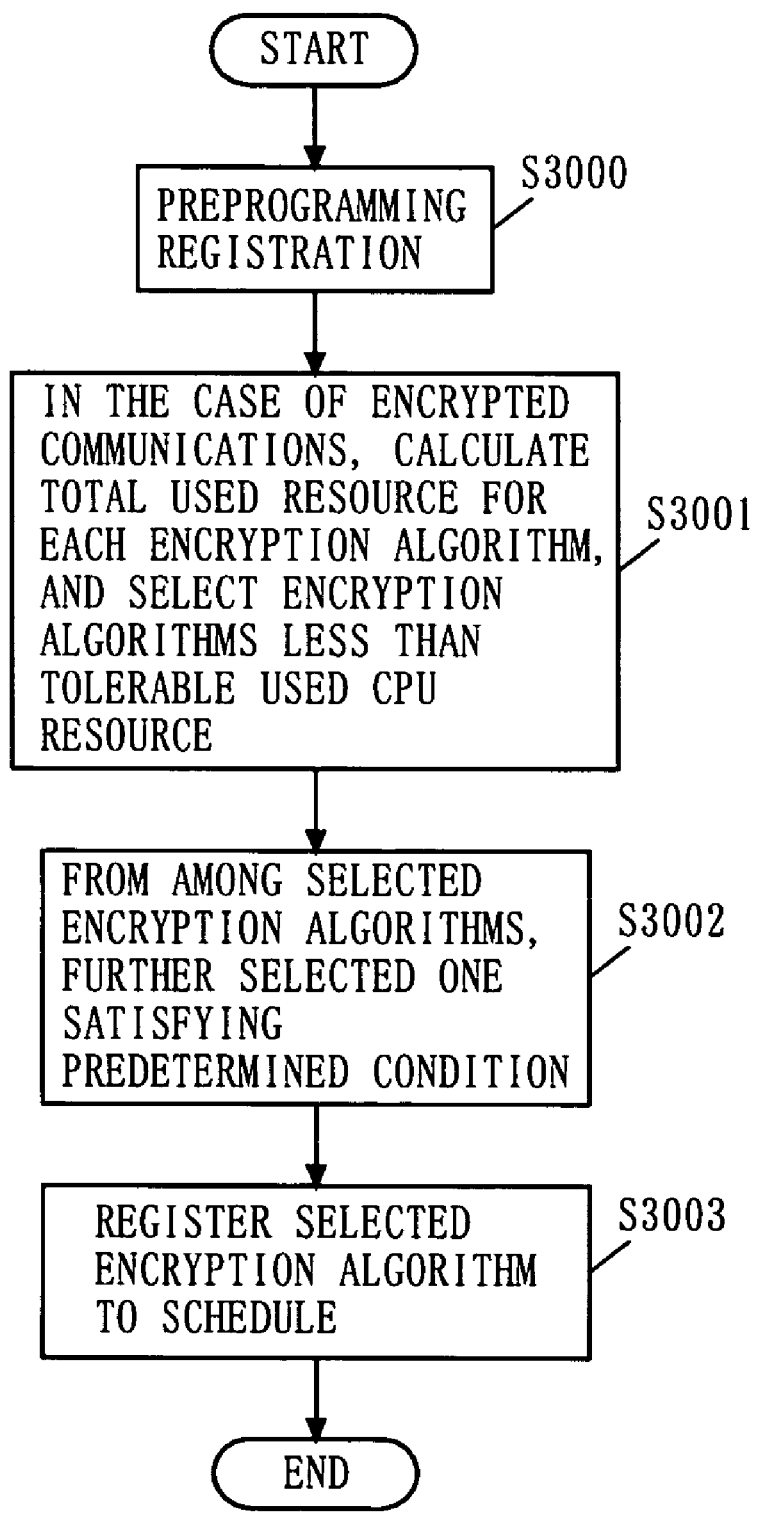
FIG. 30 is a flowchart illustrating an exemplary procedure of an algorithm selection method according to the present invention.

FIG. 30 is a flow chart illustrating the basic procedures of an algorithm selection method to be used by the communication devices illustrated in Embodiments 5 to 15 above. Each procedure in the flowchart is basically to be executed by the CPU 94 of the communication device in accordance with a program.

First, in a preprogramming registration procedure of step S3000, the communication device accepts a preprogramming of an application, and registers it in the schedule. This registration is primarily a temporary registration. In a total average used CPU resource calculation procedure of step S3001, it is determined whether the accepted application will perform an encrypted communication. If it will perform an encrypted communication, a total average used CPU resource is calculated, including any other application that has already been accepted. This process is performed for each of the plurality of encryption algorithms prepared. Then, an encryption algorithm which will not exceed the tolerable used CPU resource at any point on the schedule is preliminarily selected. In an encryption algorithm selecting procedure of step S3002, from among the preliminarily-selected encryption algorithms, an encryption algorithm that satisfies the condition concerning necessary encryption strength is selected. In a schedule registration procedure of step S3003, the processing of the selected encryption algorithm is registered in the schedule.

In step S3001 above, rather than preliminarily selecting an encryption algorithm which will not exceed the tolerable used CPU resource in any event slot on the schedule, an encryption algorithm which will not exceed the tolerable used CPU resource for each event slot may be preliminarily selected, and at step S3002, an encryption algorithm that satisfies the condition concerning necessary encryption strength may be selected from among the preliminarily-selected encryption algorithms with respect to each slot. Thus, the likelihood of selecting an encryption algorithm having a higher encryption strength in a slot having plenty of CPU resource will be increased.

In any of the above steps, preprogramming of an application would be impossible in the case where the total average used CPU resource exceeds the tolerable used CPU resource, or in the case where no encryption algorithm is found at step S3002 that satisfies the predetermined condition; therefore, such is notified (replied or displayed) to the origin of the preprogramming request (which typically is the user).

In a situation where it is impossible to preprogram an application as described above, the schedule information may be presented to the origin of the preprogramming request, and the origin of the preprogramming request may be permitted to change the encryption algorithm of the encrypted communication application which has been temporarily-registered or for which a preprogramming registration has already been complete, thus giving priority to certain preprogrammings. Moreover, among the encryption algorithms of the encrypted communication applications which have been temporarily-registered or for which a preprogramming registration has already been complete, a tentative reselection of an encryption algorithm may be performed for those having the highest processing load or having the highest encryption strength (so that those having a lower encryption strength are selected instead) (including recalculating of the total average used CPU resource), and if it is determined possible to register a new encrypted communication application, the new encrypted communication application may be registered after actually reselecting the encryption algorithm as above. At this time, if necessary, the reselection of an encryption algorithm may be performed after relaxing the condition concerning necessary encryption strength illustrated with reference to FIG. 19 so as to allow encryption algorithms having lower encryption strength to additionally become selectable. For any event slot for which an encryption algorithm could not be selected, the condition concerning necessary encryption strength may be relaxed, and one having a higher encryption strength may be selected from among encryption algorithms which have thus become selectable. Such alterations of the contents of the registrations may be automatically performed, or, selection of the above methods or encryption algorithms themselves may be permitted based on a selection instruction from the origin of the preprogramming request.

However, there may be cases where it is unnecessary to relax the condition concerning necessary encryption strength as described above. Specifically, if an encryption algorithm which ranks in the first place in terms of encryption strength has been adopted and registered under a condition such as "necessary encryption strength: third or higher", this encryption algorithm can be changed to one having a lower encryption strength (i.e., one that ranks in the second or third place in terms of encryption strength), so that it might become possible to preprogram and register an encrypted communication by a new encrypted communication application.

Apart from reselection of an encryption algorithm, depending on the types of applications, the start times of their execution (including regular applications) may be shifted so as to enable registration of a newly requested application. In the case where the average data transfer amount for encrypted communications can be controlled by the encrypted communication application, this value can be lowered to reduce the total average used CPU resource and enable registration of a newly requested application. In the case where such changes are to be to be made by the origin of the preprogramming request, authentication may be performed so that only those having the permission to make such changes are allowed to make the changes.

Figure 31:
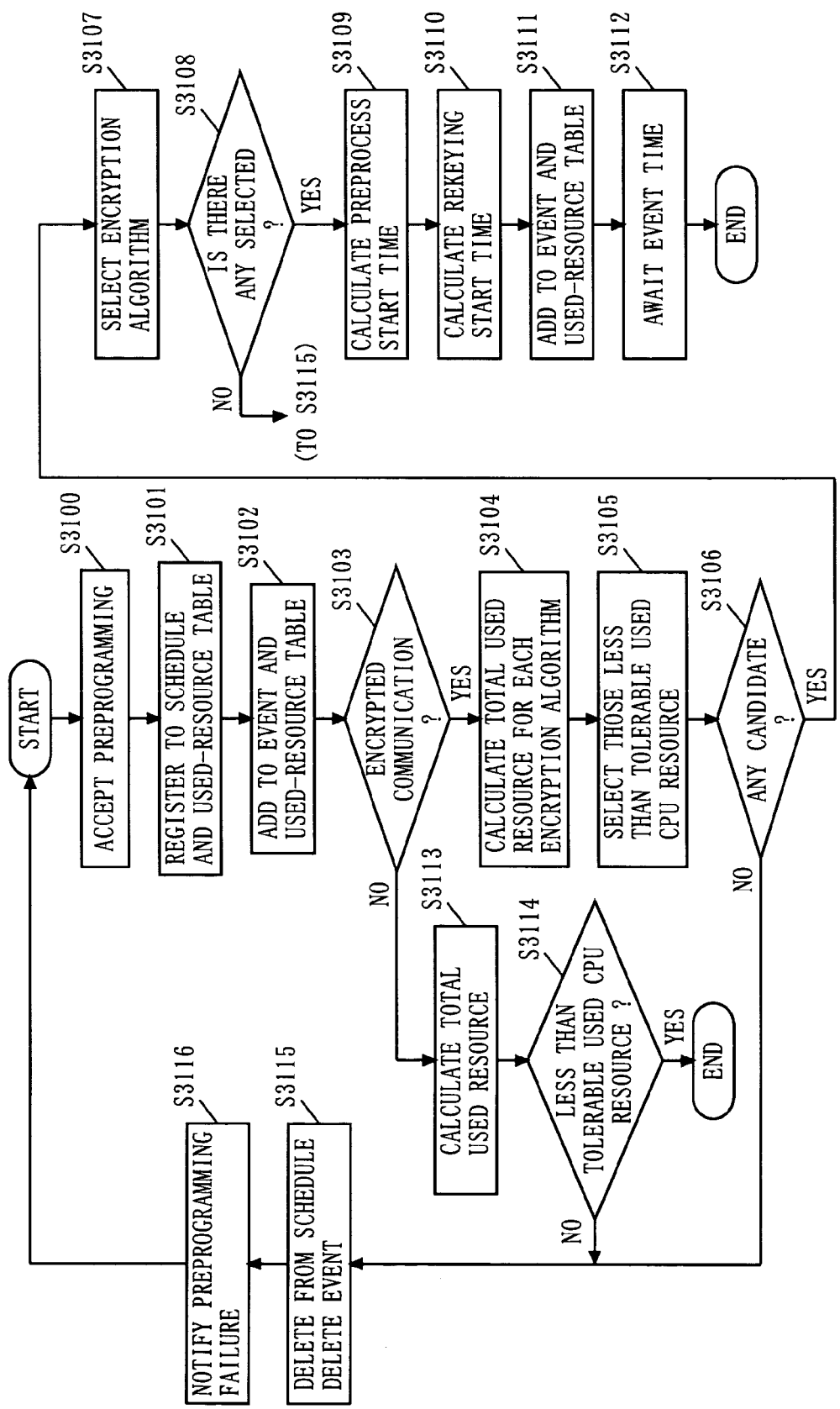
FIG. 31 is a flowchart illustrating another exemplary procedure of an algorithm selection method according to the present invention.

FIG. 31 is a more detailed flowchart than FIG. 30. At step S3100, if a preprogramming of an application is made, the communication device accepts the preprogramming. At step S3101, the preprogramming is registered to the schedule and used-resource table 66. This is a temporary registration. At step S3102, an event is added to the event and used-resource table 68 based on the schedule and used-resource table 66. At step S3103, it is determined whether the temporarily-registered preprogramming is a preprogramming of an encrypted communication application. If the result of this determination is YES, in addition to various applications which have already been registered, the total average used CPU resource in the case where of using each of the plurality of encryption algorithms prepared is calculated with respect to each event slot. At step S3105, an encryption algorithm(s) which will not exceed the tolerable used CPU resource is preliminarily selected as a candidate(s). The number of encryption algorithms to be selected here may be plural, one, or none. At step S3106, it is determined whether there is one or more candidate encryption algorithms, and if the result of this determination is YES, an encryption algorithm that satisfies a predetermined condition is selected at step S3107. The predetermined condition is the necessary encryption strength shown in FIG. 19. If there is any encryption algorithm that satisfies the predetermined condition, the determination of step S3108 is YES. At step S3109, calculation of the start time of a preprocess, such as shared key exchanging, is performed by the method described in Embodiment 6. At step S3110, calculation of the start time of a rekeying process in case of expiration of a key life is performed by the method described in Embodiment 10. At step S3111, the time at which to use the selected encryption algorithm, the time to execute the preprocess, and the start time of the rekeying process are registered to the schedule, i.e., inserted and added to the event and used-resource table 68. At step S3112, an event time is awaited. Alternatively, a next preprogramming may be awaited. When an event time comes, that event is executed.

If the result of the determination of step S3103 is NO, i.e., the preprogrammed application does not involve encrypted communications, a total average used CPU resource is calculated with respect to each event slot at step S3113. At step S3114, it is determined whether this total is less than the tolerable used CPU resource, and if the result of this determination is YES, the registration made at step S3101 and step S3102 becomes valid. If the result of the determination of step S3114 is NO, the application registered at step S3101 and step S3102 is deleted at step S3115. At step S3116, a notification that "preprogramming is impossible" or "preprogramming has failed" is made to the origin of the preprogramming request. If the result of the determination of step S3106 or step S3108 is NO, preprogramming fails because no usable encryption algorithm has been found, and the processes of step S3115 and step S3116 are performed.

Figure 32:
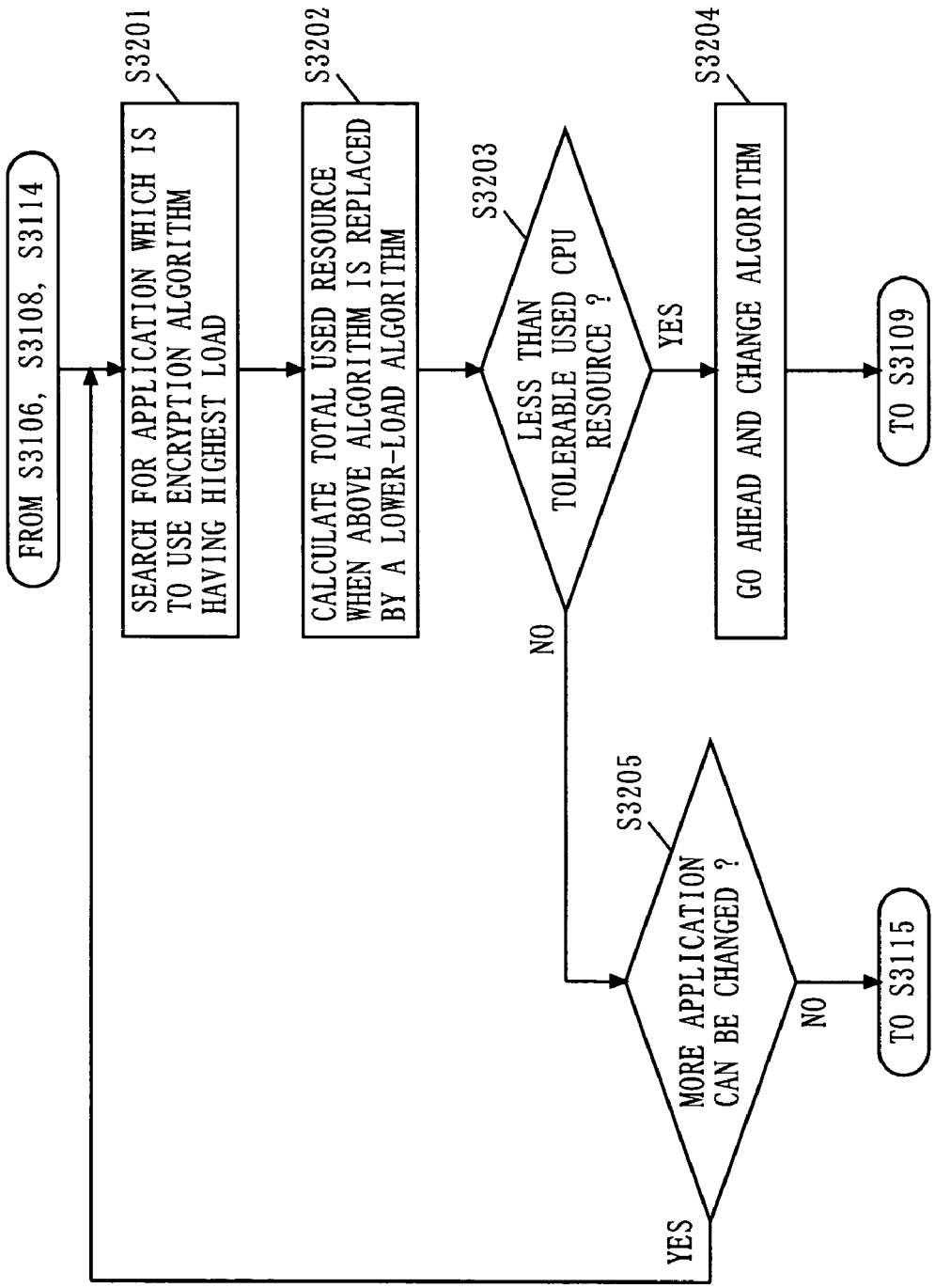
FIG. 32 is a flowchart illustrating still another exemplary procedure of an algorithm selection method according to the present invention.

FIG. 32 is a flowchart illustrating a procedure of a processing method which, in the case where the tolerable used CPU resource is exceeded such that no new preprogramming can be registered, changes the algorithms of existing applications so as to give margin to the CPU resource and grant the preprogramming request. If the result of the determination of step S3106, step S3108, or step S3114 in FIG. 31 is NO, that is, no encryption algorithm has been selected, an encrypted communication application which is going to use an encryption algorithm having the highest load among the encrypted communication applications which are already registered in the schedule is searched for at step S3201. At step S3202, assuming that the above encryption algorithm is changed to one having a lower load, a total used resource is calculated with respect to the changed encryption algorithm, the encrypted communication application for which a preprogramming request has been made, and the encryption algorithm to be used therein, and it is determined at step S3203 whether the result of this calculation falls below the tolerable used CPU resource. If the result of this determination is YES, the change of the encryption algorithm is finalized, and schedule changes are made at step S3109 and subsequent steps with respect to the changed encryption algorithm, the encrypted communication application for which a preprogramming request has been made, and the encryption algorithm to be used therein, including preprocesses, rekeying processes, and the like. If the result of the determination of step S3203 is NO, i.e., the tolerable used CPU resource is still exceeded, it is determined at step S3205 whether there is any more application whose encryption algorithm can be changed, and if the result of this determination is YES, control returns to step S3201, and an attempt to change the encryption algorithm for that application is made. If the result of the determination of step S3205 is NO, it is by no means possible to grant the preprogramming request, and therefore control returns to step S3115.

Figure 33:
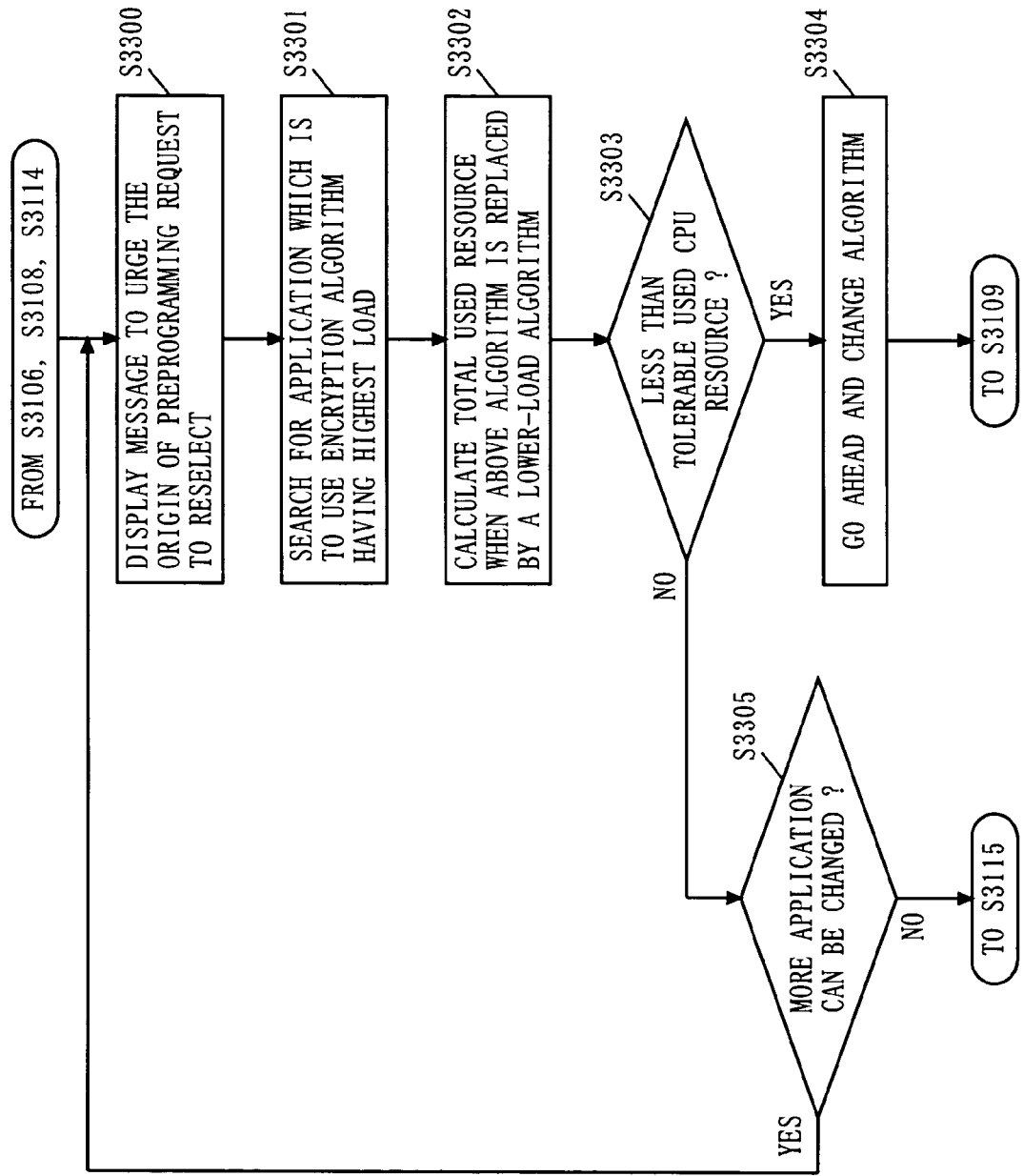
FIG. 33 is a flowchart illustrating still another exemplary procedure of an algorithm selection method according to the present invention.

FIG. 33 is a flowchart illustrating the procedure of an algorithm selection method which, in the case where the tolerable used CPU resource is exceeded such that no new preprogramming can be registered, displays a message to urge the origin of the preprogramming request (which typically is the user) to change the preprogrammings, and encryption algorithms are reselected based on the determination by the origin of the preprogramming request. If the result of the determination of step S3106, step S3108, or step S3114 in FIG. 31 is NO, that is, no encryption algorithm has been selected, a message is displayed at step S3300 to urge the origin of the preprogramming request to make a reselection. Looking at the message, at step S3301, the origin of the preprogramming request searches for and selects an encrypted communication application which is going to use an encryption algorithm having the highest load, among the encrypted communication applications which are already registered in the schedule. In response to this selection, assuming that the above encryption algorithm is changed to one having a lower load, the communication device calculates at step S3302 a total used resource with respect to the changed encryption algorithm, the encrypted communication application for which a preprogramming request has been made, and the encryption algorithm to be used therein, and determines at step S3303 whether the result of this calculation falls below the tolerable used CPU resource. If the result of this determination is YES, the change of the encryption algorithm is finalized, and schedule changes are made at step S3109 and subsequent steps with respect to the changed encryption algorithm, the encrypted communication application for which a preprogramming request has been made, and the encryption algorithm to be used therein, including preprocesses, rekeying processes, and the like. If the result of the determination of step S3303 is NO, i.e., the tolerable used CPU resource is still exceeded, it is determined at step S3305 whether there is anymore application whose encryption algorithm can be changed, and if the result of this determination is YES, a message to urge the origin of the preprogramming request to make a reselection is displayed at step S3300, and an attempt to change the encryption algorithm is made at step S3301 and subsequent steps. If the result of the determination of step S3305 is NO, it is by no means possible to grant the preprogramming request, and therefore control returns to step S3115.

As described earlier, the reselection of the encryption algorithms may involve the case where the condition concerning necessary encryption strength is relaxed as well as the case where the condition concerning necessary encryption strength does not need to be relaxed.

In the FIG. 33, at step S3301, the origin of the preprogramming request (which is the user) may be allowed to designate an encrypted communication application whose encryption algorithm is to be changed to one having a lower load, and a total used resource in the case where the designated encryption algorithm is changed to the one having a lower load may be calculated at step S3302. In this case, at step S3301, information enabling the origin of the preprogramming request (which is the user) to identify an encrypted communication application whose encryption algorithm can be changed, or information enabling the origin of the preprogramming request to select a desired encrypted communication application from among encrypted communication applications whose encryption algorithms can be changed may be presented to the origin of the preprogramming request, and also encryption algorithms for which preprogrammings have currently been registered and encryption algorithms which can be selected and changed (i.e., encryption algorithms which are candidates of change) may be presented to allow the origin of the preprogramming request to determine whether or not to actually carry out changing of an encryption algorithm, and determine the content to be changed. Furthermore, information indicating what sorts of encryption algorithms may be applicable or information of encryption strength and rankings of such encryption algorithms may be displayed or presented to the origin of the preprogramming request. As a result, the origin of the preprogramming request is not only permitted to determine whether or not to make a reselection, but also permitted to make such a determination while taking into consideration the contents thereof.

Embodiment 17

Cases where preprogrammings for encrypted communication applications, preprocesses, rekeying processes, and the like are registered or additionally registered have been described above. Even if a new, additional request for a preprogramming registration is made while the schedule section 64 is executing an event, it is possible to add events within the bounds of the tolerable resource amount described in each of the above embodiments. Upon receiving an additional request for a preprogramming registration, the schedule section 64 temporarily registers this preprogramming to the schedule and used-resource table 66, and separately generates a temporary event and used-resource table, by providing task columns concerning the additional application in the already-generated event and used-resource table 68 and further inserting an event row corresponding to a desired start time thereof and an event row corresponding to a desired end time thereof. Then, to the desired start time event row and desired end time event row which have been inserted, the descriptions of each task and encryption algorithm from the upper row are copied. Furthermore, in each event row from the desired start time event row to an event row immediately before the desired end time event row, a used resource amount which is desired to be additionally used is written. Thereafter, the schedule section 64 and the encryption information determination section 74 perform calculation of the total of used resource amounts and comparison of the total against the tolerable resource amount, and if the total proves less than the tolerable resource amount, further perform processes such as selecting encryption algorithms as necessary. If it is finally determined that a preprogramming can be added, the temporary event and used-resource table is adopted as a proper event and used-resource table 68, whereby it becomes possible to add to the event and used-resource table the application which has been additionally desired to be preprogrammed. The process concerning such determination of additional preprogrammings does not incur a large processing amount. Therefore, the used resource necessary for this process is small, so that there is substantially no possibility of a system failure. Since the amount of time required for this process is also very short, almost an immediate support can be obtained. In the case where an encryption algorithm is to be used, a preprogramming request must be made earlier by the amount of time necessary for the preprocess, or even earlier; otherwise, the start of the encrypted communication will be delayed.

On the contrary, when canceling a preprogramming for a given application which has already been registered, the task names composing the application, and also the related encryption algorithm name and used resource in the case of an encrypted communication, may be deleted from the columns in which they are written, for the relevant event time. Although this process can also be performed in a very short period of time, it is preferably not performed in any time zone during which the schedule section 64 is working by referring to the event and used-resource table 68, i.e., any time zone before or after an event time. In the case where a preprogramming for an application that uses an encryption algorithm is to be canceled, the events of any related preprocess and rekeying process are also to be deleted. At this time, the encryption algorithm of another application for which a preprogramming registration has already been complete may be presented to the origin of the preprogramming request so as to enable the origin of the preprogramming request to change the encryption algorithm, or a total average used CPU resource when assuming that an encryption algorithm has been reselected to replace one having the lowest load, or the lowest encryption strength (so as to enhance strength) may be calculated, and the change of the encryption algorithm may be carried out if this total does not exceed the tolerable used CPU resource. Apart from the reselection of algorithms, depending on the types of applications, the start times of their execution may be shifted so long as the tolerable used CPU resource is not exceeded, or in the case where the average data transfer amount for encrypted communications can be controlled by the application, this value can be increased to make the execution completion time earlier. In the case where these changes are to be made by the origin of the preprogramming request, authentication may be performed so that only those having the permission to make such changes are allowed to make the changes.

Figure 34:
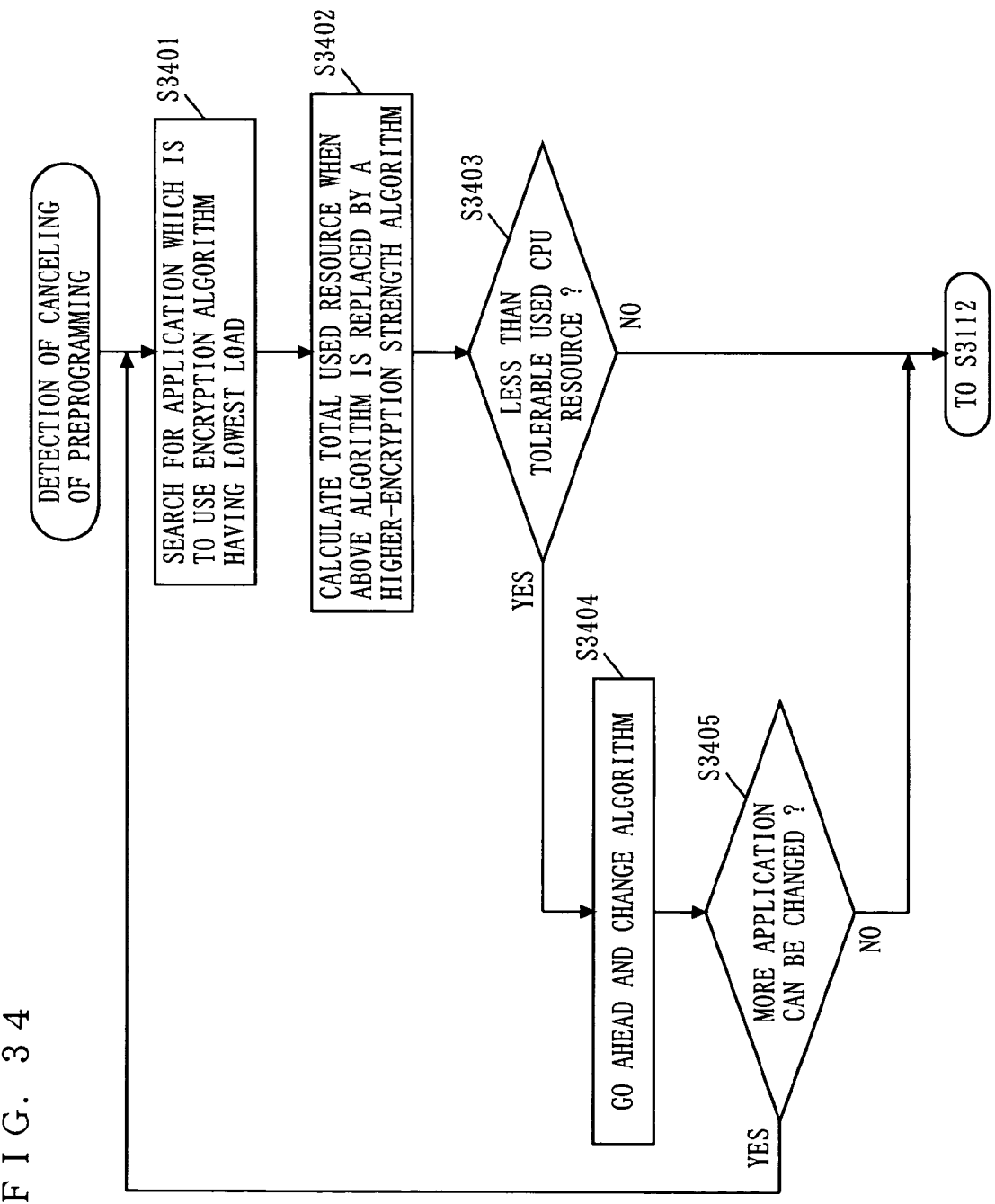
FIG. 34 is a flowchart illustrating still another exemplary procedure of an algorithm selection method according to the present invention.

FIG. 34 is a flowchart illustrating a procedure of an algorithm selection method which, in the case where the preprogramming for a given application is canceled, the resultant extra CPU resource is utilized to enhance the encryption strength of the encryption algorithm. When an instruction to cancel a preprogramming is received, the communication device searches for an encrypted communication application which is going to use an encryption algorithm having the lowest load at step S3401. At step S3402, a total used resource in the case where that encryption algorithm is changed to one having a higher encryption strength is calculated, and it is determined at step S3403 whether the total falls less than the tolerable used CPU resource. If the result of this determination is NO, the tolerable used CPU resource is insufficient, so that the encryption strength cannot be enhanced, and control proceeds to step S3112. If the result of the determination of step S3403 is YES, schedule changes including preprocesses, rekeying processes, and the like are made at step S3404 according to the change of encryption algorithms, as in step S3109, step S3110, or step S3111 in FIG. 31. At step S3405, it is determined whether there is any more application which can be changed, and if the result of this determination is YES, control returns to step S3401, and an attempt to enhance the encryption strength of the encryption algorithm is made. If the result of the determination of step S3405 is NO, control proceeds to step S3112.

Variations and Notes on the Embodiments

Regarding the case where the total used resource exceeds the tolerable amount of used resource, and the case where no encryption algorithm that satisfies the predetermined condition can be found, note that calculations for reselecting encryption algorithms may be performed for an encrypted communication application which has already been preprogrammed and an encrypted communication application for which a preprogramming request has been made, regardless of the predetermined condition if necessary (e.g., having a third or higher encryption strength); and if registration will be enabled, a reselection may be performed to allow the preprogramming registration. This also includes, in the case where an encryption algorithm having a rather higher-ranking strength among the encryption strengths satisfying the predetermined condition is adopted as the encryption algorithm for an encrypted communication application which has been preprogrammed, an operation of changing the encryption algorithm to one having a lower encryption strength under the same predetermined condition. This also includes relaxing the predetermined condition if there is no room for such changes. Alternatively, in the case where the total used resource exceeds the tolerable amount of used resource, or in the case where no encryption algorithm that satisfies the predetermined condition can be found, a change in the time to execute another application, a change to reduce the average data transfer amount for encrypted communications, or any other change may be made, and regardless of the predetermined condition if necessary, a reselection may be carried out by relaxing the condition, etc., so as to allow the preprogramming registration. A possible other change may be to lower the performance of another application to reduce the consumption of CPU resource. If such changes are possible, these changes may be adopted to redirect CPU resource to the processing of encryption algorithms.

In the above descriptions, the tolerable used CPU resource is assumed to be 50%. Moreover, an average used CPU resource is employed. This is because the CPU is also performing fundamental processing, such as OS processing or kernel processing, in addition to the processing of applications. In the processing of applications, a constant CPU resource will not necessary be consumed. Packets may arrive in chunks during communications, or in the case of TV broadcast transmissions, the data rate may vary depending on the particular image. Therefore, a margin for absorbing such fluctuations is necessary. To this end, an average used CPU resource is employed, and the tolerable used CPU resource is set to be a value smaller than 100%.

The formats of the schedule and used-resource table 66, event and used-resource table 68, and the encryption process and used-resource table 76, and the values within these tables, are not limited to those illustrated above. Any format which is different from those illustrated above can be used for the present invention so long as the necessary information can be expressed and resource calculations are enabled. Event times may be in seconds rather than minutes, or may have a sub-second resolution.

In the structure shown in FIG. 18, encryption/decryption information is exchanged between the encryption information determination section 74 and the encryption/decryption processing section 80. Alternatively, the encryption information determination section 74 may exchange with the encrypted communication applications 70 and 72 encryption/decryption information corresponding to that encrypted communication application, and the encrypted communication applications 70 and 72 may exchange with the encryption/decryption processing section 80 encryption/decryption information corresponding to the encrypted communication application themselves.

In the structure of FIG. 18, the schedule section 64 and the encryption information determination section 74 may be composed as a single block which handles the three tables, i.e., the schedule and used-resource table 66, the encryption process and used-resource table 76, and the event and used-resource table 68.

In the structure of FIG. 18, the encryption information determination section 74 and the encryption/decryption processing section 80 may be composed as a single block which handles the encryption process and used-resource table 76 and the encryption/decryption information and exchanges relevant information with the schedule section 64 or the encrypted communication applications 70 and 72.

In the case where the communication device of the present invention performs encrypted communications with a counterparting device, it is desirable that an encryption algorithm which is usable to both is made selectable. It would be needless to say that encrypted communications are not enabled if an encryption algorithm selected by the present communication device is not supported by the counterparting device. Therefore, at the stage of the aforementioned preprogramming, a negotiation for sharing usable encryption algorithms with the counterparting device is preferably performed.

In the case where there are fluctuations in packet transmissions during communications or mix-ups in the packet order as received or any delayed reception, the time at which a key in use is updated to a next update key may fluctuate and therefore fall before or after the expiration time of the key. This fluctuation is particularly possible at the receiving end. If such fluctuation time is accumulated until the start time of using the updated key is feared to be greatly offset from the time which was predicated on the schedule, the rekeying process start time may be shifted correspondingly. Such accumulations of fluctuation time will not occur so long as the network camera on the transmitting end performs updating of keys based on their life expiration times.

The present invention is applicable whether the encryption algorithm is an authentication algorithm or a compression algorithm. Therefore, the respective encryption algorithms described above are to be construed as including authentication algorithms and compression algorithms.

As a recording medium for recording a program for causing a computer to execute the respective procedures of the algorithm selection method according to the present invention, any arbitrary computer-readable recording medium having the program recorded thereon, e.g., a ROM, a RAM, a flexible disk, a CD-ROM, a DVD, a memory card, or a hard disk, may be used.

As the encryption/decryption information, in addition to an encryption algorithm, information which is necessary for the encryption/decryption processes may also be notified. For that matter, identifiers indicating an encryption algorithm and/or encryption/decryption keys may be notified.

Embodiment 18

Embodiments 1 to 17 above illustrate examples where the communication device selects an optimum encryption algorithm based on its own CPU utilization rate (or more generally, total used resource). However, when selecting an encryption algorithm, the CPU utilization rate of the communication counterpart (e.g., a network camera or a home appliance having a communication function) is not taken into consideration. Therefore, if an encryption algorithm having a high load is selected when there is not much CPU resource at the communication counterpart, the decryption process for encrypted packets at the communication counterpart may be delayed. Accordingly, as Embodiment 18, a communication device which can avoid such problems will be described.

Figure 35:
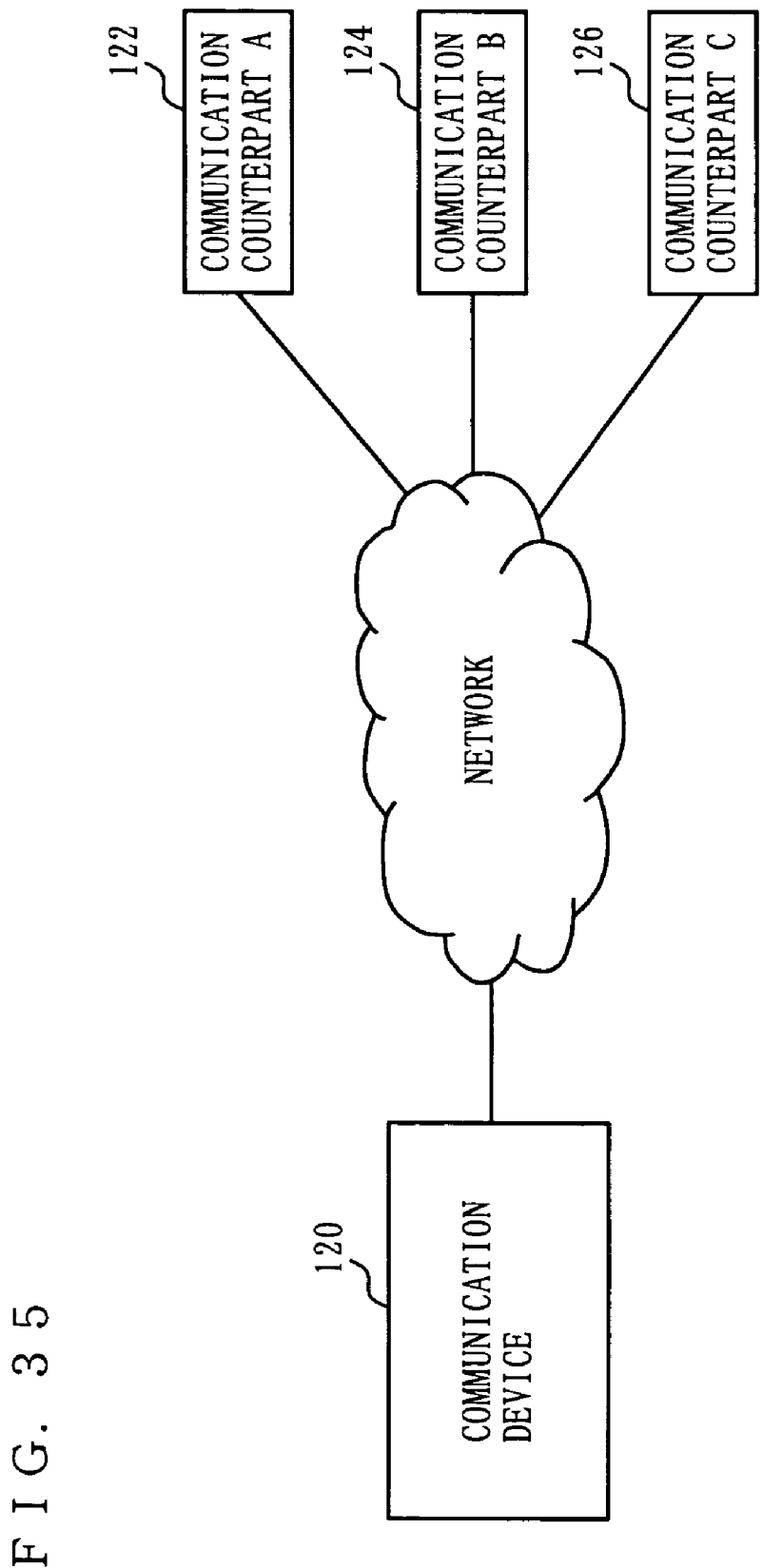
FIG. 35 is a block diagram illustrating the structure of a communication system according Embodiment 18 of the present invention.

FIG. 35 illustrates the structure of a communication system incorporating the communication device according to the present embodiment. As shown in FIG. 35, the communication device 120 is capable of communicating with one or more communication counterparts (i.e., communication counterparts 122, 124, and 126 in the example shown in FIG. 35) via a network.

First, prerequisites for the present embodiment will be described below.

<Prerequisites Concerning Encrypted Communications>

The communication device 120 encrypts packets to perform encrypted communications with one or more communication counterparts.

A plurality of encryption algorithms are available for the encryption, and any encryption algorithm which is supported by both the communication device 120 and the communication counterpart can be used.

Encryption/decryption keys are shared between the communication device 120 and the communication counterpart(s) at least by the time the encrypted communications are begun.

An encrypted packet contains an identifier for identifying at least an encryption algorithm which was used for the encryption of the packet and a set of encryption/decryption keys.

There is no particular requirements as to the method of encryption algorithm negotiation and the mechanism for sharing encryption/decryption keys.

<Prerequisites Concerning the Communication Counterparts>

When transmitting packets to the present communication device, the communication counterpart selects, in accordance with its own CPU utilization rate, an encryption algorithm which does not allow the CPU utilization rate to exceed the tolerable value, as do the communication devices according to Embodiments 1 to 15, and encrypts the packets according to this encryption algorithm.

When receiving an encrypted packet from the communication device 120, the communication counterpart decrypts the packet according to the encryption algorithm which was used for the packet.

Figure 36:
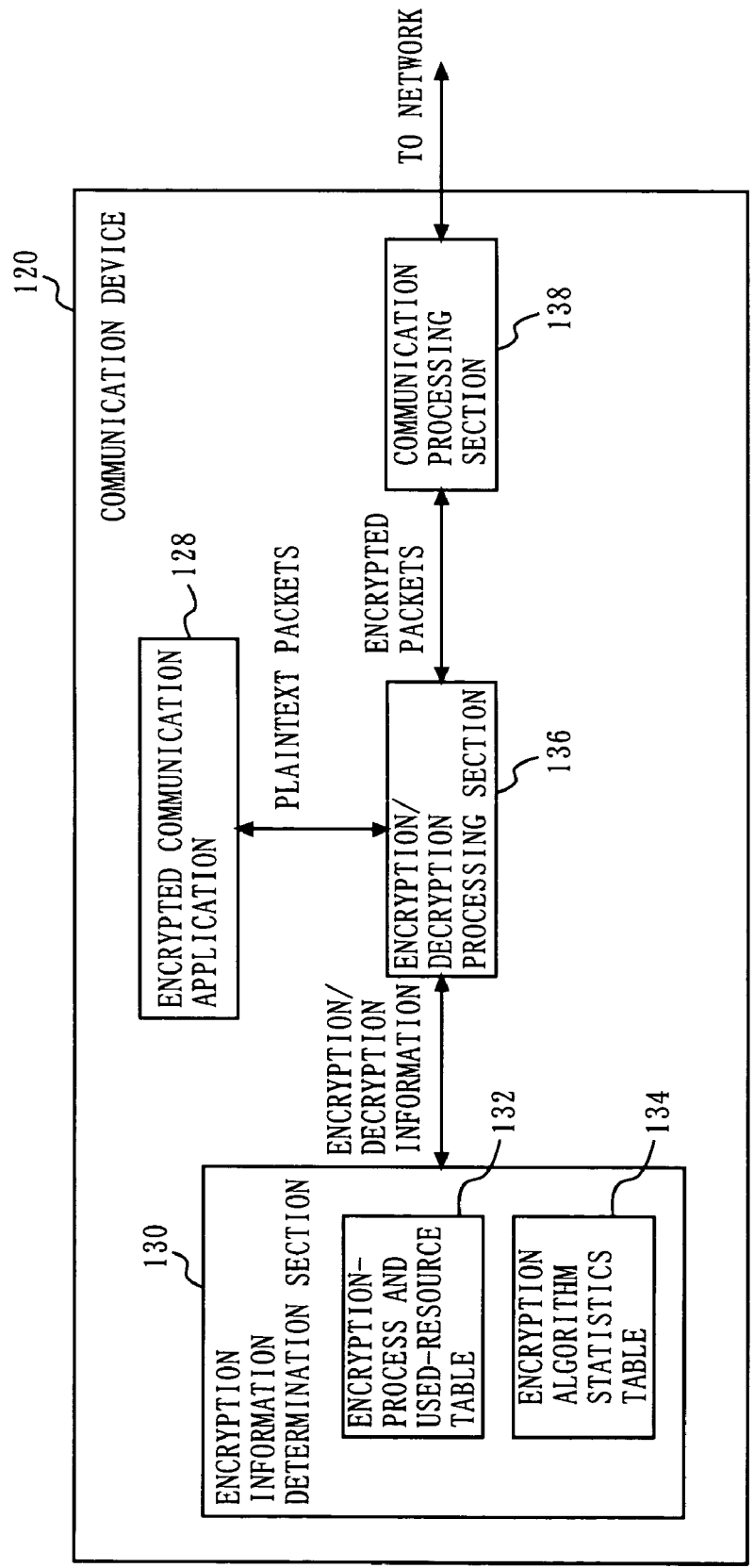
FIG. 36 is a block diagram illustrating the structure of a communication device according Embodiment 18 of the present invention.

FIG. 36 is a functional block diagram illustrating the structure of the communication device 120. In FIG. 36, the communication device 120 comprises an encrypted communication application 128, an encryption information determination section 130, an encryption/decryption processing section 136, and an communication processing section 138. The encryption information determination section 130 holds an encryption process and used-resource table 132 and an encryption algorithm statistics table 134.

FIG. 37 shows an example of the encryption process and used-resource table 132. In FIG. 37, "calculation amount" represents a load when performing code processing, whose value is a result of measurement taken with respect to a given communication counterpart. Instead of using a result of measurement for a communication counterpart, a result of measurement for the communication device 120, or a theoretical value which is calculated based on the encryption algorithm may be used. In FIG. 37, "calculation amount index" represents the order of calculation amounts, and is assigned with values 1, 2, 3, . . . etc., in the ascending order of calculation amount. "Encryption strength" represents the order of encryption strength.

FIG. 38 shows an example of the encryption algorithm statistics table 134. In FIG. 38, "Last" represents an encryption algorithm which was used for the packet last received from the communication counterpart. "Frequency" represents the number of past instances in which each encryption algorithm was used for received packets over a predetermined period of time (or for a predetermined number of received packets). In FIG. 38, any "*" indicated for frequency represents an encryption algorithm which has not been negotiated with the communication counterpart(s).

Figure 39:
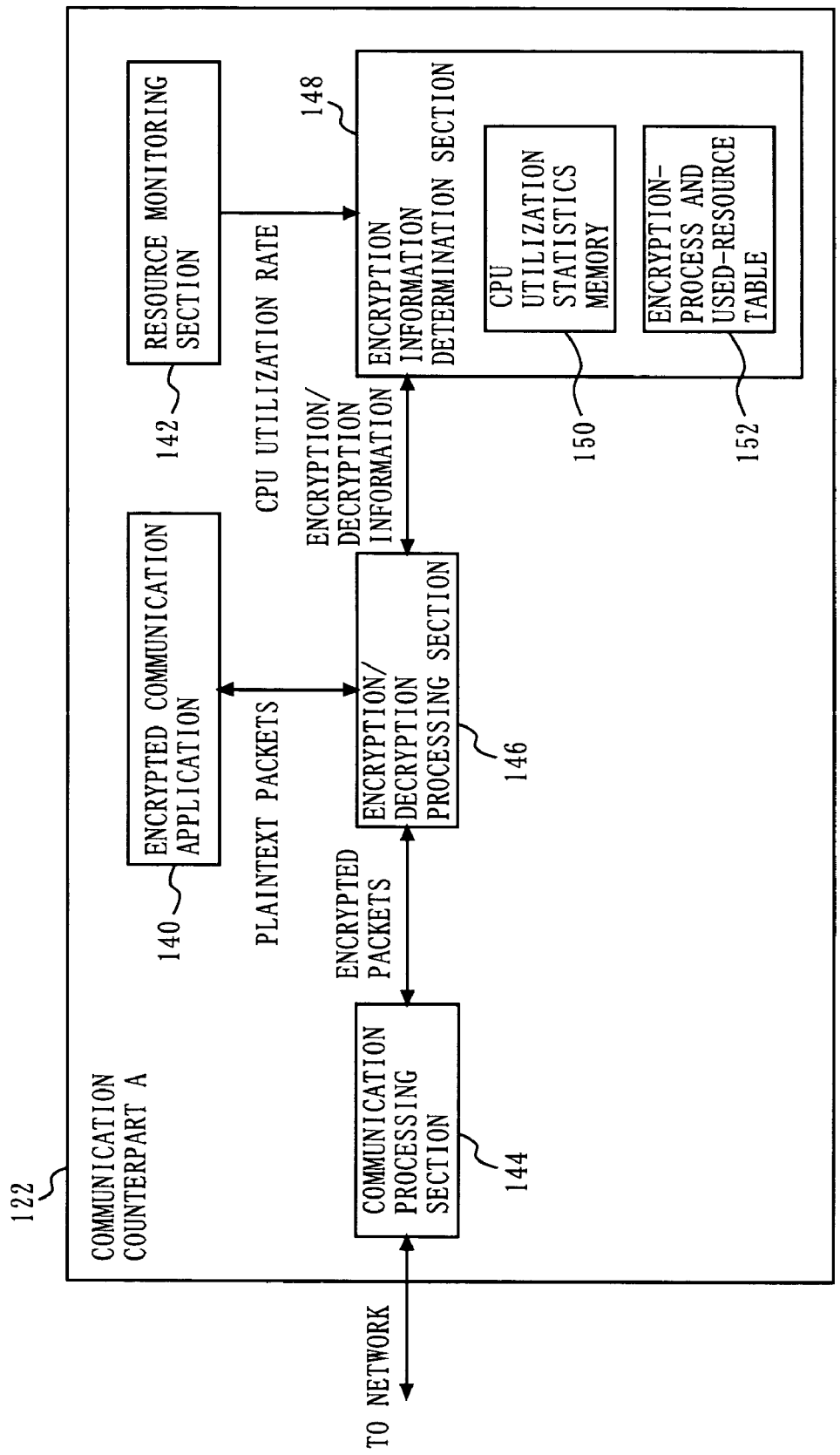
FIG. 39 is a block diagram illustrating the structure of a communication counterpart according to Embodiment 18 of the present invention.

FIG. 39 is a functional block diagram illustrating the structure of the communication counterpart 122. In FIG. 39, the communication counterpart 122 (communication counterpart 122) comprises an encrypted communication application 140, a resource monitoring section 142, a communication processing section 144, encryption/decryption processing section 146, and an encryption information determination section 148. The encryption information determination section 148 holds an encryption process and used-resource table 150. The functions of the resource monitoring section 142, the communication processing section 144, and the encryption/decryption processing section 146 are similar to those described in FIG. 1. Moreover, the CPU utilization statistics memory 150 and the encryption process and used-resource table 152 are similar to those shown in FIG. 2. Since the communication counterparts 124 and 126 are similar in structure and operation to the communication counterpart 122, the descriptions of the communication counterparts 124 and 126 are omitted.

Hereinafter, the operation of the communication device 120 will be described.

First, the operation of the communication device 120 when receiving a packet will be described. The communication processing section 138 receives an encrypted packet from the communication counterpart via a network, and passes the received encrypted packet to the encryption/decryption processing section 136. The encryption/decryption processing section 136 analyzes this encrypted packet, and extracts an identifier for identifying an encryption algorithm and a set of encryption/decryption keys used for this encrypted packet (hereinafter referred to as "first identifier"). The encryption/decryption processing section 136 passes to the encryption information determination section 130 the first identifier and an identifier for identifying a communication counterpart of the communication device from which the encrypted packet was transmitted (hereinafter referred to as "second identifier"). Based on the first identifier received from the encryption/decryption processing section 136, the encryption information determination section 130 identifies the encryption algorithm and the set of encryption/decryption keys, and passes these to the encryption/decryption processing section 136. Moreover, based on the identified encryption algorithm and the set of encryption/decryption keys, and the second identifier received from the encryption/decryption processing section 136, the encryption information determination section 130 updates the encryption algorithm statistics table 134. By using the encryption algorithm and the set of encryption/decryption keys received from the encryption information determination section 130, the encryption/decryption processing section 136 decrypts the encrypted packet, and passes the packet which has thus been converted to plaintext to the encrypted communication application 128.

Next, the operation of the communication device 120 when transmitting a packet will be described. The encrypted communication application 128 generates a plaintext packet to be transmitted to the communication counterpart, and passes it to the encryption/decryption processing section 136. The encryption/decryption processing section 136 extracts the second identifier from the packet received from the encrypted communication application 128, and passes it to the encryption information determination section 130. Based on the second identifier received from the encryption/decryption processing section 136, the encryption information determination section 130 selects an encryption algorithm by referring to the encryption process and used-resource table 132 and the encryption algorithm statistics table 134. The details of this encryption algorithm selection process will be described later. The encryption information determination section 130 passes the selected encryption algorithm to the encryption/decryption processing section 136. The encryption/decryption processing section 136 encrypts the packet according to the encryption algorithm received from the encryption information determination section 130, and passes the encrypted packet to the communication processing section 138. The communication processing section 138 transmits the packet received from the encryption/decryption processing section 136 to the communication counterpart via a network.

Hereinafter, details of the encryption algorithm selection process performed by the encryption information determination section 130 when transmitting a packet will be described. As a prerequisite, the encryption information determination section 130 selects one of the one or more encryption algorithms which have been negotiated with the communication counterpart (encryption algorithms which are not indicated as "*" in FIG. 38). Moreover, the encryption information determination section 130 may select a different encryption algorithm for each communication counterpart.

Several variations are possible for the encryption algorithm selection method used by the encryption information determination section 130 when transmitting a packet. Hereinafter, six typical variations will be described.

(1) Select an encryption algorithm which was used for the packet last received from the communication counterpart to which packets are to be transmitted.

The communication counterpart selects an encryption algorithm in accordance with the CPU utilization rate when transmitting a packet, encrypts a packet according to this encryption algorithm, and transmits the encrypted packet to the communication device 120. Therefore, the encryption algorithm which was used for the packet received from the communication counterpart reflects the CPU utilization rate at the communication counterpart when transmitting that packet. Therefore, according to this method, if the encryption algorithm which was used for the packet last received from communication counterpart is a high-load encryption algorithm, it is presumable that the CPU of the communication counterpart has plenty of resource currently. Therefore, the encryption information determination section 130 selects the same high-load encryption algorithm that was used by the communication counterpart for transmission, and encrypts a packet using this encryption algorithm. On the other hand, if the encryption algorithm which was used for the packet received from communication counterpart is a low-load encryption algorithm, it is presumable that the CPU of the communication counterpart does not have much resource currently. Therefore, the encryption information determination section 130 selects the same low-load encryption algorithm that was used by the communication counterpart for transmission, and encrypts a packet using this encryption algorithm. For example, when transmitting a packet to communication counterpart A in a state where the encryption algorithm statistics table 134 shown in FIG. 38 is retained, the encryption information determination section 130 selects encryption algorithm 3DES-CBC, based on the "last" column for communication counterpart A. Similarly, when transmitting a packet to communication counterpart C, the encryption information determination section 130 selects encryption algorithm AES-CBC based on the "last" column for communication counterpart C.

In the case where this method is adopted, the encryption information determination section 130 needs to update the "last" column in the encryption algorithm statistics table 134 shown in FIG. 38 each time receiving an encrypted packet. With this method, the "frequency" column in the encryption algorithm statistics table 134 is not necessary.

(2) Select a most frequently-used encryption algorithm from among the encryption algorithms used for a predetermined number of packets received in the past from the communication counterpart to which packets are to be transmitted.

Since the CPU utilization rate of the communication counterpart is not always constant, if an encryption algorithm is selected based on only one received packet as in method (1) above, the result of selection may not be appropriate. Therefore, according to this method, the encryption information determination section 130 selects a most frequently-used encryption algorithm from among the encryption algorithms used for a predetermined number of packets received in the past from the communication counterpart to which packets are to be transmitted. For example, when transmitting a packet to communication counterpart A in a state where the encryption algorithm statistics table 134 shown in FIG. 38 is retained, the encryption information determination section 130 selects the most frequently-used encryption algorithm DES-CBC, from among the encryption algorithms used for the twenty packets which were received in the past, by referring to the "frequency" column in the communication counterpart A.

In the case where this method is adopted, the encryption information determination section 130 needs to update the "frequency" column in the encryption algorithm statistics table 134 shown in FIG. 38 each time receiving an encrypted packet. For example, in the case where an encryption algorithm is to be selected by taking into consideration twenty packets which were received in the past, a history of twenty packets is always retained in the "frequency" column of the encryption algorithm statistics table 134. With this method, the "last" column in the encryption algorithm statistics table 134 is not necessary.

(3) Select a most frequently-used encryption algorithm from among the encryption algorithms used for the packets which, in a predetermined period up to the present, were received from the communication counterpart to which packets are to be transmitted.

According to method (2) above, fairly anciently-received packets may be included among the predetermined number of packets received in the past, and such packets are not suitable material upon which to estimate the current CPU utilization rate at the communication counterpart. Therefore, according to this method, the encryption information determination section 130 selects a most frequently-used encryption algorithm, from among the encryption algorithms used for the packets which, in a predetermined period up to the present, were received from the communication counterpart to which packets are to be transmitted. For example, when transmitting a packet to communication counterpart A in a state where the encryption algorithm statistics table 134 shown in FIG. 38 is retained, the encryption information determination section 130 selects the most frequently-used encryption algorithm DES-CBC from among the encryption algorithms used for the packets received in the past, by referring to the "frequency" column for communication counterpart A.

In the case where this method is adopted, the encryption information determination section 130 needs to update the "frequency" column in the encryption algorithm statistics table 134 shown in FIG. 38 each time an encrypted packet is received. For example, in the case where an encryption algorithm is to be selected by taking into consideration the packets which were received in last five minutes, a history corresponding to five minutes is always retained in the "frequency" column of the encryption algorithm statistics table 134. With this method, the "last" column in the encryption algorithm statistics table 134 is unnecessary.

(4) Select an encryption algorithm having the highest encryption strength from among encryption algorithms whose calculation amount is equal to or less than the calculation amount of the encryption algorithm used for the packet last received from the communication counterpart to which packets are to be transmitted.

An encryption algorithm which incurs a large calculation amount does not always provide a high encryption strength. For example, as shown in FIG. 37, AES-CBC incurs a smaller calculation amount than does 3DES-CBC, but has a higher encryption strength than that of 3DES-CBC. Therefore, if both AES-CBC and 3DES-CBC are available as an encryption algorithm, it would be more effective to employ AES-CBC.

Moreover, generally speaking, an algorithm which was negotiated for reception purposes does not always coincide with an algorithm negotiated for transmission purposes. For example, even if an encryption algorithm used for the packet last received from the communication counterpart were to be selected, this encryption algorithm might not be one that was negotiated for transmission purposes.

Therefore, according to this method, the encryption information determination section 130 selects an encryption algorithm having the highest encryption strength from among encryption algorithms whose calculation amount is equal to or less than that of the encryption algorithm used for the packet last received from the communication counterpart, by referring to the encryption process and used-resource table 132. For example, when transmitting a packet to communication counterpart B in a state where the encryption algorithm statistics table 134 shown in FIG. 38 is retained, from among encryption algorithms whose calculation amount is equal to or less than the calculation amount of the encryption algorithm 3DES-CBC described in the "last" column for communication counterpart B (i.e., 3DES-CBC and AES-CBC in the example shown in FIG. 37; note that DES-CBC is excluded because it has not been negotiated with communication counterpart B, as seen from FIG. 38), the encryption information determination section 130 selects the encryption algorithm AES-CBC because it has the highest encryption strength.

(5) Select an encryption algorithm having the highest encryption strength from among encryption algorithms whose calculation amount is equal to or less than a statistical value derived from the calculation amounts of the encryption algorithms used for a predetermined number of packets received in the past from the communication counterpart to which packets are to be transmitted.

As the "statistical value", a minimum value among the calculation amounts of those encryption algorithms, a calculation amount appearing with the highest frequency among the calculation amounts of those encryption algorithms, an average of the calculation amounts of those encryption algorithms, or any other statistical value may be adopted.

For example, in the case where an average of the calculation amounts of encryption algorithms used for a predetermined number of packets received in the past from the communication counterpart to which packets are to be transmitted is adopted as a "statistical value", and when transmitting a packet to communication counterpart A in a state where the encryption algorithm statistics table 134 shown in FIG. 38 is retained, the "statistical value" is calculated to be (100×17+300×3)/20=130 based on the "frequency" column for communication counterpart A. Therefore, the encryption information determination section 130 selects the encryption algorithm DES-CBC, whose calculation amount is equal to or less than 130.

(6) Select an encryption algorithm having the highest encryption strength from among encryption algorithms whose calculation amount is equal to or less than a statistical value derived from the calculation amounts of the encryption algorithms used for the packets which, in a predetermined period up to the present, were received from the communication counterpart to which packets are to be transmitted.

For example, in the case where a calculation amount appearing with the highest frequency among the calculation amounts of the encryption algorithms used for the packets which, in a predetermined period up to the present, were received from the communication counterpart to which packets are to be transmitted is adopted as the "statistical value", and when transmitting a packet to communication counterpart B in a state where the encryption algorithm statistics table 134 shown in FIG. 38 is retained, the "statistical value" is "300", which is the calculation amount of 3DES-CBC, based on the "frequency" column for communication counterpart B. Therefore, the encryption information determination section 130 selects the encryption algorithm AES-CBC having the highest encryption strength from among the encryption algorithms whose calculation amount is equal to or less than 300.

In methods (4) to (6) above, an encryption algorithm may be selected by using the "calculation amount index" shown in FIG. 37 instead of the "calculation amount".

The above-illustrated methods are based on the assumption that information concerning packets received in the past is retained in the encryption algorithm statistics table 134. However, in the case where a packet is transmitted for the first time to a communication counterpart, or in the case where packets have long not been received from the recipient of packets, less than adequate information is retained in the encryption algorithm statistics table 134, and therefore the above-illustrated methods cannot be used to select an encryption algorithm. Accordingly, in such a case, the encryption information determination section 130 may select a predesignated encryption algorithm, for example. For another example, the encryption information determination section 130 may first transmit a packet to the recipient of packets for which it is possible to obtain a response from the recipient, e.g., "Echo request" under the ICMP (Internet Control Message Protocol), and an encryption algorithm may be selected based on the encryption algorithm used for the packet which came back from the recipient as a response.

FIG. 40 is a flowchart showing a flow of processes by the present communication system. In FIG. 40, any steps similar to those in FIG. 16 are indicated by like numerals, and the descriptions thereof are omitted.

As can be seen from the flowchart of FIG. 40, the operation of the communication counterpart 122 according to the present embodiment is substantially the same as the operation of the communication device 24 shown in FIG. 16, except that, at step S1702 in FIG. 17 (which is a more detailed illustration of step S1700) according to the present embodiment, encryption algorithms whose CPU utilization rate is equal to or less than the tolerable value (set D) are ascertained within set F. Therefore, only the operation of the communication device 120 will be described below, while omitting any description of the communication counterpart 122.

The encryption information determination section 130 determines whether an encrypted packet has been received from the communication counterpart 122 (S1622), and if such a packet has been received, updates the encryption algorithm statistics table 134 based on the encryption algorithm used for this packet (S4001).

On the other hand, in the case where there are packets to be transmitted to the communication counterpart 122 (YES in S1624), the encryption information determination section 130 selects one encryption algorithm from set F by using a method such as methods (1) to (6) above (S4002). Then, the encryption/decryption processing section 136 encrypts the packet by using the encryption algorithm which has been selected by the encryption information determination section 130 (S4003).

In the present embodiment, there is no particular limitation as to the encryption protocol. Protocols such as IPsec (Security Architecture for the Internet Protocol) or SSL (Secure Sockets Layer) may be used, for example. Moreover, there is no particular limitation as to the type of encryption algorithm, or the content of the packet to be transmitted.

In the present embodiment, it is necessary to previously determine which encryption algorithm is selectable between the communication device 120 and the communication counterpart 122. As an exemplary method thereof, the administrator may previously register the selectable types of encryption algorithms in both the communication device 120 and the communication counterpart 122. For another example, as in step S1601 and step S1621 of FIG. 40, a communication for negotiation may be performed between the communication device 120 and the communication counterpart 122, prior to an encrypted communication. Such a communication for negotiation is also included in IKE, for example.

As described above, according to Embodiment 18, the communication device 120 can select an encryption algorithm having a load which is in accordance with the remaining CPU resource of the communication counterpart 122, by taking into consideration the remaining CPU resource of the communication counterpart 122 based on the encryption algorithm which the communication counterpart 122 used when transmitting a packet. As a result, the communication counterpart 122 can easily perform a decryption process for packets transmitted from the communication device 120. Moreover, since the communication device 120 selects an encryption algorithm based on a packet received from the communication counterpart 122, there is no need to separately transmit a determination material (e.g., information such as the current CPU utilization rate) based on which to select an encryption algorithm, from the communication counterpart 122 to the communication device 120 (as in the process of S1603 in FIG. 16).

Embodiment 19

Defining a device which functions to select an encryption algorithm according to its own convenience to be "primary" (as in the communication counterpart 122 in Embodiment 18), and a device which selects an encryption algorithm according to its counterpart's convenience to be "subordinate" (as in the communication device 120 in Embodiment 18), then it follows that a communication device having both the function of the communication counter part 122 and the function of the communication device 120 can serve to be either "primary" or "subordinate". Hereinafter, as Embodiment 19, such a communication device will be described.

Figure 41:
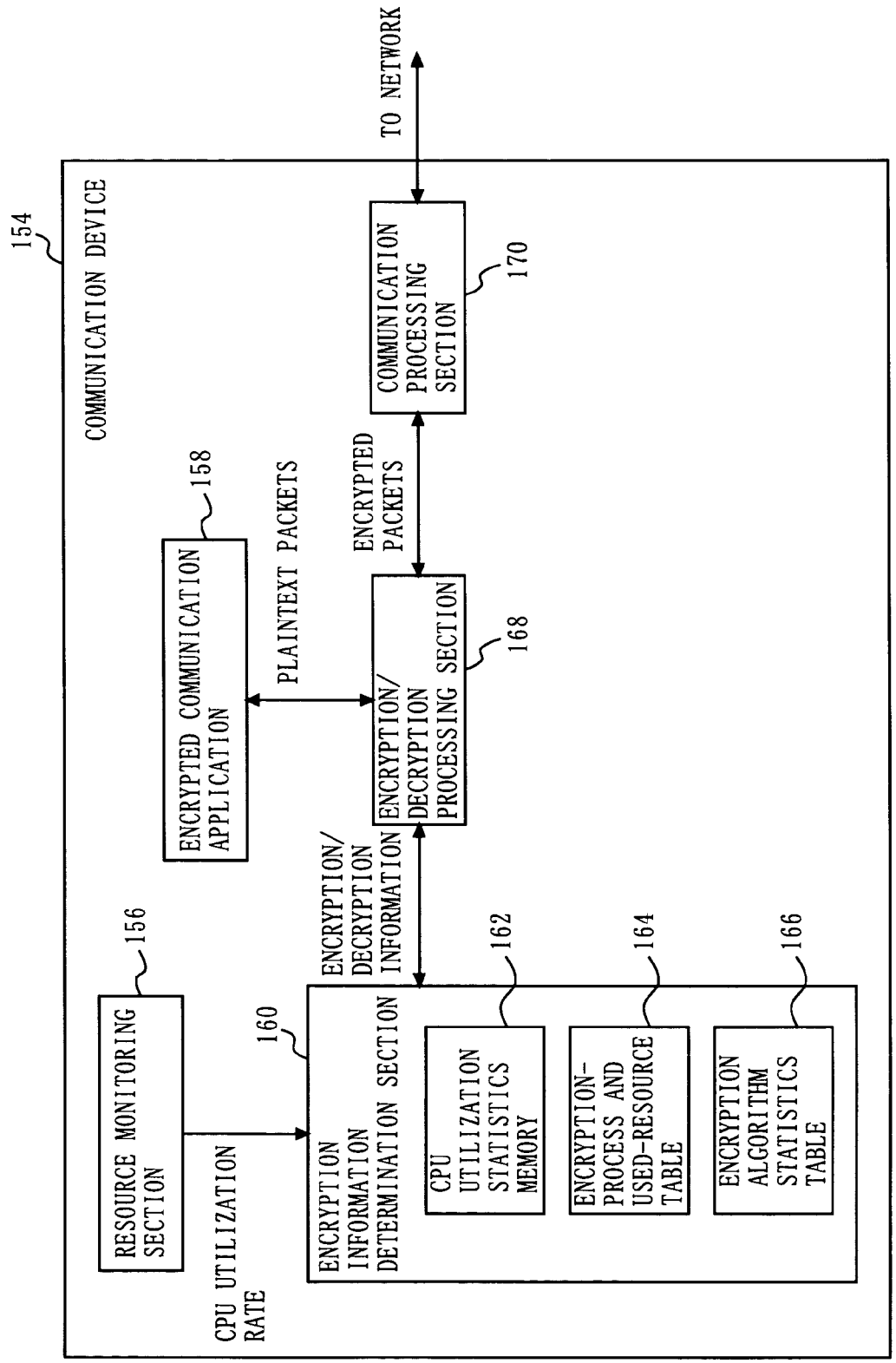
FIG. 41 is a block diagram illustrating the structure of a communication device according to Embodiment 19 of the present invention.

FIG. 41 is a functional block diagram illustrating the structure of the communication device according to Embodiment 19. In FIG. 41, the communication device 154 comprises a resource monitoring section 156, an encrypted communication application 158, an encryption information determination section 160, an encryption/decryption processing section 168, and a communication processing section 170. The encryption information determination section 160 holds a CPU utilization statistics memory 162, an encryption process and used-resource table 164, and an encryption algorithm statistics table 166. Since the structure and operation shown in FIG. 41 are similar to those shown in FIG. 36 or FIG. 39 except for the operation of the encryption information determination section 160, the descriptions thereof are omitted. The operation of the encryption information determination section 160 will be described later.

In the case where communications are performed between two communication devices, if both communication devices function as "primaries" or both function as "subordinates", the desirable effect in Embodiment 18 cannot be obtained. The reason is that, in the case where two communication devices both function as "primaries", it may be possible that, although the CPU utilization rate of one communication device is high, the other communication device may encrypt packets using a high-load encryption algorithm. In the case where two communication devices both function as "subordinates", an encryption algorithm which was first used by one of the communication devices may perpetually be used by both communication devices. Therefore, in the case where communications are performed between two communication devices, it is preferable that one of the communication devices functions as a "primary", while the other communication device functions as a "subordinate". Furthermore, it is preferable that one of the communication devices that has relatively plenty CPU performance or the like functions as a "subordinate" because the communication device function as a "subordinate" always needs to use an encryption algorithm having a load which is conformed to its counterpart, irrespective of its own CPU utilization rate.

Figure 42:
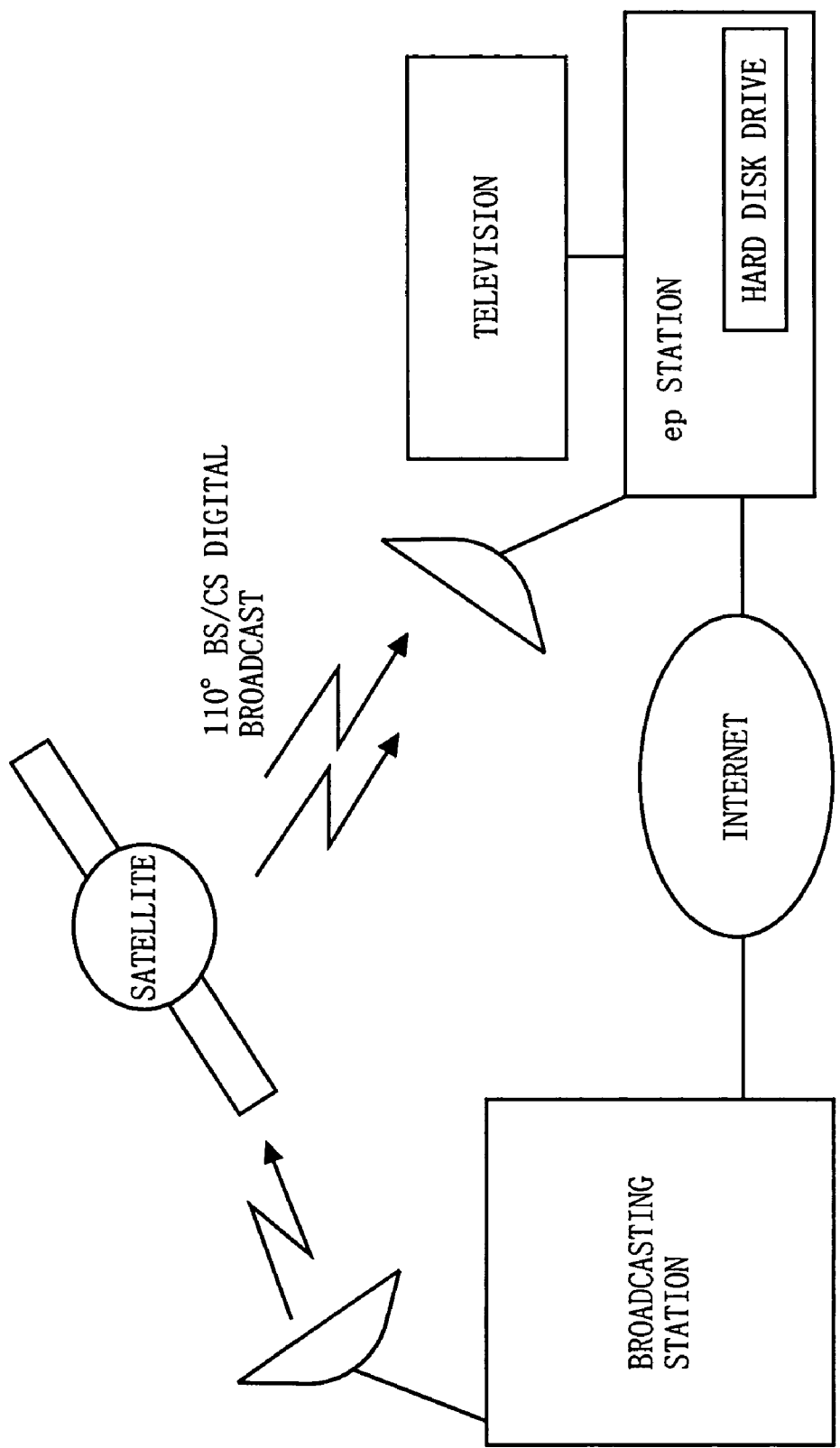
FIG. 42 is a diagram illustrating the mechanism of an ep service.

Hereinafter, the operation of the communication device 154 will be described. Hereinafter, a case is discussed, as shown in FIG. 42, where the communication device 154 of the present embodiment is used in a communication system that includes: a communication device 172 which can only function as a "primary" (as in the communication counterpart 122 in Embodiment 18); a communication device 174 which can only function as a "subordinate" (as in the communication device 120 in Embodiment 18); and a communication device 176 which can function as either a "primary" or a "subordinate" (as in the communication device 154 in the present embodiment).

At the time of power activation, or when performing a first instance of an encrypted communication with a communication counterpart, the encryption information determination section in each communication device 154, 172, 174, or 176 performs a negotiation with the communication counterpart for determining which one of the encryption information determination section itself or the communication counterpart becomes "primary" or "subordinate" (hereinafter referred to as a "primary-subordinate negotiation"). However, such a negotiation may be manually performed by the administrator of the communication system. Hereinafter, for the sake of explanation, the communication device which has initiated the communication will be referred to as "communication device X" and the communication counterpart of communication device X will be referred to as "communication device Y".

First, according to the role that is expected of each communication device, the encryption information determination section in each communication device 154, 172, 174, or 176 attempts to determine which one (itself or the communication counterpart) becomes a "primary" or a "subordinate". Specifically, the encryption information determination section of communication device X first notifies to communication device Y whether: communication device X can only be a "primary"; communication device X can only be a "subordinate"; or communication device X can be either a "primary" or a "subordinate". Upon receiving the notification from communication device X, the encryption information determination section of communication device Y determines whether communication device Y can be a suitable communication counterpart for communication device X. More specifically, it is determined whether communication device Y can be a "subordinate" in the case where communication device X can only be a "primary", and whether communication device Y can be a "primary" in the case where communication device X can only be a "subordinate". As a result, if communication device Y can be a suitable communication counterpart for communication device X, such is replied to communication device X, and the primary-subordinate negotiation is ended.

In the case where communication device X can be either a "primary" or a "subordinate", the encryption information determination section of communication device Y replies the role of communication device Y to communication device X. More specifically, in the case where communication device Y can only be a "primary", such is replied to communication device X, and in the case where communication device Y can only be a "subordinate", such is replied to communication device X. Thus, the primary-subordinate negotiation is ended.

In the case where communication device X can be either a "primary" or a "subordinate" and communication device Y can also be either a "primary" or a "subordinate", one of the following two methods can be used to determine which one (itself or the communication counter part) becomes a "primary" or a "subordinate".

A first method is a method in which communication device Y selects a previously set role. Specifically, "primary" or "subordinate", whichever is previously set, is selected and notified to communication device X. In the case where communication device Y has selected "primary", communication device X becomes "subordinate", and in the case where communication device Y has selected "subordinate", communication device X becomes "primary". Thus, the primary-subordinate negotiation is ended.

A second method is a method in which the performances of both are compared, so that the one having the lower performance is made "primary" and the one having the higher performance is made "subordinate". In this case, the encryption information determination section of communication device Y first notifies the performance of communication device Y (e.g., ability of the hardware such as the CPU, values which are set in the system, or the CPU resource which is available for encrypted communications as based on information at that point or at a past point) to communication device X. Upon receiving this notification, the encryption information determination section of communication device X compares the performance of communication device X and the performance of communication device Y so as to determine which one of communication device X or communication device Y becomes "primary" or "subordinate". Then, the result of the determination is notified to communication device Y. Thus, the primary-subordinate negotiation is ended. Alternatively, communication device X may notify performance to communication device Y, and communication device Y may determine which one of communication device X or communication device Y becomes "primary" or "subordinate". In this case, the notification of the performance from communication device X to communication device Y may be made concurrently with the aforementioned notification to communication device Y as to whether: communication device X can only be a "primary"; communication device X can only be a "subordinate"; or communication device X can be either a "primary" or a "subordinate".

Once the primary-subordinate negotiation is ended in as described above, the encryption information determination section of communication device X operates in accordance with the role of communication device X ("primary" or "subordinate"). Specifically, in the case where communication device X is a "primary", it operates in accordance with the flowchart shown on the left-hand side of FIG. 40 (i.e., the communication counterpart 122), and in the case where communication device X is a "subordinate", it operates in accordance with the flowchart shown on the right-hand side of FIG. 40 (i.e., the communication device 120). Similarly, the encryption information determination section of communication device Y operates in accordance with the role of communication device Y.

As described above, according to the present embodiment, when communications are to be performed between two communication devices, both communication devices functioning as "primaries" or both functioning as "subordinates" can be prevented.

Although Embodiments 1 to 19 above illustrate selection of an encryption algorithm, the present invention is also applicable to the selection of an authentication algorithm. An authentication algorithm is an algorithm for confirming whether received data has not been tampered with during transmission. Furthermore, the present invention is also applicable to the selection of a compression algorithm involved in the compression and decompression of video data, audio data, or general data, etc. Various kinds of data compression algorithms are available, e.g., DEFLATE and LZS, and their compression rates, processing loads, and CPU utilization rates may be taken into consideration to select an algorithm which has as high a compression rate as possible without allowing the CPU resource to be depleted, whereby the load on the communication network can be reduced. From another standpoint, an authentication algorithm resembles code processing in that authentication data is generated by applying complex calculations to the original data to be subjected to authentication, and a compression algorithm also resembles code processing in that the original data is converted to compressed data, which requires complex decompression processing; thus, Embodiments 1 to 19 above can be applied to the selection of an authentication algorithm or a compression algorithm instead of the selection of an encryption algorithm.

Moreover, the encryption/decryption processing section may generally comprise one or more protocols for realizing encrypted communications such as IPsec, SSL, or TLS, and one or more programs based on a protocol for performing key information acquisition such as IKE (according to IKE, key information is acquired through a shared key exchanging; IKE realizes key exchanging using Diffie-Hellman algorithm), and perform encrypted communications by calling an encryption algorithm such as DES-CBC, 3DES-CBC, or AES.

Below are several embodiments which are not explicitly claimed but will be readily understood from the above descriptions.

In one embodiment, in the case where the encrypted communication application is not being executed when selecting an encryption algorithm, the encryption information determination section defines the amount of used resource by the non-encrypted communication application as an average of the total used resource over a predetermined period up to the present.

In another embodiment, in the case where the encrypted communication application is being executed when selecting an encryption algorithm, the encryption information determination section defines the amount of used resource by the non-encrypted communication application as an average of the total used resource over a predetermined period up to the present minus the amount of used resource by the encrypted communication application.

Instill another embodiment, the encryption information determination section defines the amount of used resource by a plurality of said non-encrypted communication applications which are being executed when selecting an encryption algorithm as an average of the amount of used resource by the plurality of non-encrypted communication applications in a past period during which the same plurality of non-encrypted communication applications were being executed.

In still another embodiment, the encryption information determination section defines the amount of used resource by the non-encrypted communication application which is being executed when selecting an encryption algorithm as a predetermined default value for the non-encrypted communication application.

Instill another embodiment, the encryption information determination section defines the amount of used resource by the encrypted communication application when using a specific encryption algorithm as an average of the used resource amount by the encrypted communication application in a past period during which the encrypted communication application was executed using the specific encryption algorithm.

Instill another embodiment, the encryption information determination section defines the amount of used resource by the encrypted communication application when using a specific encryption algorithm as a predetermined default value for a combination of the encrypted communication application and the specific encryption algorithm.

In still another embodiment, the schedule section registers to the schedule a preprocess of generating a key for an encrypted communication prior to starting tasks involved in an encrypted communication application being defined as an application which requires code processing, and determines a start time of the preprocess based on a value obtained by subtracting from a tolerable amount of used resource a total used resource in a period existing before a scheduled start time of the encryption algorithm, or a value obtained by subtracting from the tolerable amount of used resource a total used resource in a period existing before a scheduled time to switch encryption algorithms.

In still another embodiment, the schedule section registers to the schedule a rekeying process for generating an update key for an encrypted communication, and determines a start time of there keying process based on a value obtained by subtracting from a tolerable amount of used resource a total used resource in a period existing before an expiration time of a life of the key for an encrypted communication.

Instill another embodiment, in a case where the selected encryption algorithm is switched from a first encryption algorithm to a second encryption algorithm and then back to the first encryption algorithm, the communication processing section retains a key which was used for an encrypted communication before the switching throughout a period of using the second encryption algorithm, and the key is reused when switching back to the first encryption algorithm.

Instill another embodiment, the encryption information determination section stores to the encryption algorithm statistics table an encryption algorithm used for a packet last received from the communication counterpart, and selects the encryption algorithm used for the received packet by referring to the encryption algorithm statistics table.

Instill another embodiment, the encryption information determination section stores to the encryption algorithm statistics table encryption algorithms used for a predetermined number of packets received from the communication counterpart, and selects an encryption algorithm appearing with a highest frequency among the encryption algorithms used for the predetermined number of received packets, by referring to the encryption algorithm statistics table.

Instill another embodiment, the encryption information determination section stores to the encryption algorithm statistics table encryption algorithms used for packets received from the communication counterpart for a predetermined period of time up to the present, and selects an encryption algorithm appearing with a highest frequency among the encryption algorithms used for the predetermined number of received packets, by referring to the encryption algorithm statistics table.

Instill another embodiment, the encryption information determination section stores to the encryption algorithm statistics table an encryption algorithm used for a packet last received from the communication counterpart, and selects an encryption algorithm having a highest encryption strength among those encryption algorithms whose calculation amounts are equal to or less than the calculation amounts of the encryption algorithms used for the received packets, by referring to the encryption algorithm statistics table and the encryption process and used-resource table.

Instill another embodiment, the encryption information determination section stores to the encryption algorithm statistics table encryption algorithms used for a predetermined number of packets received from the communication counterpart, and selects an encryption algorithm having a highest encryption strength among those encryption algorithms whose calculation amounts are equal to or less than a statistical value derived from the calculation amounts of the encryption algorithms used for the received packets, by referring to the encryption algorithm statistics table and the encryption process and used-resource table.

Instill another embodiment, the encryption information determination section stores to the encryption algorithm statistics table encryption algorithms used for packets received from the communication counterpart for a predetermined period of time up to the present, and selects an encryption algorithm having a highest encryption strength among those encryption algorithms whose calculation amounts are equal to or less than a statistical value derived from the calculation amounts of the encryption algorithms used for the received packets, by referring to the encryption algorithm statistics table and the encryption process and used-resource table.

In still another embodiment, instead of encryption algorithms, the communication device is adapted to at least one of: authentication algorithms for performing authentication processes; or compression algorithms for performing compression/decompression processes.

While the invention has been described in detail, the foregoing description is in all aspects illustrative and not restrictive. It is understood that numerous other modifications and variations can be devised without departing from the scope of the invention.

What is claimed is:

1. A communication device comprising:
   an encryption information determination section for selecting an encryption algorithm from among a plurality of previously provided encryption algorithms, the selected encryption algorithm being different depending on a predicted total used resource or an actual total used resource;

an encryption/decryption processing section for encrypting a packet in accordance with the encryption algorithm selected by the encryption information determination section; and a communication processing section for transmitting the packet encrypted by the encryption/decryption processing section.

2. The communication device according to claim 1, wherein, the total used resource is a total of CPU utilization rates of applications to be executed by a CPU of the communication device, and the encryption/decryption processing section performs code processing using the CPU.

3. The communication device according to claim 1, further comprising a resource monitoring section for monitoring a current amount of used resource, wherein the encryption information determination section calculates the total used resource based on the amount of used resource notified from the resource monitoring section.

4. The communication device according to claim 3, wherein, the encryption information determination section includes a used amount resource information memory for storing the amount of used resource notified from the resource monitoring section, and calculates the total used resource based on an average of the amount of used resource stored in the used resource amount information memory for a predetermined period.

5. The communication device according to claim 1, wherein, instead of encryption algorithms, the communication device is adapted to at least one of: authentication algorithms for performing authentication processes; or compression algorithms for performing compression/decompression processes.

6. The communication device according to claim 1, wherein, from among the plurality of previously provided encryption algorithms, the encryption information determination section selects an encryption algorithm such that the predicted total used resource when using the encryption algorithm does not exceed a first reference value.

7. The communication device according to claim 6, wherein the encryption information determination section includes an encryption process and used-resource table storing a load of code processing for each encryption algorithm, and calculates a total used resource when using the encryption algorithm based on the encryption process and used-resource table.

8. The communication device according to claim 6, wherein the encryption information determination section selects, from among encryption algorithms such that the total used resource when using each encryption algorithm does not exceed a predetermined tolerable value, an encryption algorithm having a highest encryption strength.

9. The communication device according to claim 6, wherein the total used resource is a total of an amount of used resource by an encrypted communication application and an amount of used resource by a non-encrypted communication application, the encrypted communication application being defined as an application which requires code processing, and the non-encrypted communication application being defined as an application which does not require code processing.

10. The communication device according to claim 1, wherein, if an average of the total used resource for a predetermined period up to a point during code processing is higher than a second reference value, the encryption information determination section selects an encryption algorithm having a lower load than the currently-used encryption algorithm.

11. The communication device according to claim 1, wherein, if an average of the total used resource for a predetermined period up to a point during code processing is lower than a third reference value, the encryption information determination section selects an encryption algorithm having a higher encryption strength than the currently-used encryption algorithm.

12. The communication device according to claim 1, wherein the encryption information determination section reselects an encryption algorithm if a difference between an actual total used resource in a point in the past and an actual total used resource at present is equal to or greater than a predetermined value.

13. The communication device according to claim 1, wherein the encryption information determination section previously negotiates a plurality of encryption algorithms to be used with a communication counterpart of the communication device, and when the encryption/decryption processing section encrypts a packet, selects a different encryption algorithm depending on the predicted total used resource or the actual total used resource from among the plurality of previously negotiated encryption algorithms.

14. The communication device according to claim 1, further comprising a schedule section for accepting a preprogramming of an application to be executed and registering execution of the application to a schedule, wherein, based on a total used resource at a point in the future as predicted according to the schedule, the encryption information determination section selects an encryption algorithm to be used at that point.

15. The communication device according to claim 14, wherein, the schedule comprises a schedule and used-resource table for registering, a start time, an end time, and a used resource amount for each task involved in a preprogrammed application, the schedule section accepts a preprogramming of an application to be executed and registers execution of a task involved in the application to the schedule and used-resource table, and for each task involved in an encrypted communication application being defined as an application which requires code processing, the encryption information determination section selects an encryption algorithm such that the predicted total used resource when using the encryption algorithm does not exceed a first reference value during a period in which the task is executed.

16. The communication device according to claim 14, wherein, the schedule comprises a schedule and used-resource table for registering, a start time, an end time, and a used resource amount for each task involved in a preprogrammed application, and an event and used-resource table for registering the total used resource for a respective event slot defined by the start time and the end time of each task, the schedule section accepts a preprogramming of an application to be executed and registers execution of a task involved in the application to the schedule and used-resource table, and generates the event and used-resource table based on the schedule and used-resource table, and for each event slot, the encryption information determination section selects an encryption algorithm such that the total used resource does not exceed a first reference value during the event slot as an encryption algorithm to be used for a task involved in an encrypted communication application defined as an application which requires code processing.

17. The communication device according to claim 14, wherein the schedule section registers to the schedule a preprocess of generating a key for encrypted communications prior to starting tasks involved in an encrypted communication application being defined as an application which requires code processing, and determines a start time of the preprocess based on a value obtained by subtracting from a tolerable amount of used resource a total used resource in a period existing before a scheduled start time of a task involved in the encrypted communication application.

18. The communication device according to claim 14, wherein, when it is unacceptable to register an additional preprogramming to the schedule because the total used resource would exceed a tolerable amount of used resource, the schedule section reselects an encryption algorithm such that an encryption algorithm whose use is already registered to the schedule is replaced by an encryption algorithm having a smaller load if such is possible.

19. The communication device according to claim 14, wherein, when it is unacceptable to register an additional preprogramming to the schedule because the total used resource would exceed a tolerable amount of used resource, the schedule section changes a time to execute an application which is already registered to the schedule or changes an average data transfer amount for encrypted communications.

20. The communication device according to claim 14, wherein, when a preprogramming of an application which was registered to the schedule is canceled, the schedule section reselects an encryption algorithm such that an encryption algorithm whose use is already registered to the schedule is replaced by an encryption algorithm having a higher encryption strength if such is possible.

21. An algorithm selection method comprising:
an encryption information determination step of selecting an encryption algorithm from among a plurality of previously provided encryption algorithms, the selected encryption algorithm being different depending on a predicted total used resource or an actual total used resource;

a code processing step of encrypting a packet in accordance with the encryption algorithm selected by the encryption information determination step; and a communication processing step of transmitting the packet encrypted by the code processing step.

22. A computer-readable recording medium having recorded thereon a program for causing a computer to execute the steps described in claim 21.

23. A communication device comprising:
an encryption information determination section for selecting an encryption algorithm from among a plurality of previously provided encryption algorithms, the selected encryption algorithm being different depending on an encryption algorithm or encryption algorithms used for one or more packets received from a communication counterpart;

an encryption/decryption processing section for encrypting a packet to be transmitted to the communication counterpart in accordance with the encryption algorithm selected by the encryption information determination section; and a communication processing section for transmitting the packet encrypted by the encryption/decryption processing section, wherein the encryption information determination section includes an encryption algorithm statistics table for storing the encryption algorithm or encryption algorithms used for the one or more packets received from the communication counterpart, and selects an encryption algorithm appearing with a highest frequency among the encryption algorithm or encryption algorithms used for the received one or more packets by referring to the encryption algorithm statistics table.

24. A communication device comprising:
an encryption information determination section for selecting an encryption algorithm from among a plurality of previously provided encryption algorithms, the selected encryption algorithm being different depending on an encryption algorithm or encryption algorithms used for one or more packets received from a communication counterpart;

an encryption/decryption processing section for encrypting a packet to be transmitted to the communication counterpart in accordance with the encryption algorithm selected by the encryption information determination section; and a communication processing section for transmitting the packet encrypted by the encryption/decryption processing section, wherein the encryption information determination section includes an encryption algorithm statistics table for storing the encryption algorithm or encryption algorithms used for the one or more packets received from the communication counterpart, and an encryption process and used-resource table for storing information concerning an encryption strength and a calculation amount of each of the previously provided encryption algorithms, and selects an encryption algorithm having a highest encryption strength among those encryption algorithms whose calculation amounts are equal to or less than a statistical value derived from the calculation amounts of the encryption algorithms used for the received packets, by referring to the encryption algorithm statistics table and the encryption process and used-resource table.

25. A communication device comprising:
an encryption information determination section having a function of selecting an encryption algorithm from among a plurality of previously provided encryption algorithms such that the selected encryption algorithm is different depending on a predicted total used resource or an actual total used resource, and a function of selecting an encryption algorithm from among a plurality of previously provided encryption algorithms such that the selected encryption algorithm is different depending on an encryption algorithm or encryption algorithms used for one or more packets received from a communication counterpart;

an encryption/decryption processing section for encrypting a packet to be transmitted to the communication counterpart in accordance with the encryption algorithm selected by the encryption information determination section; and a communication processing section for transmitting the packet encrypted by the encryption/decryption processing section.

26. The communication device according to claim 25, wherein the encryption information determination section performs a primary-subordinate negotiation process through communications with the communication counterpart to confirm whether to work as a primary or a subordinate with respect to the communication counterpart, and based on a result of the primary-subordinate negotiation process, switches between the function of selecting a different encryption algorithm depending on the predicted total used resource or the actual total used resource and the function of selecting a different encryption algorithm depending on the encryption algorithm or encryption algorithms used for the one or more packets received from the communication counterpart.

27. The communication device according to claim 26, wherein, in the primary-subordinate negotiation process, the encryption information determination section compares a performance of the communication device and a performance of the communication counterpart, and selects a different encryption algorithm depending on the predicted total used resource or the actual total used resource if the performance of the communication device is lower than the performance of the communication counterpart, and selects a different encryption algorithm depending on the encryption algorithm or encryption algorithms used for the one or more packets received from the communication counterpart if the performance of the communication device is higher than the performance of the communication counterpart.

28. The communication device according to claim 25, wherein, instead of encryption algorithms, the communication device is adapted to at least one of: authentication algorithms for performing authentication processes; or compression algorithms for performing compression/decompression processes.

* * * * *